US011206232B2

(12) United States Patent
Kapoor et al.

(10) Patent No.: US 11,206,232 B2
(45) Date of Patent: Dec. 21, 2021

(54) GENERATING AND MAINTAINING GROUP MESSAGING THREADS FOR EPHEMERAL CONTENT

(71) Applicant: Facebook, Inc., Menlo Park, CA (US)

(72) Inventors: Mihika Kapoor, Scarsdale, NY (US); Blake Cutler, Santa Monica, CA (US); Andrew James Taylor, Kingsville (AU); Joseph Kennedy, San Francisco, CA (US); Yo-Tzu Yeh, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 16/653,628

(22) Filed: Oct. 15, 2019

(65) Prior Publication Data

US 2020/0403951 A1    Dec. 24, 2020

Related U.S. Application Data

(60) Provisional application No. 62/863,230, filed on Jun. 18, 2019.

(51) Int. Cl.
| | | |
|---|---|---|
| *H04L 12/58* | (2006.01) | |
| *G06F 3/0481* | (2013.01) | |
| *H04W 4/21* | (2018.01) | |
| *G06Q 50/00* | (2012.01) | |

(52) U.S. Cl.
CPC .......... *H04L 51/16* (2013.01); *G06F 3/04817* (2013.01); *G06Q 50/01* (2013.01); *H04L 51/043* (2013.01); *H04L 51/32* (2013.01); *H04W 4/21* (2018.02)

(58) Field of Classification Search
CPC ....... H04L 51/16; H04L 51/043; H04L 51/32; G06F 3/04817; G06Q 50/01; H04W 4/21
USPC .......................................................... 709/206
See application file for complete search history.

(56) References Cited

U.S. PATENT DOCUMENTS

| | | | | |
|---|---|---|---|---|
| 2005/0262542 A1* | 11/2005 | DeWeese | ............. | H04N 21/454 |
| | | | | 725/106 |
| 2013/0263009 A1* | 10/2013 | Kim | ........................ | H04L 51/32 |
| | | | | 715/739 |
| 2014/0156757 A1* | 6/2014 | Zhang | ................. | H04L 12/1822 |
| | | | | 709/204 |

(Continued)

*Primary Examiner* — John B Walsh
*Assistant Examiner* — Weiwei Y Stiltner
(74) *Attorney, Agent, or Firm* — Keller Jolley Preece

(57) ABSTRACT

The present disclosure relates to systems, non-transitory computer-readable media, and methods for generating and maintaining group messaging threads associated with ephemeral content. For instance, the disclosed systems can facilitate the creation of ephemeral content including a customizable group messaging graphical element associated with the ephemeral content the enables users to join a group messaging thread associated with the ephemeral content. In addition, the disclosed systems can generate user requests to join the group messaging thread based on user interaction with a group messaging graphical element within ephemeral content and can present the requests to the creator of the ephemeral content. Accordingly, in various embodiments, the disclosed systems can facilitate group messaging threads between creators of ephemeral content and users that view the ephemeral content via associated group messaging graphical elements.

20 Claims, 20 Drawing Sheets

(56) References Cited

U.S. PATENT DOCUMENTS

| | | | |
|---|---|---|---|
| 2014/0324993 A1* | 10/2014 | Li | H04L 12/1818 709/206 |
| 2015/0120588 A1* | 4/2015 | Mencke | H04L 67/14 705/319 |
| 2015/0350349 A1* | 12/2015 | Kao | H04L 67/18 709/204 |
| 2016/0127292 A1* | 5/2016 | Birger | H04W 4/14 709/206 |
| 2016/0291921 A1* | 10/2016 | Miller | H04N 21/4307 |
| 2017/0126592 A1* | 5/2017 | El Ghoul | H04L 51/24 |
| 2017/0237785 A1* | 8/2017 | Peng | H04L 51/04 709/206 |
| 2017/0353416 A1* | 12/2017 | Brooks | H04L 67/10 |
| 2018/0077092 A1* | 3/2018 | Jalil | H04L 51/046 |
| 2018/0152403 A1* | 5/2018 | Charignon | H04L 67/22 |
| 2018/0241705 A1* | 8/2018 | Sarafa | H04L 9/0844 |
| 2019/0191218 A1* | 6/2019 | Cormican | H04N 21/4722 |
| 2019/0205743 A1* | 7/2019 | Jiang | G06N 3/08 |
| 2019/0306101 A1* | 10/2019 | Synal | H04L 65/1063 |
| 2019/0327198 A1* | 10/2019 | Connor | H04L 51/32 |
| 2020/0120170 A1* | 4/2020 | Amitay | H04L 51/32 |

* cited by examiner

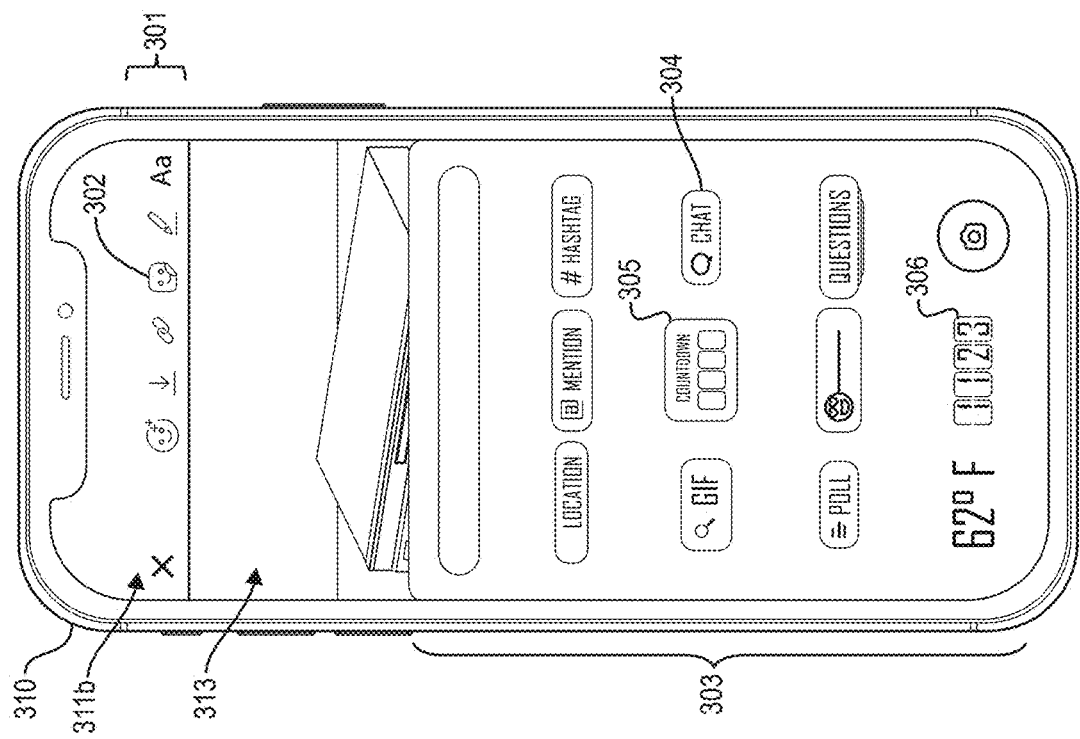
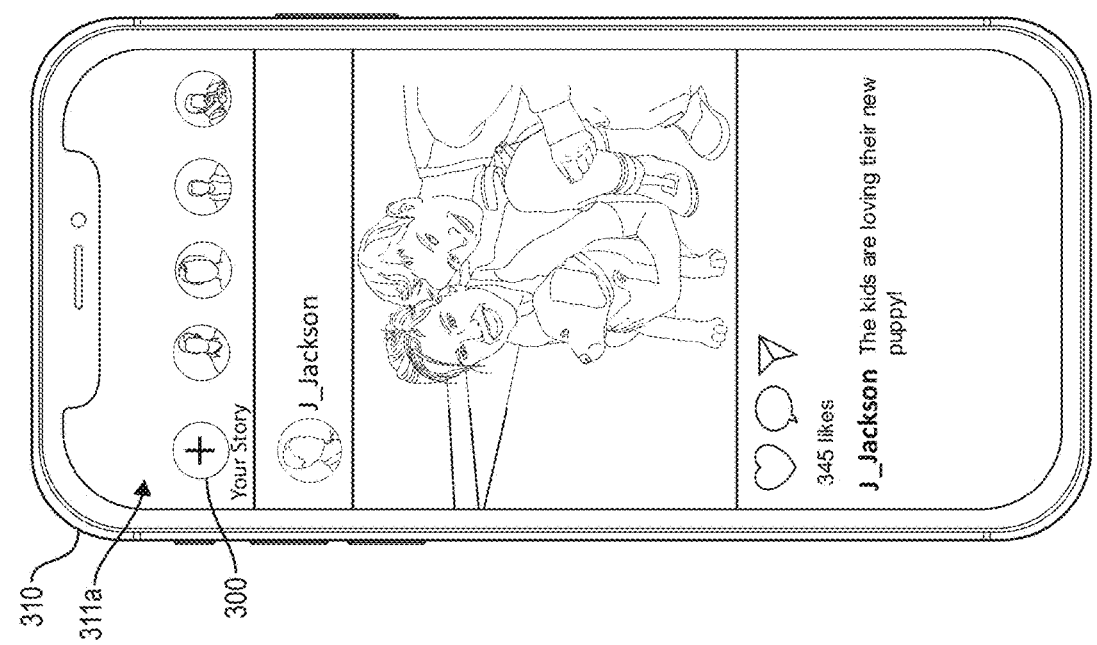
Fig. 3B
Fig. 3A

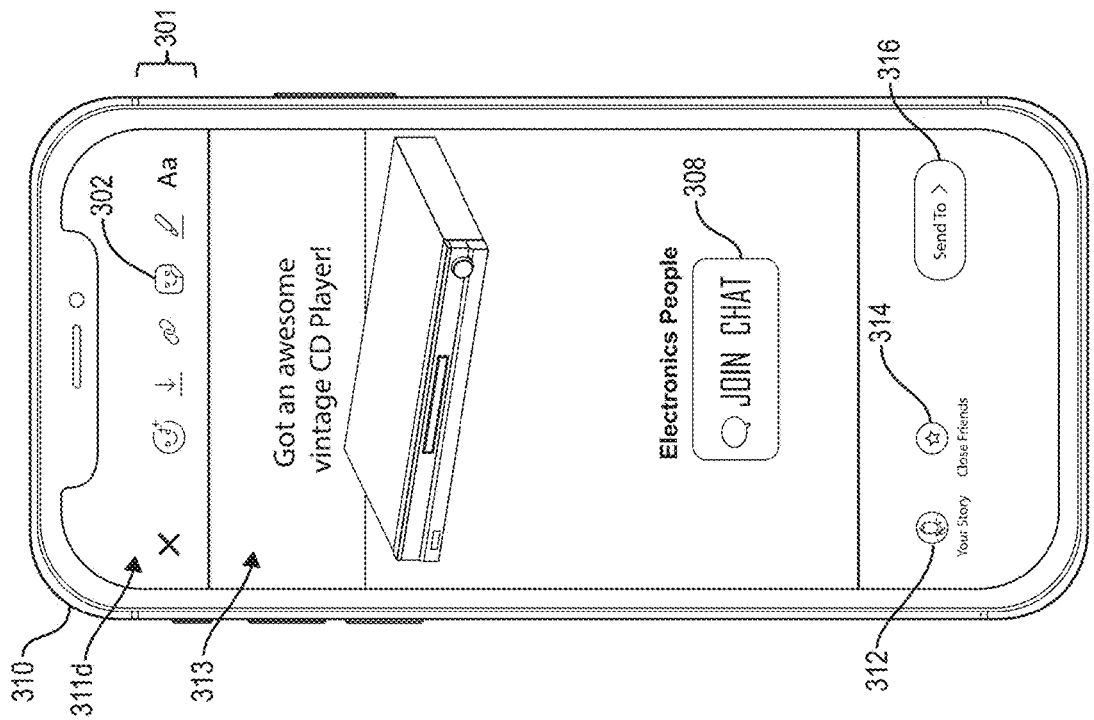
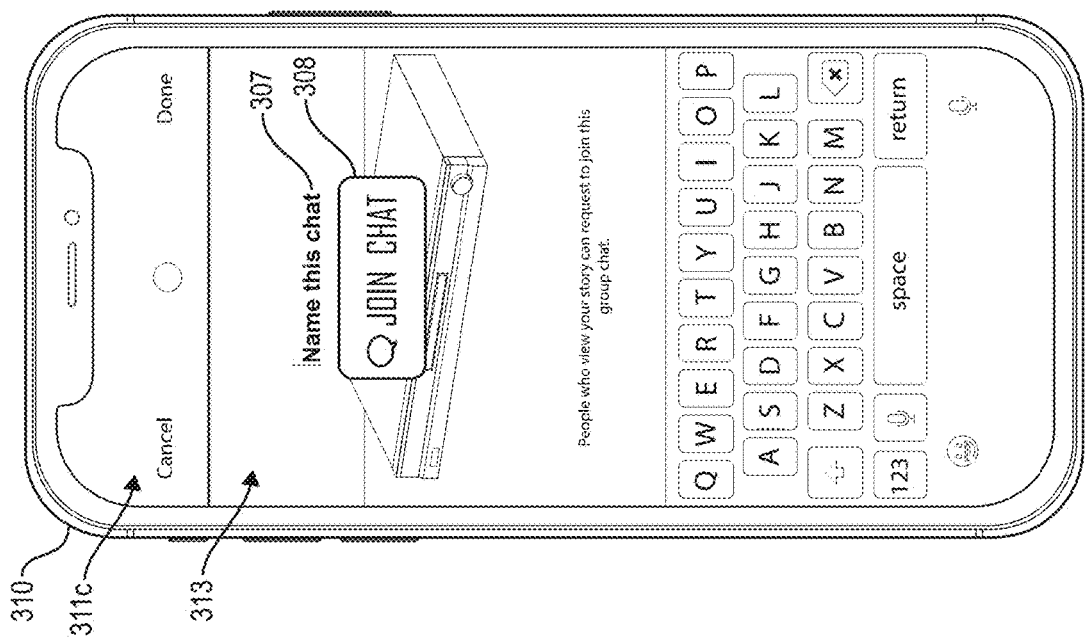
*Fig. 3C*
*Fig. 3D*

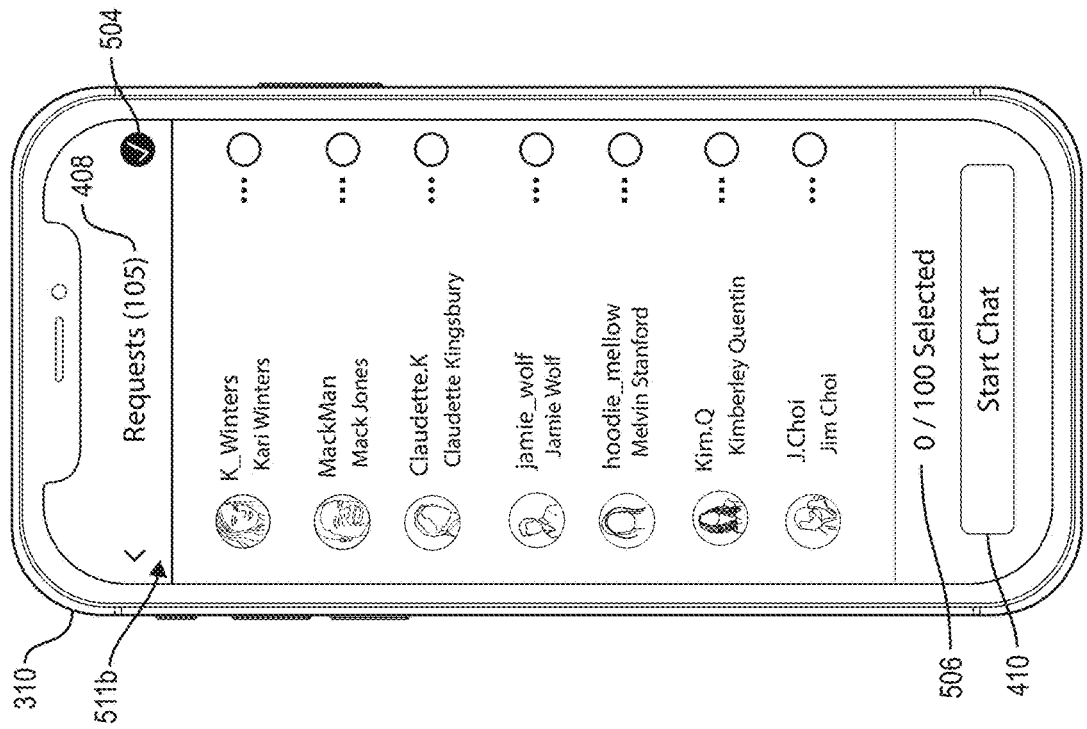
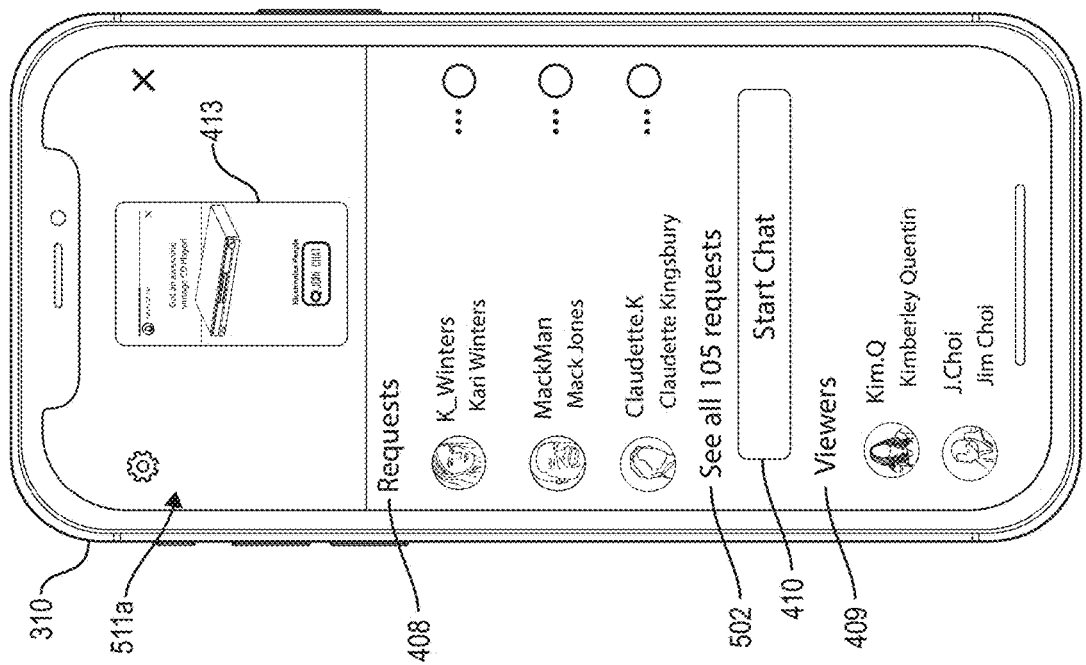
Fig. 5B
Fig. 5A

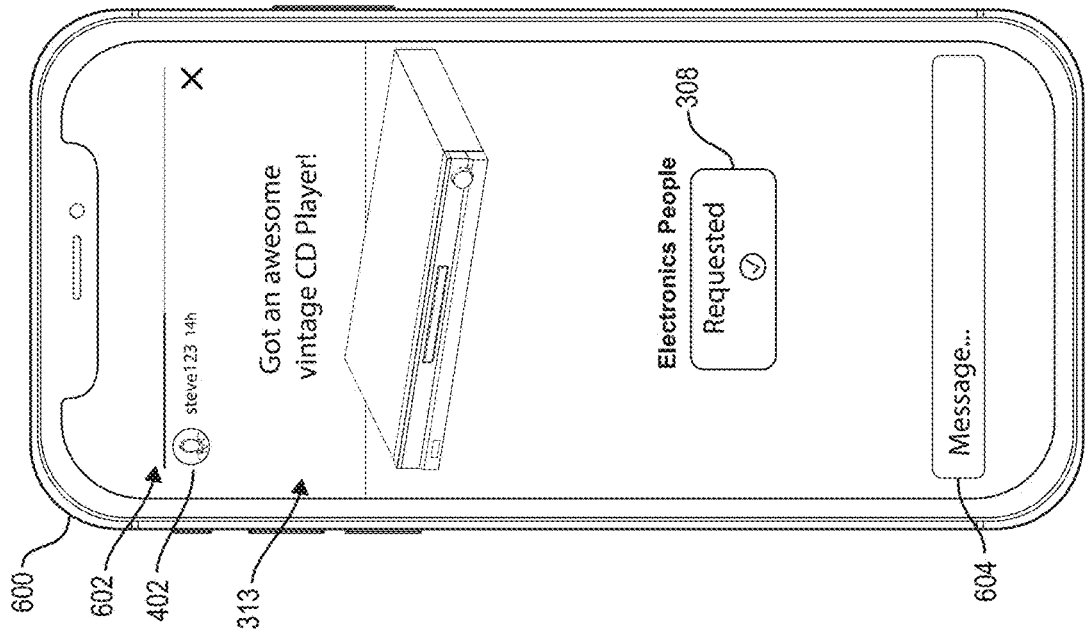
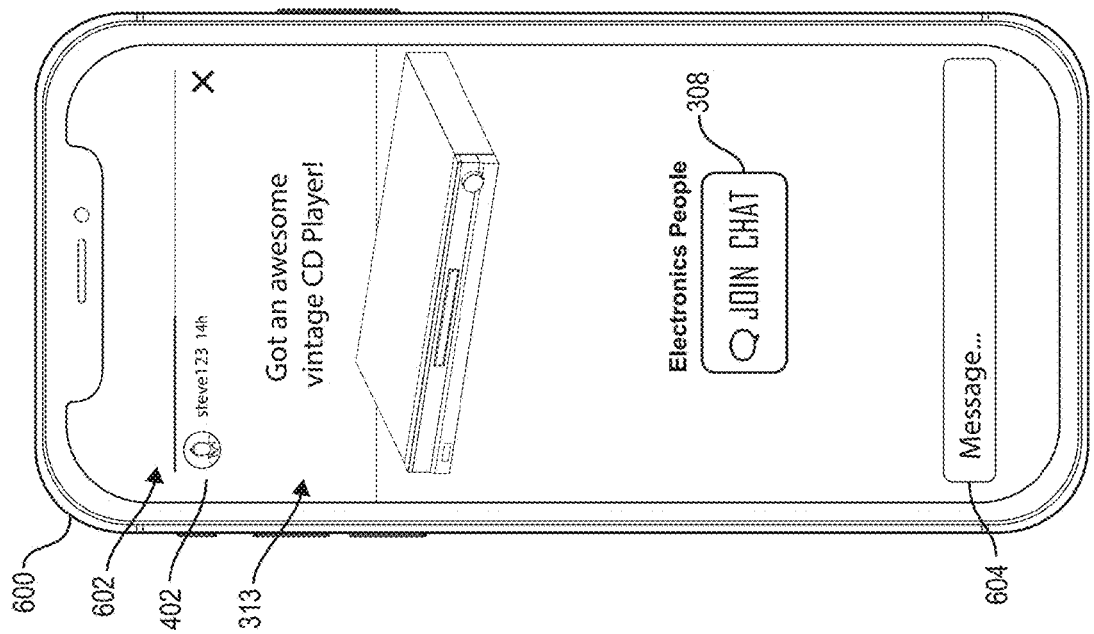

GENERATING AND MAINTAINING GROUP MESSAGING THREADS FOR EPHEMERAL CONTENT

CROSS-REFERENCE TO RELATED APPLICATIONS

This application claims the benefit of and priority to U.S. Provisional Patent Application 62/863,230, filed Jun. 18, 2019. The entire contents of the foregoing patent application are hereby incorporated by reference.

BACKGROUND

Recent years have seen significant technological improvements in hardware and software platforms for communicating on networking platforms. Indeed, conventional digital content sharing systems can facilitate content users sharing content items with users as well as engaging with users with respect to content items shared via the networking system. In addition, conventional systems allow creators to share digital content and users to provide comments and reactions. In particular, conventional systems provide a variety of options for creators to share and monitor digital content with others.

Despite these and other advancements conventional systems have a number of problems in relation to efficiency and flexibility of operation. In particular, conventional systems struggle with these issues with respect to facilitating digital content-based communications among users. For example, many conventional systems provide comment sections to facilitate discussion, but such comment sections are restrictive and lack flexibility. In addition, many conventional systems provide unorganized and generalized comment sections. That is, while conventional systems facilitate commenting on some shared digital content, the comment sections of conventional systems fail to provide an environment for topical discussion of digital content. In contrast, for many conventional systems, discussion of shared digital content in a comment section is open with regard to both topic as well as the users that can patriciate.

Additionally, conventional systems lack flexibility by not providing a communication section for certain content types. Indeed, many conventional systems allow only direct messaging in response to some types of shared content. For example, many conventional systems do not provide any group discussion forum for ephemeral content. Accordingly, the rigid design of conventional systems in providing a limited environment for commenting on digital content significantly hinders communications among users in a variety of contexts.

Further, the one-size-fits-all approach of conventional systems approach lacks efficiency. In particular, because conventional systems provide a limited communication environment for commenting on digital content, this limited communication environment is often unorganized as well as bloated with unnecessary and redundant comments. Often, when the environment is unorganized, users provide the same comment multiple times within the discussion environment, which inefficiently wastes computing resources on multiple levels. For example, duplicative comments require additional memory storage to store each comment within the discussion. Also, duplicative comments require additional bandwidth to be used in transmitting the comments to client devices associated with users reading the comments. Further, duplicative comments unnecessarily extend the length of the discussion and cause can also cause the users to needlessly scroll through additional pages of comments to find a desired topic, which wastes the computing resources and battery power of the user client device.

As mentioned above, many conventional systems require users to page through a large volume of comments when trying to locate a desired discussion topic. In some cases, however, the desired topic does not exist. For example, even when a discussion environment is associated with a particular piece of shared digital content, conventional systems largely require creators and users to hunt out discussion related to the shared digital content, which are often scattered throughout other random discussion topics. Thus, the unorganized design of group discussion in conventional systems lacks efficiency of operation and causes undue utilization of system resources.

To combat the issue of large and unorganized discussion environments, many conventional systems enable creators to moderate an environment. Additionally, in order to curate particular topics of discussion for shared content, conventional systems require a creator to delete or remove non-topical comments. This manual moderation in conventional systems wastes system resources, including inefficient utilization of computing devices. Further, manual moderation is infeasible in a variety of contexts, especially when there is a large volume of comments to moderate. Thus, conventional systems lack efficiency in moderation of discussion of shared content.

These, along with additional problems and issues, exist with regard to conventional digital content sharing systems.

BRIEF SUMMARY

Embodiments of the present disclosure provide benefits and/or solve one or more of the foregoing or other problems in the art with systems, non-transitory computer-readable media, and methods for generating and maintaining group messaging threads associated with ephemeral content. For example, the disclosed systems facilitate and maintain a group messaging conversations associated with a group messaging graphical element (e.g., sticker) included in ephemeral content (e.g., a video clip or digital story). More specifically, the disclosed systems facilitate generating a group messaging graphical element in association with generating ephemeral content. The disclosed systems can also generate a group messaging thread associated to enable users that select the group messaging graphical element within the ephemeral content to join in a discussion with respect to the ephemeral content. In addition, the disclosed systems can enable the creator of the ephemeral content to manage the group messaging thread.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIGS. 3A-3D illustrate graphical user interfaces for generating a group messaging graphical element within ephemeral content on a creator client device in accordance with one or more embodiments.

FIGS. 5A-5D illustrate graphical user interfaces for managing membership in a group messaging thread associated with ephemeral content in accordance with one or more embodiments.

FIGS. 6A-6B illustrate graphical user interfaces for utilizing a group messaging graphical element to request to join a group messaging thread on a user client device in accordance with one or more embodiments.

DETAILED DESCRIPTION

Figure 1:
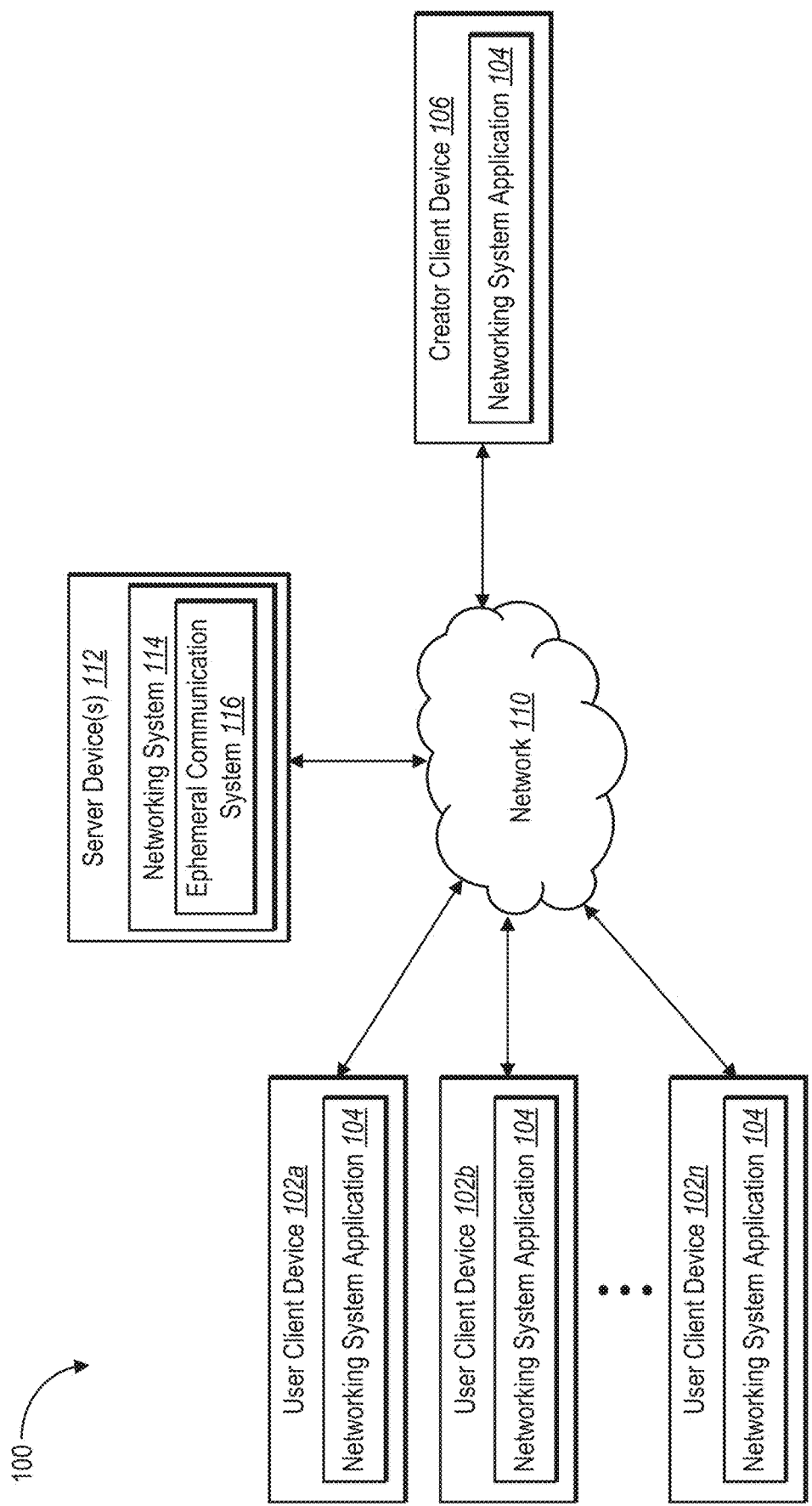
FIG. 1 illustrates a diagram of a system in which an ephemeral communication system can operate in accordance with one or more embodiments.

This disclosure describes one or more embodiments of an ephemeral communication system that can facilitate group messaging threads associated with ephemeral content. For instance, in various embodiments, the networking system enables the creation and management of group messaging threads associated with ephemeral content based on user interactions with group messaging graphical elements displayed within the ephemeral content. In this manner, the creator of ephemeral content and user viewing the ephemeral content can participate in a group messaging thread related to the ephemeral content. As described herein, the system can provide efficient creation, moderation, utilization, and management of the group messaging threads associated with ephemeral content.

To illustrate, in one or more embodiments, the ephemeral communication system can receive a selection from a creator client device of a group messaging graphical element for inclusion in ephemeral content. In response, the ephemeral communication system can provide the group messaging graphical element within the ephemeral content. Further, the ephemeral communication system can detect a user interaction with the group messaging graphical element from a user client device that requests participation in a group messaging thread associated with the ephemeral content. Then, the ephemeral communication system can notify the creator client device of the request to participate in a group messaging thread associated with the ephemeral content (or of another user client device automatically joining to the group messaging thread). Upon receiving the corresponding creator and/or user input, the system can create and/or maintain the associated group messaging thread.

To provide context, the ephemeral communication system can facilitate the generation and distribution of ephemeral content. More specifically, the ephemeral communication system can receive creator interaction from a creator client device generating ephemeral content and specifying an audience and presentation time for the ephemeral content. Based on this creator interaction, the ephemeral communication system can generate and provide the ephemeral content to the creator client device and to user client device(s) (e.g., via a networking system). Additionally, the ephemeral communication system can generate and provide ephemeral content including a group messaging graphical element.

The ephemeral communication system can generate a group messaging graphical element for inclusion in ephemeral content. For example, in a number of embodiments, the ephemeral communication system can generate a group messaging graphical element, including text, graphics (e.g., images, animations), or a combination of texts and graphics. In some embodiments, the ephemeral communication system can generate the group messaging graphical element based on creator input (e.g., user input of a name for the group messaging thread, color selection, etc.) via the creator from the creator client device.

In various embodiments, upon receiving the ephemeral content and/or a selection of the group messaging graphical element from the creator (e.g., via the creator client device), the ephemeral communication system can provide the ephemeral content to users (e.g., co-users of the user within a networking system). More specifically, the ephemeral communication system can provide the ephemeral content to the user connected to the creator within a networking system via user client devices associated with the users with the group messaging graphical element is embedded within the ephemeral content.

As mentioned above, in one or more embodiments, the group messaging graphical element is a user interface element corresponding to a group messaging thread associated with the group messaging thread. For example, the group messaging graphical element can provide users with access to the group messaging thread associated with the ephemeral content. More specifically, the ephemeral communication system can enable users to select the group messaging graphical element within ephemeral content shared by the creator to request access and/or join the group messaging thread associated with the group messaging thread.

As mentioned above, the ephemeral communication system can detect user interactions with the group messaging graphical element that request participation in the group messaging thread associated with the ephemeral content. In one or more embodiments, the ephemeral communication system provides these requests from one or more users to join the group messaging thread to the creator via the creator client device. In alternative embodiments, the ephemeral communication system can automatically add requesting users to a group messaging thread based on one or more settings received from the creator via the creator client device.

Additionally, as discussed briefly above, the ephemeral communication system can generate a group messaging thread associated with the ephemeral content. In one or more embodiments, the ephemeral communication system generates the group messaging thread in response to detecting creator input from the creator client device indicating a selection of one or more user for inclusion in the group messaging thread. Indeed, as detailed below, the ephemeral communication system can generate the group messaging graphical element at a predetermined time or in response to a particular event. Upon generation of the group messaging thread, the ephemeral communication system can notify the creator client device and/or user client devices who requested to join the group messaging thread.

The ephemeral communication system can also enable a creator or other authorized user to manage settings of the group messaging thread. For example, in various embodiments, the ephemeral communication system can provide the creator client device with one or more graphical user interfaces that include requests from other users to join the group messaging thread while the group messaging thread is active. Additionally, in one or more embodiments, the ephemeral communication system provides various graphical user interfaces to the creator client device to facilitate multiple settings. For example, the ephemeral communication system can facilitate adding and removing users to and from the group messaging thread. The ephemeral communication system can also facilitate a maximum membership limit as well as leaving or ending the group messaging thread.

The ephemeral communication system many advantages and benefits over conventional systems and methods. For instance, by providing a group messaging thread associated with ephemeral content and a group messaging graphical element, the ephemeral communication system improves flexibility relative to conventional systems. For example, the ephemeral communication system facilitates providing ephemeral content to a wider audience while simultaneously providing a means for focused discussion to interested user client devices. In contrast to generalized comment sections of conventional systems, the ephemeral communication system provides a framework, including a graphical user interface that facilitates organized discussion.

To illustrate, the ephemeral communication system includes group messaging graphical elements associated with group messaging threads within ephemeral content. Thus, the ephemeral communication system allows the creator client device to reach a larger audience of user client devices with the ephemeral content while also providing a focused and organized discussion of a particular topic related to the ephemeral content. Further, by providing group messaging graphical elements for use in ephemeral content, the ephemeral communication system ensures that ephemeral content can always have a digital location and communication environment for discussion, as opposed to conventional systems, which often do not have a communication environment for topic-specific discussions. Thus, the ephemeral communication system provides a flexible system that allows for topical discussion while avoiding a siloed experience.

Further, the ephemeral communication system provides increased efficiency by providing different ways to interface with shared content based on creator and user needs, in contrast to the one-size-fits-all approach of conventional systems. For example, the ephemeral communication system provides both a user interface, including more generalized content and a streamlined option to funnel into an interface more conducive to topical discussion. By providing the group messaging graphical element within the ephemeral content, the ephemeral communication system provides an efficient option for user client devices to transition to a user interface better suited to facilitate more specific conversation.

The ephemeral communication system can also provide increased efficiency by organizing discussion into group messaging threads. For example, the ephemeral communication system provides a graphical user interface that facilitates easy navigation to locate desired discussion. By providing a group messaging graphical element that communicates the existence of the group messaging thread focused on a particular piece of ephemeral content, the ephemeral communication system facilitates an efficient communication environment for such discussion. Indeed, rather than requiring a creator or users to scroll through unwanted content in order to locate desired discussion, which unwanted content their client device must unnecessarily download and process, the ephemeral communication system provides an efficient and streamlined way to access topical discussion.

Moreover, this efficient location further provides efficiencies in processing. For example, the organization allows users to easily determine the state of discussion, which reduces or eliminates posting of unnecessarily repetitive or even duplicative postings. Further, such efficiency in location of desired discussion prevents users from spending system resources searching for content that is not present on the system.

Additionally, the ephemeral communication system conserves system resources by allowing users to request and join group messaging threads associated with ephemeral content that is of interest to the users. That is, rather than requiring a creator to send numerous message invitations to a large number of users to join a group messaging thread—many of which will be ignored or rejected, the ephemeral communication system provides the group messaging graphical element within ephemeral content to allows users to selectively request to join the group messaging thread associated with the ephemeral content. Accordingly, the ephemeral communication system can prevent waste of computing resources by preventing uninterested users from congesting a group messaging thread and preventing other willing users from participating. Thus, the ephemeral communication system provides a variety of advantages over conventional systems for both efficiency and flexibility.

Further, the ephemeral communication system provides tools that reduce or eliminate various navigation steps. For example, by placing the group messaging graphical element within ephemeral content provided to a variety of user devices, the ephemeral communication system eliminates navigation steps (i.e., reduces the number of steps) needed to search for and locate topical discussion of content. Indeed, upon selecting the group messaging graphical element, users can be automatically redirected from the ephemeral content to the group messaging thread without requiring users or their corresponding client devices to perform additional step or actions. Additionally, as mentioned above, the ephemeral communication system eliminates steps for the creator client device because the creator client device need not send invitations for discussion, including eliminating the need to select users to invite. Thus, the ephemeral communication system provides a variety of advantages over conventional systems for both efficiency and flexibility.

As illustrated by the foregoing discussion, the present disclosure utilizes a variety of terms to describe features and advantages of the ephemeral communication system. Additional detail is now provided regarding the meaning of such terms. For example, the term "user" refers to an entity (individual, representative, administrator, or business) who utilizes a networking system platform to view, access, share, or provide digital content. In particular, a user can include an individual associated with a user client device and a user account on a networking system. In addition, a user can include an individual who receives and/or provides digital content via a networking system.

Similarly, as used herein, the term "creator" can refer to a type of user that also creates, shares and/or provides digital content, including ephemeral and non-ephemeral content. More specifically, a creator can include a user of a networking platform associated with a creator client device who creates and submits ephemeral content, including a group messaging graphical element. In general, a creator shares digital content with one or more other users (e.g., co-users) of a networking system (e.g., a social networking system). For instance, the creator specifies the users who are the receive the digital content via the networking system (e.g., the creator selects a closed group of user, a private or public user group, or the public).

Further, as used herein, the term "ephemeral content" refers to visual content that expires or disappears from view after a specified event or a predetermined time. In particular, ephemeral content can include text, audio, images, animations, or a combination thereof for which access to other users is removed based on the occurrence of the specified event or the arrival of the predetermined time. Some examples of ephemeral content can include a video or digital image that expires from an inbox, a timeline, or newsfeed. In one or more embodiments, ephemeral content expires after a viewer has viewed it once, twice, or some other multiple. As mentioned above, in some embodiments, ephemeral content expires a predetermined time period, such as twenty-four hours or ten minutes.

Ephemeral content can include digital content that is generated via a creator device and based on creator input. Additionally, ephemeral content can include digital content that is shared by a creator via a creator device, provided to a networking system, and in turn distributed to user devices via the networking system. While ephemeral content is described with respect to a networking system, ephemeral content can be utilized in a variety of systems and contexts.

Additionally, as used herein, the term "group messaging graphical element" refers to a user interface element made up of text, an image, and/or an animation that is associated with digital content. In particular, group messaging graphical element can include a movable user interface element that can be placed in digital content (e.g., ephemeral content or other digital content). Additionally, a group messaging graphical element scan include a selectable user interface element that can change in response to user selection within the digital content.

Examples of group messaging graphical elements can include a digital sticker with the words "Join Now," a chat bubble icon, or a button including the text "Join" before selection and the text "Joined" or "Requested" after selection. Additionally, a group messaging graphical element can include a sticker with a countdown to an event (e.g., an event corresponding to a group messaging thread), a graphic including information and/or a call to action, or a graphic with a countdown to a future event. A group messaging graphical element can also include a graphical element included in non-ephemeral content (e.g., selected by a creator for inclusion in a non-ephemeral content post).

Also, as used herein, the term "countdown graphical element" refers to a user interface element related to a time, date, and/or event. In particular, a countdown graphical element can include a movable user interface element reflecting a time, date, and/or event that can be placed within digital content. To illustrate, a countdown graphical element can include a graphical representation and/or textual representation of a particular time, date, and/or event. For example, a countdown graphical element can portray a clock with a particular time, a button portraying a calendar date, or a countdown to a particular date and/or time (e.g., a time and date at which an associated group messaging thread expires).

In many embodiments, a group messaging graphical element corresponds to a group messaging thread associated with ephemeral content. For example, a group messaging thread may be associated with a particular group messaging graphical element that is included in one or more pieces of ephemeral content. Consequently, that ephemeral content can also be associated with the group messaging thread. For example, users of a networking system can view ephemeral content that includes a group messaging graphical element that references a group messaging thread corresponding to the ephemeral content.

Further, as used herein, the term "group messaging thread" refers to a digital communication between two or more users (e.g., via user client devices and/or creator client devices). In particular, a group messaging thread can include digital communication including shared text, digital images, digital video, and other multimedia. In some embodiments, a group messaging thread can include a digital communication between two or more users related to ephemeral content and/or a group messaging graphical element. Additionally, a group messaging thread can be managed based on one or more creator settings and/or default settings. For example, a group messaging thread can expire, increase or decrease in number of participants (e.g., based on the creator adding or removing members), and/or include a membership limit.

Additionally, as used herein, the term "maximum membership limit" refers to a maximum number of people permitted to participate in a group at the same time. In some instances, the maximum membership limit is set by creator input indicating group messaging thread settings during generation of a group messaging graphical element and/or a group messaging thread, or by creator input through settings corresponding to the group messaging thread after generation of a group messaging thread. In various embodiments, the maximum membership limit is set by the networking system. For instance, the maximum membership limit is based on technical limitations of the networking system and/or corresponds to a default number provided by the networking system. Examples of a maximum membership limit can include 4, 10, 50, 100 or more members.

Turning now to the figures, FIG. 1 illustrates a schematic diagram of a system 100 within which one or more systems, non-transitory computer-readable media, and methods described herein can be implemented. As illustrated in FIG. 1, the system 100 includes one or more server device(s) 112 connected to one or more user client devices 102a, 102b, 102n, and a creator client device 106 via a network 110. Examples of computing device, such as server devices and client devices as well as of networks are described in more detail below with respect to FIG. 12.

As shown, the one or more server device(s) 112 include a networking system 114 having an ephemeral communication system 116. As also shown, the user client device(s)

102a-102n each includes an instance of a networking system application 104. Further, the creator client device 106 also includes an instance of the networking system application 104.

As mentioned above, the system 100 includes the server device(s) 112. In one or more embodiments, the server device(s) 112 may generate, store, receive, and transmit a variety of types of data, including networking data and digital content items shared by users of the networking system 114. For example, the server device(s) 112 can be a content server, an application server, a communication server, a web-hosting server, a social networking server, or a digital content campaign server. To illustrate, the server device(s) 112 receive data from a client device, such as the creator client device 106, and send the data to another client device, such as one of the user client device(s) 102a-102n. The server device(s) 112 can also transmit messages and message requests between one or more users of the system 100. In one example embodiment, the server device(s) 112 is a data server. The server device(s) 112 can also comprise a communication server or a web-hosting server. Additional detail regarding the server device(s) 112 is provided below with respect to FIG. 12.

As shown, the server device(s) 112 includes the networking system 114 and the ephemeral communication system 116. Indeed, in one or more embodiments, the networking system 114 can implement all or a portion of the networking system 114 and/or the ephemeral communication system 116. The networking system 114 can connect users to each other and enable users to share content items with each other, including ephemeral content. For instance, the networking system 114 can make the digital content (e.g., ephemeral and non-ephemeral content) available for viewing by users via the networking system 114. For example, the networking system 114 provides ephemeral content that includes photographs, videos, gifs, graphical elements, and/or various other forms of digital media content. Further, in some embodiments, the networking system 114 can include a social networking system, an ephemeral communication system, or another type of networking system that enables users to communicate with each other. Additional detail regarding the networking system 114 is provided below in connection with FIGS. 13 and 14.

The ephemeral communication system 116, as mentioned above, enables users to better engage with co-users of the networking system 114. In particular, the ephemeral communication system 116 generates, maintains, and provides ephemeral content, including a group messaging graphical element via the networking system 114. In one or more embodiments, the ephemeral communication system 116 facilitates the generating ephemeral content based on creator input received via the creator client device 106. In some embodiments, the ephemeral communication system 116 causes the ephemeral content disappears after a predetermined time period (e.g., a time period defined by the creator client device). Additionally, the ephemeral communication system 116 facilitates generating and maintaining a group messaging thread associated with a group messaging graphical element within ephemeral content. In addition to the description of the ephemeral communication system 116 provided above, further detail is provided below in subsequent figures with respect to example embodiments of the ephemeral communication system 116.

The networking system 114 and/or the ephemeral communication system 116 can comprise one or more applications running on the server device(s) 112 or a portion can be downloaded from the server device(s) 112. For example, the ephemeral communication system 116 can include a web hosting application that allows the client devices (i.e., the creator client device 106 and the user client device(s) 102a-102n) to interact with digital content hosted at the server device(s) 112. To illustrate, in one or more embodiments of the system 100, one or more user client device(s) 102a-102n can run a web application (e.g., a web browser) to allow users to access, view, and/or interact with a webpage or website hosted at the server device(s) 112.

As mentioned above, the client devices (i.e., the creator client device 106 and the user client device(s) 102a-102n) can include the networking system application 104. The networking system application 104 can include any one of various types of user applications. As mentioned above, the networking system application 104 can be an online application (e.g., a web browser), and users at the user client device(s) 102a-102n can enter a Uniform Resource Locator (URL) or other address directing the web browser to the server device(s) 112. Alternatively, the networking system application 104 can be a different native application developed for use on the user client device(s) 102a-102n. Indeed, as mentioned above, the networking system application 104 can be a software application of the networking system 114 that enables the networking system 114 to provide and display digital content items, including ephemeral content on the client devices. Additionally, the networking system application 104 can receive user input at a client device and provide information corresponding to the user input to the networking system 114.

Although FIG. 1 illustrates a particular arrangement of the user client device(s) 102a-102n, creator client device 106, network 110, and server device(s) 112, the system 100 can implement alternative configurations. For example, the server device(s) 112 communicate directly with one or more of the user client device(s) 102a-102n, bypassing the network 110.

Similarly, although the system 100 of FIG. 1 includes various components, the system 100 can include additional or alternative components. For example, the system 100 can include any number of server devices that implement the networking system 114 and/or the ephemeral communication system 116. As another example, both the networking system 114 and the ephemeral communication system 116 can be implemented in a single computing device (e.g., a server device).

To illustrate, while not shown, in some embodiments, the system 100 includes a social networking system implemented on one or more server devices. When the social networking system is included in the system 100, users of the social networking system may be able to use the features and functionalities of the networking system 114 and/or ephemeral communication system 116. For example, in some embodiments, the ephemeral communication system 116 is part of, or directly connected to, the social networking system. In alternative embodiments, the ephemeral communication system 116 is separate from the social networking system, but users of the social networking system can access digital content items of the ephemeral communication system 116 via the social networking system. Additional detail regarding social networking systems is provided below in connection with FIGS. 13 and 14.

As discussed above, the ephemeral communication system 116 can generate, provide, and maintain ephemeral contents corresponding group messaging threads. To illustrate, FIG. 2 shows a sequence diagram of generating and providing a group messaging thread associated with ephemeral content in accordance with one or more embodiments.

Figure 2:
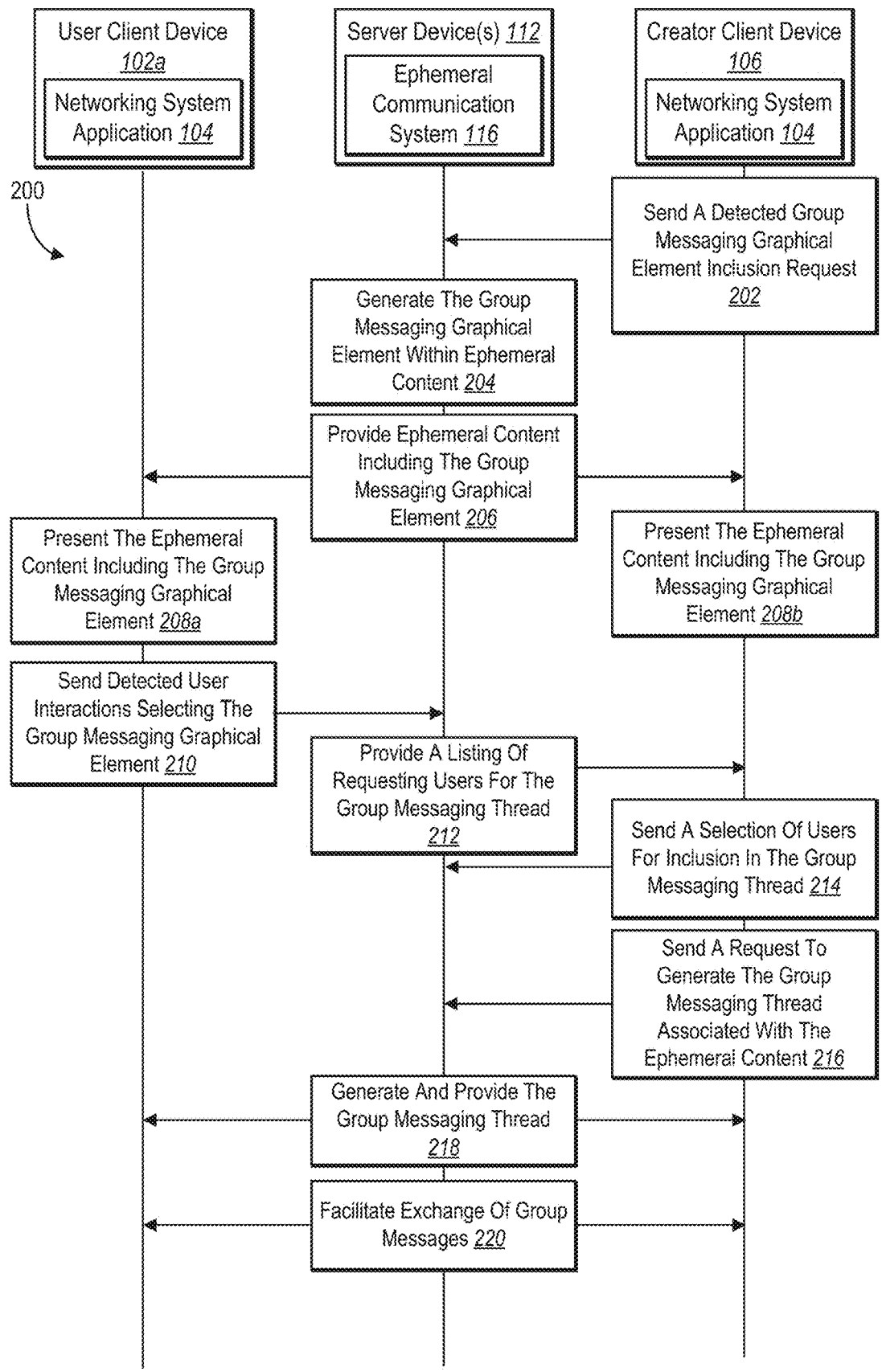
FIG. 2 illustrates a process for generating and providing a group messaging thread associated with ephemeral content in accordance with one or more embodiments.

As shown, FIG. 2 includes the user client device 102a having the networking system application 104, the server device(s) 112 including the ephemeral communication system 116, and the creator client device 106 including then networking system application 104. The systems and client devices shown in FIG. 2 can represent example embodiments of corresponding systems and client devices described with respect to FIG. 1. For example, while not shown, the ephemeral communication system 116 in FIG. 2 can reside within the networking system 114 previously described.

More specifically, FIG. 2 illustrates a series of acts 200 of the user client device 102a, the creator client device 106, and the ephemeral communication system 116 communicating with each other with respect to ephemeral content. For context, the creator client device 106 can share content (e.g., ephemeral content) with a user associated with the user client device 102a via the networking system and/or the ephemeral communication system 116. The ephemeral communication system 116 can facilitate customized ephemeral content based on received creator input (e.g., user input from the creator). Further, the ephemeral communication system 116 can provide the ephemeral content to a variety of co-users of the networking system based on selections provided by the creator.

In connection with sharing ephemeral content with other users, the ephemeral communication system 116 can enable the creator to add a group messaging thread with respect to the ephemeral content. For example, the ephemeral communication system 116 can provide (directly or indirectly) the networking system application 104 on the creator client device 106 with graphical user interface options to detect user input from the creator requesting that a group messaging thread be associated with one or more pieces of ephemeral content.

To illustrate, FIG. 2 shows that the creator client device 106 (e.g., the networking system application 104) can perform the act 202 of sending a detected group messaging graphical element inclusion request to the ephemeral communication system 116. For example, the creator client device 106 detects creator input from the creator selecting a generic group messaging graphical element to include within the ephemeral content, which signals a group messaging thread associated with the ephemeral content. For example, the creator client device 106 can detect creator input from the creator selecting a group messaging graphical element within a graphical user interface that displays a menu of various group messaging graphical elements (e.g., see FIG. 3B).

As mentioned above, the creator client device 106 can include a graphical user interface having customization options with respect to ephemeral content. In various embodiments, these customization options can include options with respect to group messaging graphical elements. While customizing a group messaging graphical element is further discussed below, a few customization examples include the ephemeral communication system 116 (e.g., via the creator client device 106) enabling the creator to edit the name, size, and location of a group messaging graphical element. Accordingly, the creator client device 106 can detect creator input with respect to customizing a group messaging graphical element.

As also mentioned above, the act 202 can include the creator client device 106 sending the detected group messaging graphical element inclusion request to the ephemeral communication system 116 on the server device(s) 112. For example, the creator client device 106 provides, and the ephemeral communication system receives, the creator input request to include a group messaging graphical element within the ephemeral content.

Upon receiving the creator input selecting a group messaging graphical element to include within ephemeral content, as shown in FIG. 2, the ephemeral communication system 116 can perform the act 204 of generating the group messaging graphical element within ephemeral content. In particular, the ephemeral communication system 116 can generate the ephemeral content and include the group messaging graphical element. For example, the ephemeral communication system 116 can include the group messaging graphical element as an overlay on a digital image or digital video included in the ephemeral content.

As mentioned, the received creator input selection can include one or more customizations of the ephemeral content and/or the group messaging graphical element. For example, the ephemeral communication system 116 can facilitate customizing the name of the group messaging graphical element based on creator input. Additionally, the ephemeral communication system 116 can customize the appearance of the group messaging graphical element (e.g., color, shape, size). Indeed, the ephemeral communication system 116 can generate the group messaging graphical element and the ephemeral content in accordance with a variety of creator customizations.

As also shown, the ephemeral communication system 116 can perform the act 206 of providing ephemeral content including the group messaging graphical element to the user client device 102a as well as the creator client device 106. Further, as will be discussed in greater detail with regard to FIG. 3D, the ephemeral communication system 116 can provide the ephemeral content to one or more co-users (i.e., users) of the networking system according to creator input selections of the creator received from the creator client device 106. For example, the ephemeral communication system 116 can provide the ephemeral content to users directly connected to the creator via the networking system (e.g., "friends") or to a customized group of users (e.g., "close friends").

FIG. 2 illustrates that the user client device 102a can perform the act 208a of presenting the ephemeral content including the group messaging graphical element to a user associated with user client device 102a. For example, the user client device 102a displays the ephemeral content utilizing the networking system application 104. Similarly, the creator client device 106 can perform the act 208b of presenting the ephemeral content including the group messaging graphical element to the creator at the creator client device 106.

In one or more embodiments, the user client device 102a and/or the creator client device 106 present the ephemeral content in response to detecting user input to view the ephemeral content. For example, the user client device 102a detects a user providing user input with respect to an element corresponding to the ephemeral content. In some embodiments, the element corresponding to the ephemeral content is a thumbnail image corresponding to a creator of ephemeral content or a thumbnail image displaying a portion of the ephemeral content. Further, one of the client devices can present the ephemeral content in response to receiving user input with respect to the user profile of the creator. As another example, one of the client devices can present the ephemeral content within a social networking feed (e.g., a feed provided by a networking system).

As mentioned above, ephemeral content can expire and/or be temporarily displayed. For instance, the ephemeral content can be accessible and available on the user client device 102*a* for a predefined period of time as specified by the creator via creator input. For example, in one or more embodiments, ephemeral content expires at a predetermined time (e.g., 24-hours after being published) regardless of if users have viewed the ephemeral content.

In connection with presenting the ephemeral content, the user client device 102*a* and/or the creator client device 106 can also present the group messaging graphical element within the ephemeral content. Indeed, presenting the ephemeral content can include presenting the group messaging graphical element and any other graphical elements included within the ephemeral content.

Additionally, as shown in FIG. 2, the user client device 102*a* can perform the act 210 of sending detected user interactions selecting the group messaging graphical element. More specifically, the user client device 102*a* can detect a user interaction of the user associated with the user client device 102*a* activating the group messaging graphical element within the ephemeral content while viewing the ephemeral content.

In one or more embodiments, the detected user interaction indicates or signals a request by the user to join the group messaging thread associated with the ephemeral content. In these embodiments, the user client device 102*a* can send the detected interaction to the ephemeral communication system 116. Additionally, as will be discussed in greater detail with regard to FIGS. 6A-6B, the ephemeral communication system 116 (e.g., via the creator client device 106) can receive the requests by the user to join the group messaging thread and modify the appearance of the group messaging graphical element in response to receiving this user interaction.

As shown in FIG. 2, upon receiving the detected user interaction from the user client device 102*a*, the ephemeral communication system 116 can perform the act 212 of providing a listing of requesting users for the group messaging thread to the creator client device 106. Though FIG. 2 illustrates only the user client device 102*a* sending detected user interactions, the ephemeral communication system 116 can receive any number of user interactions from the user client device(s) 102*a*-102*n*. Indeed, the ephemeral communication system 116 can utilize these interactions to identify requesting users based on the user client device(s) 102*a*-102*n* that send detected user interactions selecting the group messaging graphical element.

More particularly, the ephemeral communication system 116 can determine users associated with the user client device(s) 102*a*-102*n* and/or with user networking accounts on the user client device(s) 102*a*-102*n*. For example, the ephemeral communication system 116 can utilize a user identifier received in conjunction with the user selection and/or the user client device 102*a*. The ephemeral communication system 116 can then determine a user and/or user account based on the user identifier. Based on these determined users, the ephemeral communication system 116 generates a listing of requesting users. In one or more embodiments the listing can include user identifiers and/or profile images corresponding to the users.

In addition, the ephemeral communication system 116 can provide the listing of requesting users for the group messaging thread to the creator client device 106. For example, the ephemeral communication system 116 can provide a list of user identifiers, user accounts, and/or corresponding user profile images. The creator client device 106 can present the list of requesting users for creator selection and/or approval for inclusion in a group messaging thread. Additionally, the ephemeral communication system 116 can also provide options corresponding to the listed users.

As shown, the creator client device 106 can perform the act 214 of sending a selection of users for inclusion in the group messaging thread. For example, the creator client device 106 can detect selection by the creator approving one or more of the requesting users from the listing of requesting users to join the group messaging thread. As will be discussed in greater detail below with regard to FIG. 5B, the creator client device 106 can detect a selection or deselection of a user at a graphical user interface element corresponding to that user. Then, as described above, after the creator client device 106 detects the creator selections approving users to join the group messaging thread, the creator client device 106 can provide the detected creator selections to the ephemeral communication system 116.

Further, as shown in FIG. 2, the creator client device 106 can perform the act 216 of sending a request to generate the group messaging thread associated with the ephemeral content. For example, the creator client device 106 can detect creator input at a graphical user interface element corresponding to starting the group messaging thread associated with ephemeral content. Upon receiving this creator input, the creator client device 106 can provide the creator input to the ephemeral communication system 116.

In one or more embodiments, detected creator input selection confirms the selection of the one or more users for inclusion in the group messaging thread. Indeed, in various embodiments, the acts 214 and the act 216 are performed together. For example, the creator client device 106 provides the list of approved users to join the group messaging thread to the ephemeral communication system 116 in connection with a request to generate or activate the group messaging thread.

Upon receiving the detected creator input, the ephemeral communication system 116 can perform the act 218 of generating and providing the group messaging thread to the user client device 102*a* and the creator client device 106. For example, the ephemeral communication system 116 can generate the group messaging thread associated with the ephemeral content and include the users approved by the creator (e.g., as indicated from the selection of the creator shown in act 216). In addition, as mentioned above, the ephemeral communication system 116 can provide the group messaging thread to the user client device 102*a* based on the selection of the creator. Further, while FIG. 2 illustrates the ephemeral communication system 116 providing the group messaging thread to the user client device 102*a*, the ephemeral communication system 116 can provide the group messaging thread to any number of the user client device(s) 102*a*-102*n* based on creator selection of the creator.

In one or more embodiments, the ephemeral communication system 116 can generate the group messaging thread in accordance with creator settings, including creator customization selected during the creation of the group messaging graphical element. For example, the ephemeral communication system 116 assigns a name to the group messaging thread specified via creator input (e.g., a customized setting) for the group messaging graphical element. As another example, the ephemeral communication system 116 can generate the group messaging thread with creator-designated administrators and/or creator-designated notification settings. As will be discussed in greater detail below with regard to FIGS. 8-9, the ephemeral communication system 116 can provide and implement a variety of customization settings with respect to a group messaging thread.

As also shown in FIG. 2, the ephemeral communication system 116 can perform the act 220 of facilitating the exchange of group messages. For example, the ephemeral communication system 116 can enable the creator client device 106 to send and receive group message content. Additionally, the ephemeral communication system 116 can also enable the user client device 102a to send and receive group message content. Indeed, the ephemeral communication system 116 can facilitate the exchange of group message content (e.g., sending and receiving messages) via the group messaging thread between client devices. In various embodiments, the group message content can include text, audio, video, images, gifs, and/or other multimedia.

In one or more embodiments, based on providing the group messaging thread to the user client device 102a and/or the creator client device 106, the ephemeral communication system 116 may also generate and provide various notifications. For example, the ephemeral communication system 116 can generate and provide a notification to the user client device 102a when new content is posted to the group messaging thread. Additionally, the ephemeral communication system 116 can generate and provide a notification to the creator client device 106 when additional users are requesting to join the group messaging thread and/or when one of the customized settings for the group messaging thread is activated.

In various embodiments, the ephemeral communication system 116 can facilitate adding additional users to the group messaging thread after the group messaging thread has already been created. For example, the ephemeral communication system 116 can continue to receive requests from users to join the group messaging thread, as described above in connection with the acts 208a and 210 (e.g., via detected user interaction with the group messaging graphical element within the ephemeral content). Further, the ephemeral communication system 116 can provide these requests to the creator client device 106 in a similar manner as described with respect to the act 212.

Furthermore, the ephemeral communication system 116 can receive approval from the creator (e.g., via the creator client device 106) to include the additional requesting users in the group messaging thread, as described in connection with the act 214 In response to receiving the additionally approved users, the ephemeral communication system 116 can provide access to the group messaging thread to the additional users. In some embodiments, the ephemeral communication system 116 can generate and provide a notification to the additional users that they have been granted access to the group messaging thread.

While FIG. 2 includes a particular series of acts 200, these acts are merely illustrative and not restrictive. For instance, the series of acts 200 described in FIG. 2 may be performed with less or more acts and/or performed in differing orders. Further, as described above, a portion of the ephemeral communication system 116 may be located on the creator client device 106 and perform some or all of the acts described in connection with the creator client device 106 (and vice versa). For example, the act 204 can be performed by the creator client device 106 based on instructions provided (directly or indirectly) by the ephemeral communication system 116.

FIGS. 3A-3D illustrate graphical user interfaces for generating a group messaging graphical element within ephemeral content on a creator client device in accordance with one or more embodiments. More specifically, FIG. 3A-3D include a creator client device 310 that displays example graphical user interfaces 311a-311d for selecting a group messaging graphical element to include in an instance of ephemeral content (e.g., a video captured by the creator device). The creator client device 310 shown in FIGS. 3A-3D can represent one or more example embodiments of the creator client device 106 disclosed above.

As shown in FIG. 3A, the creator client device 310 can present a first networking feed user interface 311a. In one or more embodiments, the creator client device 310 can present the first networking feed user interface 311a based on one or more connections of the creator client device 310. For example, the networking system can provide networking posts from connected co-users of the networking system. Additionally, the networking system can provide ephemeral content from connected co-users of the networking system. The networking system can facilitate the sharing of various kinds of multimedia, including digital images, digital video, gifs, and text.

As FIG. 3A illustrates, the first networking feed user interface 311a can include an ephemeral content generation selectable element 300 (e.g., a button with a "+" sign and the text "Your Story"). As shown in FIG. 3A, the user client device 102a can present the ephemeral content generation selectable element 300 alongside other graphical user interface elements corresponding to ephemeral content. While one example of an ephemeral content generation selectable element 300 is shown, the user client device 102a can present the ephemeral content generation selectable element 300 in accordance with a variety of designs that convey to the user that selection will initiate a process for generating ephemeral content.

Upon detecting a selection of the ephemeral content generation selectable element 300, the creator client device 310 can present an updated graphical user interface for generation of ephemeral content 313. The ephemeral communication system 116 can generate ephemeral content 313, including a variety of types of multimedia. For example, the ephemeral communication system 116 can capture, receive, and/or upload digital content such as digital video, digital images, gifs, and other digital content. Further, the ephemeral communication system 116 can receive creator input selecting digital content for submission as ephemeral content 313 (e.g., as a digital story). Based on this user input, the ephemeral communication system 116 can generate the ephemeral content 313.

In addition to generating ephemeral content, the ephemeral communication system 116 can facilitate customization of ephemeral content 313. As shown in FIG. 3B, the creator client device 310 can present an ephemeral content customization user interface 311b for customization of ephemeral content provided by the creator. The creator client device 310 can present a variety of graphical elements (e.g., icons, buttons, labels, menus, etc.) with a variety of shapes, sizes, formats, and functionalities. For example, the user client device can present graphical elements that provide interaction options for users interacting with the ephemeral content.

As shown in FIG. 3B, the creator client device 310 can present an ephemeral content toolbar 301. The ephemeral content toolbar 301 can include a variety of options for interacting with the ephemeral content 313. For example, the ephemeral content toolbar 301 can include options for applying a filter to ephemeral content, saving (e.g., downloading) ephemeral content, adding a tag or a link within ephemeral content, adding a graphical element (e.g., sticker) to ephemeral content, drawing on ephemeral content (e.g., via a touch screen), or adding text to ephemeral content. In particular, as shown, the ephemeral content toolbar 301 includes a graphical elements tool 302, which enables the user to add one or more graphical elements to the ephemeral content 313.

The creator client device 310 can modify the ephemeral content 313 based on creator input received at the ephemeral content toolbar 301. For example, upon receiving creator selection of the graphical elements tool 302, the creator client device 310 can update the ephemeral content customization user interface 311b to display the graphical elements menu 303 (e.g., over the ephemeral content 313). The graphical elements menu 303 can include a variety of graphical element options corresponding to graphical elements that can be selected for inclusion in the ephemeral content 313. In some embodiments, the graphical element menu 303 can include a variety of icons corresponding to various the graphical element options. Also, as shown in FIG. 3B, the graphical element menu 303 can include a search bar that can receive input via the creator client device 310 and return graphical elements corresponding to the search.

As shown in FIG. 3B, the graphical element menu 303 can include a group messaging graphical element option 304 (e.g., represented by an icon of a chat bubble and the text "chat"). The group messaging graphical element option 304 can correspond to a generating a group messaging graphical element that links to a group messaging thread, which is created and maintained with respect to the ephemeral content 313, as further described below. Upon detecting a selection of the group messaging graphical element option 304, the creator client device 310 can enable the creator to customize a group messaging graphical element that is added to the ephemeral content 313. For example, the creator client device 310 can receive creator input customizing the name or appearance of the group messaging graphical element as it appears within the ephemeral content 313, as shown below in connection with FIG. 3C.

Additionally, the graphical element menu 303 can include the countdown graphical element option 305. In response to detecting creator input at the countdown graphical element option 305, the creator client device 310 can enable the creator to specify countdown settings for a countdown graphical element before it is included within the ephemeral content 313. For example, creator client device 310 can detect creator input customizing a date and/or time of when the countdown graphical element will expire.

In one or more embodiments, the ephemeral communication system 116 can display a countdown graphical element within the ephemeral content 313 in conjunction with a group messaging graphical element. For example, the countdown graphical element can count down to an event corresponding to a group messaging graphical element. In some embodiments, the countdown graphical element can correspond to the generation or termination of the group messaging thread associated with the ephemeral content 313. In one or more embodiments, the countdown graphical element option 305 itself can facilitate access to the group messaging thread upon being selected. Indeed, the countdown graphical element option 305 can be shown in place of the group messaging graphical option 306 in the ephemeral content 313 and can include the functionality of the group messaging graphical element option 304, as described above.

Similarly, as shown in FIG. 3B, the graphical element menu can include the timing graphical option 306. In various embodiments, a timing graphical element can include a particular time, the time of day corresponding to a creator-selected time zone, or any selected time. For example, when included in the ephemeral content 313, a timing graphical 306 displays the local time of the creator.

In response to detecting creator input at the timing graphical option 306, the creator client device 310 can query the creator to customize the timing graphical element before it is included in the ephemeral content 313. For example, the creator client device 310 can receive creator input modifying the appearance (e.g., size, shape, font, positioning, etc.) and time for display of the timing graphical element 306. In addition, the creator client device 310 can receive creator input customizing the functionality of a timing graphical element, as provided above.

In one or more embodiments, the ephemeral communication system 116 can provide a timing graphical element in conjunction with the group messaging graphical element. For example, a timing graphical element displayed within the ephemeral content 313 can include a time corresponding to a group messaging graphical element also displayed within the ephemeral content 313, such as the time that a group messaging thread will be generated or terminated.

In some embodiments, the timing graphical element itself can facilitate access to the group messaging thread upon being selected. Indeed, the timing graphical element can be shown in place of the group messaging graphical element in the ephemeral content 313 and can include the functionality of the group messaging graphical element, as described above. Indeed, each of the graphical elements shown in connection with the graphical element menu 303 can link to the group messaging thread associated with the ephemeral content 313.

As discussed above, the ephemeral communication system 116 can generate a group messaging thread in connection with generating a group messaging graphical element. To illustrate, FIG. 3C shows an ephemeral content creation user interface 311c showing the ephemeral communication system 116 generating a group messaging graphical element 308 within the ephemeral content 313. For example, the ephemeral communication system 116 generates the group messaging graphical element 308 in response to the creator selecting the group messaging graphical element option 304.

As part of generating the group messaging graphical element 308, the creator client device 310 (e.g., as directed by the ephemeral communication system 116) can enable the creator to customize the appearance of the group messaging graphical element 308. For example, the creator client device 310 can provide the creator with options within the ephemeral content creation user interface 311c to modify the name 307 of the group messaging graphical element, move the location of the group messaging graphical element 308 within the ephemeral content 313, change the size of the group messaging graphical element 308, or perform other modifications. Additionally, while the group messaging graphical element 308 is a selectable element (e.g., a button) that includes the text "Join Chat," an image of a chat bubble, and a corresponding name (e.g., the name 307), additional designs and sub-elements are possible. In one or more embodiments, the ephemeral communication system 116 can apply one or more of the settings of the ephemeral content 313 and/or the group messaging graphical element 308 to the group messaging thread. For example, in various embodiments, in response to receiving creator input selecting a name 307 for the group messaging graphical element 308, the ephemeral communication system 116 assigns the same name to the group messaging graphical element associated with the ephemeral content 313.

As mentioned above, the ephemeral communication system 116 can provide a variety of customization options to the creator via the creator client device 310 for modifying the group messaging graphical element 308. For example, the group messaging graphical element 308 can be modified in appearance (e.g., color, shape, size). Additionally, the location of the group messaging graphical element 308 within the ephemeral content 313 can change, including the location of the button relative to the name of the group messaging graphical element 308.

The ephemeral communication system 116 may also facilitate further customization of a group messaging graphical element. For instance, the group messaging graphical element 308 can include information about an associated group messaging thread. For example, the group messaging graphical element 308 can include the number of members (e.g., active and/or total) in the group messaging thread. Additionally, the ephemeral communication system 116 can modify the size of the group messaging graphical element 308 within the ephemeral content 313 based on the number of members in the group messaging thread.

As mentioned above, a creator can add a group messaging graphical element within an instance of ephemeral content to invite users (e.g., co-users to the creator) to participate in a group messaging thread associated with the ephemeral content. Accordingly, in one or more embodiments, upon added a group messaging graphical element to ephemeral content the ephemeral communication system 116 can also generate a group messaging thread and link the group messaging graphical element within the ephemeral content to the group messaging thread.

The ephemeral communication system 116 can allow the creator to customize the presentation of the group messaging graphical element with respect to one or more pieces of ephemeral content. For example, based on creator input, the ephemeral communication system 116 can enable the group messaging graphical element to span across multiple related segments of ephemeral content. In some embodiments, a group messaging graphical element can be included in multiple separate (or unconnected) segments of the ephemeral content. Additionally, based on creator input, the ephemeral communication system 116 can enable a group messaging graphical element to be displayed in the ephemeral content for the duration of one or more segments of ephemeral content. In alternative embodiments, a group messaging graphical element is displayed within ephemeral content based on a specified period of time (e.g., display the group messaging graphical element in all segments of ephemeral content posted within 4 hours of the group messaging graphical element first being added to a segment of ephemeral content).

In some embodiments, the ephemeral communication system 116 can include (e.g., based on creator input) a group messaging graphical element in a segment of ephemeral content for the entirety of the presentation of that segment of ephemeral content. In another example, the ephemeral communication system 116 can include a group messaging graphical element in all of the creator's ephemeral content for a specified time (e.g., all ephemeral content posted in the next 10 hours). The ephemeral communication system 116 can also include the ephemeral content for half (or another portion) of the presentation of a segment of ephemeral content (e.g., the group messaging graphical element is displayed for less than the duration of the segment of ephemeral content).

The ephemeral communication system 116 can also facilitate the movement of the group messaging graphical element within the ephemeral content. For example, in one or more embodiments, based on creator input, the ephemeral content can include tracked motion of the group messaging graphical element across a creator-selected (or predefined) path. In another example, the ephemeral communication system 116 can facilitate the movement of the group messaging graphical element within the ephemeral content based on the motion of an object within a video included in the ephemeral content.

To illustrate, the ephemeral communication system 116 can move the group messaging graphical element based on the movement of a face, ball, item, or another object in the ephemeral content. The ephemeral communication system 116 can track the movement of the group messaging graphical element on top of the object or in tandem with the object but elsewhere within the ephemeral content.

Additionally, upon creation of the group messaging graphical element, the ephemeral communication system 116 can provide the creator with an option to save the group messaging graphical element for later use. In alternative embodiments, the ephemeral communication system 116 automatically saves one or more previously created group messaging graphical elements. In some embodiments, the ephemeral communication system 116 can facilitate the creation of multiple segments of ephemeral content utilizing the same group messaging graphical element associated with the same group messaging thread. For example, the ephemeral communication system 116 can present one or more previously used group messaging graphical elements to a creator within the graphical element menu 303 shown in FIG. 3B or within a separate menu offering (e.g., a menu of previously used group messaging graphical elements).

Additionally, the ephemeral communication system 116 can automatically identify one or more saved group messaging graphical element for a segment of ephemeral content and present it to the creator during the ephemeral content creation process. To illustrate, the ephemeral communication system 116 can analyze a segment of ephemeral content and determine a correspondence to a previous segment of ephemeral content that contained a group messaging graphical element that the creator previously utilized. Then, based on this determination and/or based on receiving creator input indicating the selection of a new group messaging graphical element, the ephemeral communication system 116 can recommend the saved group messaging graphical element to the creator for use in the segment of ephemeral content. In some embodiments, the ephemeral communication system 116 can recommend the creator add a group messaging graphical element initiated by another creator/user/entity (e.g., a trending public group messaging graphical element or a group messaging graphical element for a trending topic).

In one or more embodiments, in connection with generating the group messaging graphical element, the ephemeral communication system 116 may also present the creator with one or more options regarding the group messaging thread. For example, the ephemeral communication system 116 may allow the creator to designate whether the group messaging thread is closed (e.g., requires creator approval for a user to join), open (e.g., does not require any approval for a user to join or participate), or selective (e.g., limited to a pre-approved group of users).

In some embodiments, upon receiving customization information for the group messaging graphical element from the creator and/or applying default settings, the ephemeral communication system 116 can publish the group messaging graphical element 308 within the ephemeral content 313. To illustrate, FIG. 3D shows an updated ephemeral content customization user interface 311d, which includes the group messaging graphical element 308.

As mentioned above, the group messaging graphical element 308 is provided to enable users to join in a group messaging thread with the creator with respect to the ephemeral content 313. Accordingly, in various embodiments, the group messaging graphical element 308 can include text indicating that selection will enable a user to join and/or request to join a group messaging thread. Examples of this text include "join chat," "join group messaging thread," "request group chat," "message with us," or other text indicating joining, requesting to join, or participation in the group messaging thread associated with the ephemeral content.

In various embodiments, after the ephemeral communication system 116 generates the group messaging graphical element 308 within the ephemeral content 313, the creator can continue to modify the ephemeral content if so desired. For example, the creator can utilize the toolbar 301 to further modify the ephemeral content, as described above.

Additionally, as shown in FIG. 3D, the updated ephemeral content customization user interface 311*d* can provide posting options 312, 314 for the ephemeral content. The ephemeral communication system 116 can determine the users (e.g., co-users of the creator) to which to provide the ephemeral content based on the creator client device 310 detecting the creator selecting with one of the posting options 312, 314. For example, the ephemeral communication system 116 can provide a posting option 312 that generally provides the ephemeral content to all users connected to the creator through the networking system 114.

Additionally, the ephemeral communication system 116 can provide a selected posting option 314 (e.g., "Close friends"). In response to the creator client device 310 detecting the creator selects the selected posting option 314, the ephemeral communication system 116 can provide the ephemeral content to particular users of the networking system that the creator has previously designated. In alternative embodiments, in response to the creator client device 310 detecting the creator selects the selected posting option 314, the ephemeral communication system 116 can provide an additional graphical user interface that enables the creator to select specific user.

As also shown in FIG. 3D, the updated ephemeral content customization user interface 311*d* can include a message option 316. In one or more embodiments, in response to the creator client device 310 detecting that the creator selects the message option 316, the ephemeral communication system 116 can provide an option (via the updated ephemeral content customization user interface 311*d*) to send the ephemeral content with the group messaging graphical element 308 to one or more users of the networking system in a direct message. In some embodiments, the ephemeral communication system 116 can send only the group messaging graphical element 308 to a selected user in a direct message.

FIGS. 4A-4D illustrate graphical user interfaces for generating a group messaging thread associated with ephemeral content in accordance with one or more embodiments. To illustrate, FIGS. 4A-4D show the creator client device 310 introduced above in connection with FIGS. 3A-3D. For example, FIGS. 4A-4D show various graphical user interfaces 441*a*-44*d* that include the ephemeral content 313 with the group messaging graphical element 308, starting a group messaging thread, and notifications associated with the group messaging thread.

Figure 4B:
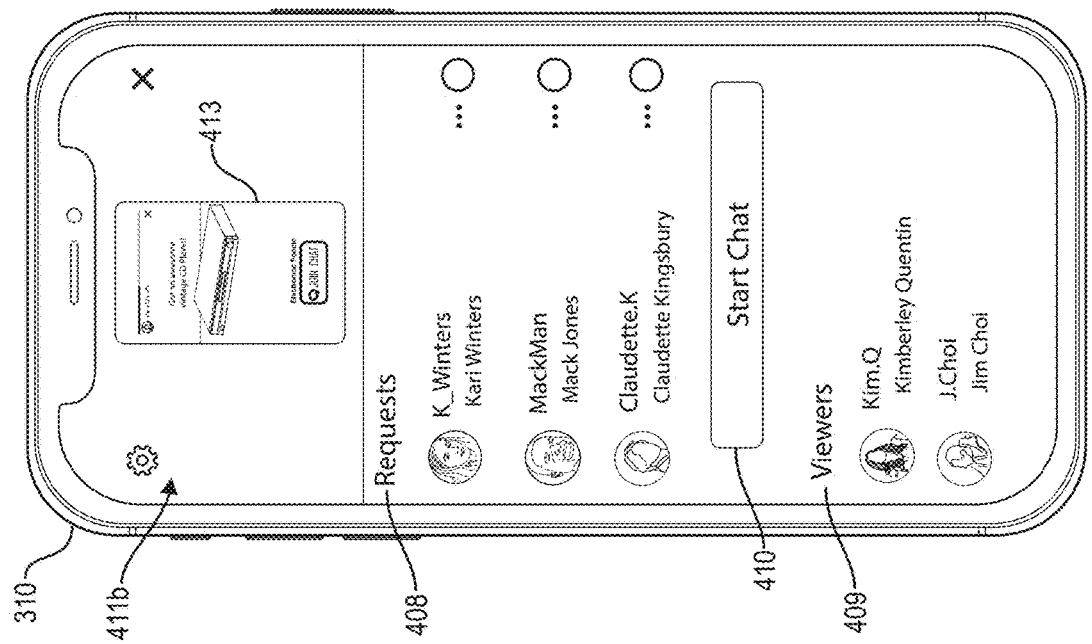
FIGS. 4A-4D illustrate graphical user interfaces for generating a group messaging thread associated with ephemeral content in accordance with one or more embodiments.
Figure 4A:
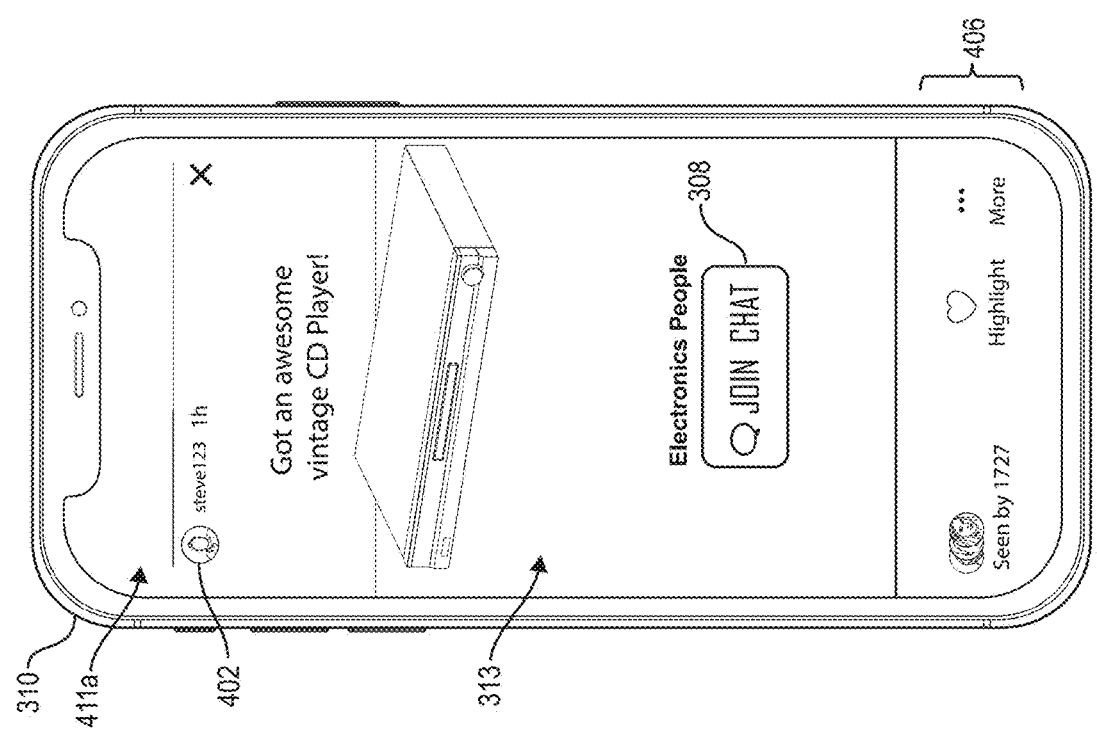

More specifically, FIG. 4A shows a networking feed user interface 411*a* that includes a post by the creator of the ephemeral content 313 with the group messaging graphical element 308, as described previously. Additionally, as shown in FIG. 4A, the networking feed user interface 411*a* includes a creator indicator 402. The creator indicator 402 can indicate a creator and/or a poster of the ephemeral content 313. For example, the creator indicator 402 can include a user identifier and thumbnail profile image corresponding to the creator of the ephemeral content 313. In one or more embodiments, detected selection of the creator indicator 402 by a user navigates the user to a user profile of the creator.

Further, the networking feed user interface 411*a* can include an information bar 406 in connection with the ephemeral content 313. As shown, the information bar 406 can include an indication of how many users have viewed the ephemeral content 313, an option to mark the ephemeral content, and various other options. For example, the information bar 406 can include options to delete the ephemeral content, save the ephemeral content to the creator client device 310, send the ephemeral content to a specific user, share the ephemeral content as permanent content, or modify settings for all ephemeral content.

As mentioned above, the group messaging graphical element 308 within the ephemeral content 313 can be linked to a group messaging thread associated with the ephemeral content 313. The ephemeral communication system 116 can generate (e.g., create) the group messaging thread associated with the ephemeral content at various times. For example, in one or more embodiments, in the ephemeral communication system 116 can generate the group messaging thread associated with the ephemeral content 313 at the time of associating the group messaging graphical element 308 with the ephemeral content (e.g., before or upon posting the ephemeral content). In alternative embodiments, the ephemeral communication system 116 can generate the group messaging thread associated with the ephemeral content 313 in response to the creator first authorizing one or more requesting users to join the group messaging thread. Additionally, in various embodiments, the ephemeral communication system 116 generates the group messaging thread in response to the creator approving the creation of the group messaging thread.

As shown in FIG. 4B, the creator client device 310 displays a group messaging thread generation user interface 411*b*. In various embodiments, the group messaging thread generation user interface 411*b* can facilitate the creation of the group messaging thread by the ephemeral communication system 116 based on input from the creator. In various embodiments, the group messaging thread generation user interface 411*b* can include a requesting user list 408 of user requests that the creator can approve, hide, reject, or ignore.

Additionally, as shown in FIG. 4B, the group messaging thread generation user interface 411*b* can include an ephemeral content preview 413 that provides an indication of the corresponding ephemeral content 313 (e.g., in a heading portion). Further, in one or more embodiments, the ephemeral content preview 413 can also include information regarding the ephemeral content 313. For example, the ephemeral content preview 413 can include a date and/or time of posting, a number of viewers of the ephemeral content 313, or notifications regarding the ephemeral content 313.

As also shown in FIG. 4B, the group messaging thread generation graphical user interface can include requesting user list 408. As illustrated, the requesting user list 408 area can include approval options for each of the users requesting to participate in the group messaging thread associated with the ephemeral content 313. For example, the creator can select an element (e.g., a checkbox) to include a requesting user for approval to participate in the group messaging thread. In addition, the creator can select other approval options no shown, such as instantly approve the user request, ignore the user request, snooze the user request, remove the user request, block the user, etc.

As shown in FIG. 4B, the group messaging thread generation user interface 411b can also include the profile photos, user identifiers, and names of the requesting users within the requesting user list 408. In one or more embodiments, in response to the creator client device 310 detecting that the creator selects the image or name of a requesting user within the requesting user list 408, the ephemeral communication system 116 can present the user profile of the requesting user to the creator. In some embodiments, the group messaging thread generation user interface 411b can include one or more selectable elements for the creator to follow, unfollow, block, remove, or take another action with respect to a requesting user.

In one or more embodiments, the group messaging thread generation user interface 411b can also include options for the creator to establish (or modify) settings for the group messaging thread. For example, as discussed above with regard to FIG. 3B, the group messaging thread generation user interface 411b (based on instructions from the ephemeral communication system 116) can present options for the creator to select and/or modify whether the group messaging thread is closed or open. Further, the group messaging thread generation user interface 411b can present notification options to the creator regarding whether to present notifications related to the group messaging thread. Additionally, in one or more embodiments, the group messaging thread generation user interface 411b can present the creator with options to designate one or more other users as administrators for the group messaging thread, including permissions to add members to and/or remove members from the group messaging thread.

As also shown in FIG. 4B, the group messaging thread generation user interface 411b can include a viewing users list 409. As shown in FIG. 4B, the viewing users list 409 can include a listing of users of the networking system that have viewed the ephemeral content 313. In various embodiments, the viewing users list 409 can include a user identifier and/or a user profile image corresponding to each of the viewing users.

Figure 4C:
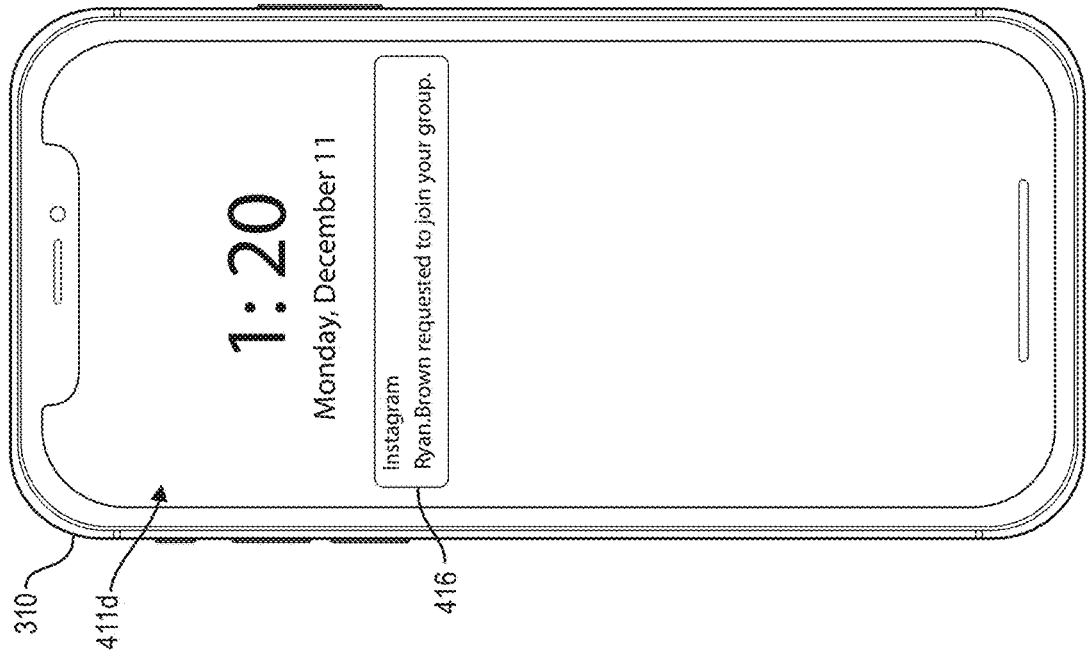

The ephemeral communication system 116 can also provide a group messaging thread initiation element 410 (e.g., a "Start Chat" button). In one or more embodiments, in response to receiving a group messaging thread initiation indication from the creator client device 310 of the creator selecting the group messaging thread initiation element 410, the ephemeral communication system 116 can generate the group messaging thread. Further, the ephemeral communication system 116 can provide the group messaging thread to the creator client device 310 as well as to the user client devices associated with users that are selected by the creator at the time of the ephemeral communication system 116 receiving the group messaging thread initiation selection FIG. 4C illustrates the creator client device 310 updating the graphical user interfaces to display a group messaging thread user interface 411c. As shown in FIG. 4C, the group messaging thread user interface 411c includes a group messaging thread 412. As described above, the ephemeral communication system 116 creates the group messaging thread 412 with respect to the ephemeral content 313.

Because the group messaging thread 412 is based on the ephemeral content 313, the group messaging thread 412 can include references to the ephemeral content 313. For example, the group messaging thread 412 can include an ephemeral content message 414 (e.g., a system-generated message) that includes the ephemeral content preview 413 described above. Indeed, the ephemeral content message 414 can include an image of and/or a link to the ephemeral content 313. In addition, the group messaging thread 412 can include other messages provided by the creator or users that have joined the group messaging thread 412.

In various embodiments, the group messaging thread 412 includes a context banner that references the ephemeral content 313. For example, the banner is a fixed or static banner at the top (or other location) of the group messaging thread 412 that includes an image of and/or a link to the ephemeral content 313. In some embodiments, the banner includes a selectable option to hide, minimize, or remove the banner.

The group messaging thread user interface 411c can include information about the group messaging thread 412. For example, the group messaging thread user interface 411c provides an indication of the number of active (or total) members of the group messaging thread, an option to see additional information regarding the group messaging thread 412 and/or the ephemeral content 313, and/or an option to view the ephemeral content 313. The group messaging thread user interface 411c can also include message composition element (e.g., a text or graphic input box) for users to generate messages for the group messaging thread 412. For instance, the group messaging thread 412 enables users to send text, emoticons, photos, videos, audio, and various other media utilizing the message composition element.

In one or more embodiments, the ephemeral communication system 116 provides notifications to the creator client device 310 in response to activity related to the group messaging thread 412. More specifically, the ephemeral communication system 116 can provide notifications to the creator client device 310 based on creator notification settings for the group messaging thread 412. For example, the ephemeral communication system 116 can notify the creator of user requests, mentions, and/or new messages within the group messaging thread 412.

Figure 4D:
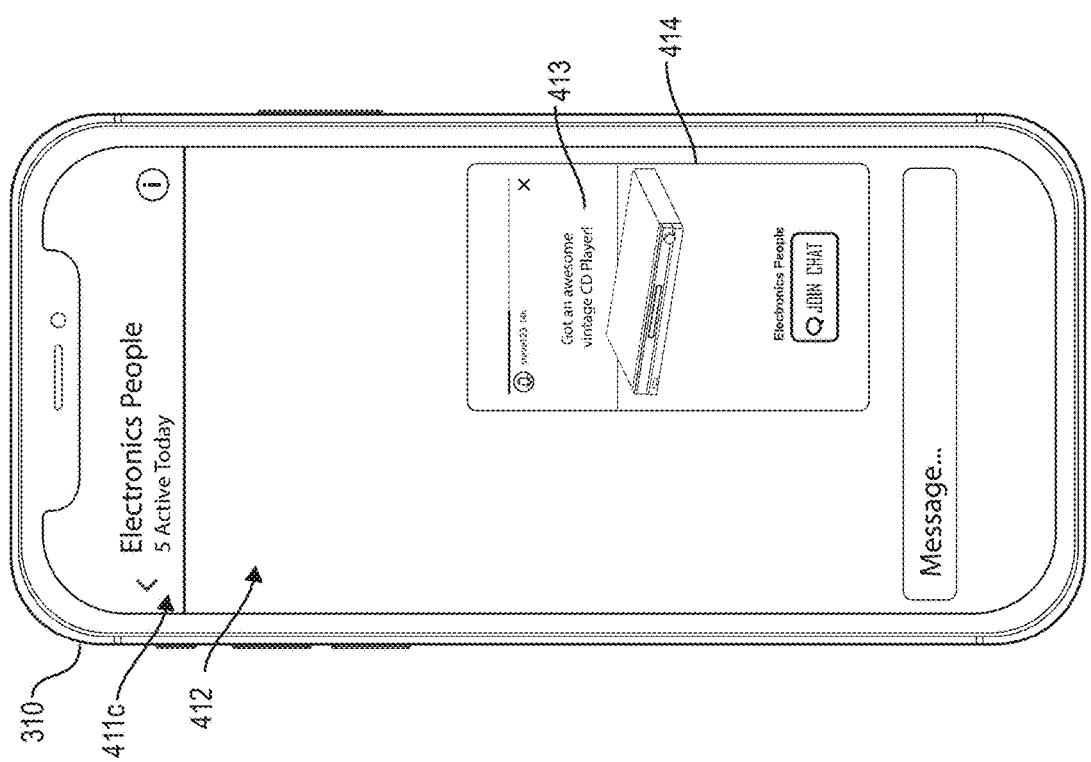

To illustrate, FIG. 4D illustrates the creator client device 310 displaying a notification user interface 411d that includes a user request notification 416. In particular, the user request notification 416 relates to another user (e.g., a co-user of the networking system) requesting to join the group messaging thread 412. As mentioned above, notifications can a user identifiers corresponding to the users triggering the notification, an activity type related to the group messaging thread, and an explanation of the activity.

In connection with generating a group messaging thread 412, the ephemeral communication system 116 can provide various options and settings for the creator (or another authorized user) to manage the thread. For example, the ephemeral communication system 116 can enforce a membership limit that caps the number of users that can participate in the group messaging thread 412 at the same time. In some embodiments, the ephemeral communication system 116 can automatically impose the membership limit based on system settings. In alternative embodiments, the ephemeral communication system 116 can enable the creator of the group messaging thread to impose a membership limit.

To illustrate, FIGS. 5A-5D show graphical user interfaces on the creator client device 310 for managing membership in a group messaging thread associated with ephemeral content in accordance with one or more embodiments. In general, the graphical user interfaces 511a-511d are continuations of the graphical user interfaces of the creator client device 310 shown in connection with FIGS. 4A-4B. For example, the creator client device 310 in FIG. 5A includes group messaging thread generation user interface 511a similar to the group messaging thread generation user interface 411b shown in FIG. 4B. Indeed, the group messaging thread generation user interface 511a includes the ephemeral content preview 413, the requesting user list 408, the group messaging thread initiation element 410, and the viewing users list 409, as described above.

As just mentioned, FIG. 5A illustrates the group messaging thread generation user interface 511a. As shown and as discussed above, the group messaging thread generation user interface 511a can include the requesting user list 408 of users requesting to join the group messaging thread. However, as FIG. 5A illustrates, the requesting user list 408 include a large number of requesting users (i.e., 105 user requests). Accordingly, the group messaging thread generation user interface 511a also includes a requesting user list expansion element 502 that, when selected, provides the creator with an expanded version of the requesting user list 408.

Indeed, when the number of users exceeds a predetermined threshold number, the ephemeral communication system 116 can provide a shortened version of the requesting user list 408. Additionally, as shown in FIG. 5A, the ephemeral communication system 116 can provide the requesting user list expansion element 502 (or another expanded view link or element) to enable the creator to view more (or all) of the requesting users. The ephemeral communication system 116 can determine which users to include within the shortened version of the requesting user list 408 based on a variety of criteria, including social affinity to the creator on the ephemeral communication system 116 and/or the time of the user's request.

Upon selection of the requesting user list expansion element 502, the ephemeral communication system 116 can present (via the creator client device 310) an updated graphical user interface that displays an expanded requesting user list 408. To illustrate, FIG. 5B shows a requesting user list user interface 511b where the ephemeral communication system 116 presents additional requesting user within the requesting user list 408 on the creator client device 310. In the illustrated embodiment, the requesting user list 408 includes profile photos, usernames, and names of the requesting users, as described above. Further, the requesting user list user interface 511b can also include the selectable option for approving a requesting user to join a group messaging thread and/or various other options corresponding to the requesting user, as previously described.

In various embodiments, the requesting user list user interface 511b can include a select all requesting users option 504 as well as a selection indicator 406 (e.g., showing the number of requesting users selected given the maximum membership limit). While the select all requesting users option 504 is shown as a shaded in checkmark in a circle, the select all requesting users option 504 can embody a variety of designs to indicate different selection states. In one or more embodiments, upon detecting the creator selecting the select all requesting users option 504, the ephemeral communication system 116 can cause all of the requesting users to be selected.

In alternative embodiments, upon detecting the creator selecting the select all requesting users option 504, the ephemeral communication system 116 selects a number of requesting users equal to the maximum membership limit. In one or more embodiments, when less than all of the requesting users can be selected, the ephemeral communication system 116 can determine which users to select based on a variety of criteria. For example, the ephemeral communication system 116 can select the requesting users who most recently requested (or first requests) to join the group messaging thread, who were most recently active on the networking system, or who have the closest connection (e.g., social affinity) with the creator of the ephemeral content. Further, the ephemeral communication system 116 can indicate the selected users by modifying their corresponding selection indicator.

In one or more embodiments, the ephemeral communication system 116 can receive creator input modifying the automatic selection. In some embodiments, the creator can modify the automatic selection as long as the maximum membership limit is not exceeded. In alternative embodiments, the creator can modify the automatica selection and manually exceed the maximum membership limit. For example, the creator can manually exceed the maximum membership limit by 10% when manually approving additional requesting users to participate in the group messaging thread.

As shown in FIG. 5B, the ephemeral communication system 116 can facilitate the generation of the group messaging thread from the requesting user list user interface 511b using the group messaging thread initiation element 410 (e.g., "Start Chat") button described above. For example, upon receiving a selection of the group messaging thread initiation element 410, if the number of selected requesting user does not exceed the maximum membership limit, the ephemeral communication system 116 can initiate the group messaging thread. Indeed, the ephemeral communication system 116 can generate and provide access to the group messaging thread to the selected requesting users.

In one or more embodiments, if the creator selects a number of requesting users in excess of the maximum membership limit for the group messaging thread (e.g., either upon selecting the next requesting user above the maximum membership limit or upon selecting the group messaging thread initiation element 410 with too many requesting user selected), the ephemeral communication system 116 can present a membership limit notification. To illustrate, FIG. 5C shows the creator client device 310 displaying a membership limit notification 506. Indeed, in some embodiments, the membership limit notification 506 as a modal window over the requesting user list 408 shown in the requesting user list user interface 511b. In various embodiments, the ephemeral communication system 116 can cause the creator client device 310 to present the membership limit notification 506 according to a variety of designs that communicate to the creator that the group messaging thread has a maximum membership limit and/or that the membership limit prevents the group messaging thread from being generated until fewer requesting users are selected for inclusion in the group messaging thread.

The membership limit notification 506 may also include information as to the action that the ephemeral communication system 116 will take to implement the membership limit. For example, the ephemeral communication system 116 can automatically deselect users over the membership limit. In one or more embodiments, the membership limit notification 506 can read, "You can add up to 100 people to this chat" and/or "There are more requests than spots available, so the first 100 users were selected."

Figure 5D:
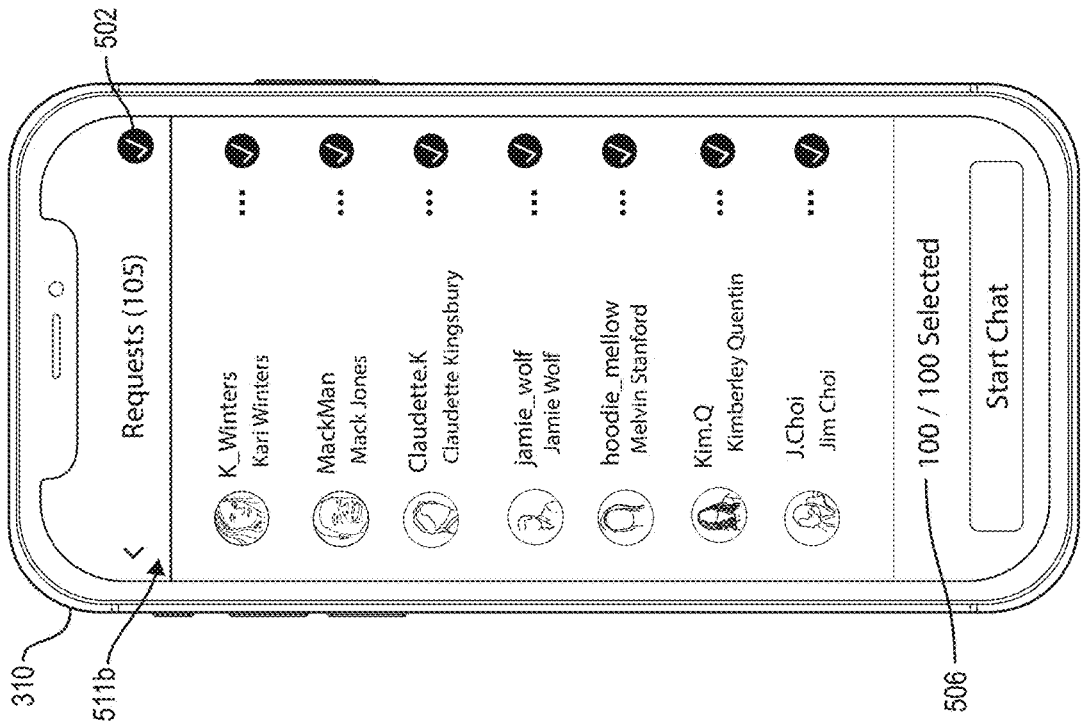
Figure 5C:
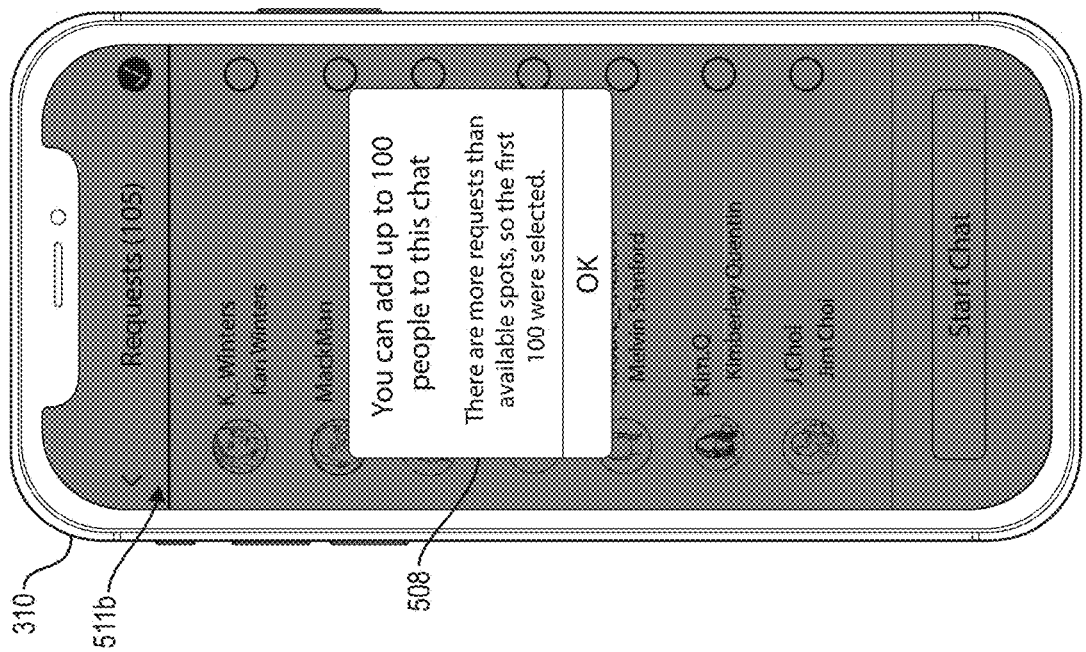

FIG. 5D shows the creator client device 310 again displaying the requesting user list user interface 511b. As shown in FIG. 5D, the membership limit notification 506 indicates that the maximum number of requesting users are selected without exceeding the membership limit. Further, as mentioned above, the creator can modify the selection while observing the membership limit in the event that the automatic deselection is not their liking. Then, upon detecting a selection of the group messaging thread initiation element 410, if the number of selected requesting users satisfies the membership unit, the ephemeral communication system 116 can generate the group messaging thread including the selected requesting users as members, as provided previously.

While FIGS. 5A-5D show example embodiments at the time of generation of the group messaging thread, the ephemeral communication system 116 can similarly implement a membership limit after the generation of the group messaging thread. Additionally, while FIGS. 5A-5D show implementation of a maximum membership limit, the ephemeral communication system 116 can also implement a minimum membership requirement (e.g., there must be at least one request in order to generate the chat). In this manner, while the group messaging thread includes one or two users (e.g., the creator or the creator and one additional user), the group messaging thread can accommodate additional users as they join the group messaging thread.

While FIGS. 3A-5D illustrate the ephemeral communication system 116 interacting with a creator client device to generate a group messaging thread associated with ephemeral content, FIGS. 6A-7E correspond to the ephemeral communication system 116 interacting with a user client device. In particular, as mentioned above, FIGS. 6A-6B illustrate graphical user interfaces on for utilizing a group messaging graphical element to request to join a group messaging thread on a user client device in accordance with one or more embodiments. FIGS. 7A-7E illustrate graphical user interfaces on a user client device related to participating in a group messaging thread associated with ephemeral content on a user client device in accordance with one or more embodiments.

As discussed above, the ephemeral communication system 116 can allow a user to request to join or participate in a group messaging thread associated with an instance of ephemeral content by interacting with the group messaging graphical element within the ephemeral content. To illustrate, FIGS. 6A-6B show a user client device 600 (e.g., one of the user client device(s) 102a-102n) having a graphical user interface 602 that includes the ephemeral content 313 having the group messaging graphical element, as described above.

As shown in FIG. 6A, the graphical user interface 602 on the user client device 600 includes the ephemeral content 313 and the group messaging graphical element 308. As discussed above, the user client device 600 can detect a user selecting the group messaging graphical element 308 to request participation in a group messaging thread associated with the ephemeral content 313. For example, a user request to participate in the group messaging thread to communication with the creator and/or other users viewing the ephemeral content 313

Additionally, as discussed above, the graphical user interface 602 can include the creator indicator 402. The graphical user interface 602 can also include an option to exit the ephemeral content (e.g., the "X" in the top right corner) and/or include other options, such as the option to send the ephemeral content to another user. Additionally, as shown in FIG. 6A, the graphical user interface 602 can include a message option 604 to send a message to the creator of the ephemeral content via user input.

In one or more embodiments, the group messaging graphical element 308 dynamically changes based on the number of participating users in the group messaging thread. For example, as the number of participants in the group messaging thread increases, the ephemeral communication system 116 enlarges the group messaging graphical element 308. In various embodiments, the group messaging graphical element 308 indicates the number of participants in the group messaging thread.

As illustrated in FIG. 6B, upon receiving an indication from the user client device 600 of a user interacting with the group messaging graphical element 308, the ephemeral communication system 116 and/or the user client device 600 can modify the group messaging graphical element 308 to reflect the user selection. In various embodiments, the ephemeral communication system 116 and/or the user client device 600 can modify the group messaging graphical element 308 in accordance with a variety of designs reflecting that the user has interacted with the group messaging graphical element 308, has joined, and/or requested to join the group messaging thread associated with the ephemeral content 313.

To illustrate, FIG. 6B shows the graphical user interface 602 updating to display a modified group messaging graphical element 308. For example, as shown in FIG. 6B, the ephemeral communication system 116 modifies the group messaging graphical element 308 to include a checkmark and the text "Requested," signaling that the user has selected the group messaging graphical element 308.

As discussed above, in one or more embodiments, the creator may designate the group messaging thread corresponding to the group messaging graphical element 308 as open. In these embodiments, the ephemeral communication system 116 can modify the group messaging graphical element 308 to include the text "Joined" or include other text indicating that the user has successfully interacted with the group messaging graphical element 308 and/or to join the group messaging thread.

In one or more embodiments where the associated group messaging thread is closed, upon the creator approving the user's request to join the group messaging thread, the ephemeral communication system 116 can modify the group messaging graphical element 308 to reflect that the user has successfully joined the group messaging thread. For example, the ephemeral communication system 116 changes the group messaging graphical element 308 from "Requested" to "Joined." Further, upon receiving an indication of user input selecting the modified group messaging graphical element 308 indicating that the user has successfully joined the group messaging thread, the ephemeral communication system 116 can present the group messaging thread to the user. In alternative embodiments, the ephemeral communication system 116 can automatically present the group messaging thread to the user upon the user initially interacting with the group messaging graphical element 308 and/or being approved to participate in the group messaging thread.

As discussed above, the ephemeral communication system 116 can facilitate the generating and moderating requests to join a group messaging thread (e.g., a closed group messaging thread) associated with a group messaging graphical element. To illustrate, FIGS. 7A-7E shows graphical user interfaces related to participating in a group messaging thread associated with ephemeral content on a user client device in accordance with one or more embodiments.

Figure 7B:
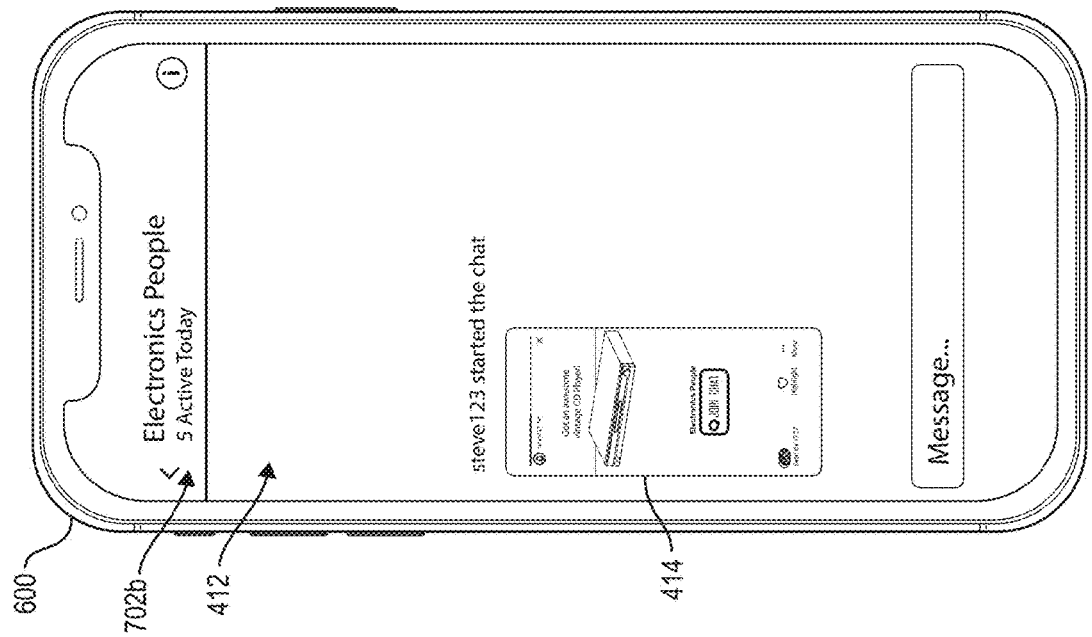
FIGS. 7A-7E illustrate graphical user interfaces related to participating in a group messaging thread associated with ephemeral content on a user client device in accordance with one or more embodiments.
Figure 7A:
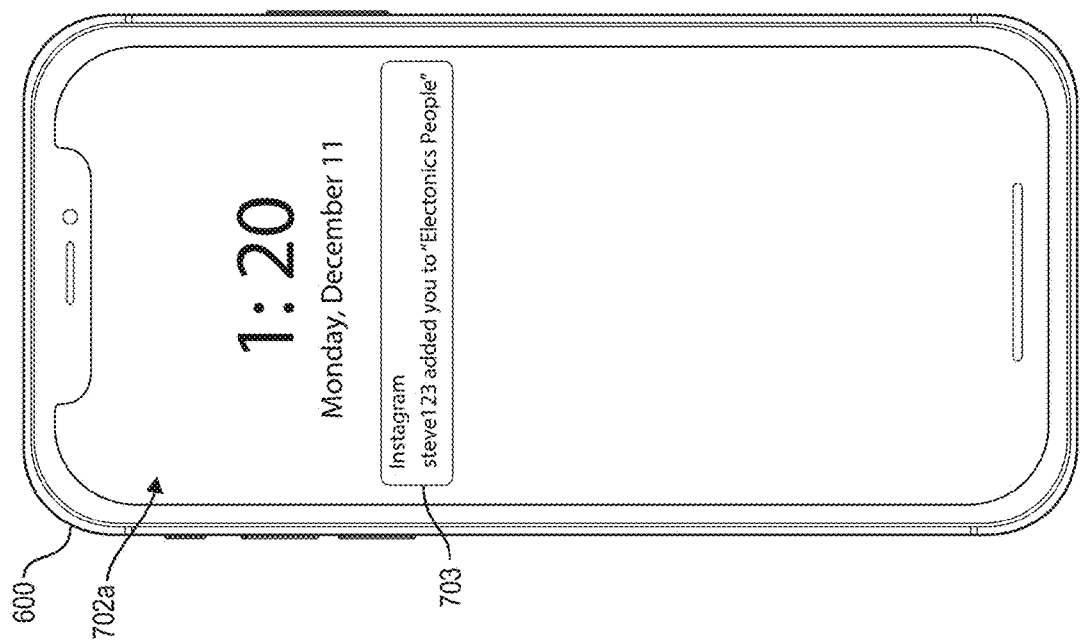

As described above, the user client device 600 displayed in FIGS. 7A-7E can represent one of the user client device(s) 102a-102n introduced above, As shown in FIG. 7A, the user client device 600 can provide a notification user interface 702a that includes a notification 704 notifying the user that the creator has added and/or approved the user's request to participate in the group messaging thread associated with the ephemeral content. Indeed, in response to the ephemeral communication system 116 receiving an indication from the creator client device to add the requesting user to a group messaging thread, the ephemeral communication system 116 can present the requesting user, via the user client device 600, a notification 704 indicating that the request has been approved.

In one or more embodiments, upon receiving a selection of the notification 704 or upon receiving a selection within the networking system application in connection with the notification 704, the ephemeral communication system 116 (e.g., via the user client device 600) can provide the user with the group messaging thread user interface, which is described above in connection with FIG. 4C. As discussed above, the group messaging thread user interface can include information corresponding to the group messaging thread and other elements to facilitate communication within the group messaging thread.

To illustrate, FIG. 7B shows the user client device 600 providing the group messaging thread user interface 702b to a user. As mentioned above, the group messaging thread user interface 702b includes the group messaging thread 412. As mentioned above, the ephemeral communication system 116 can provide, for display on the user client device 600, the group messaging thread 412, including the ephemeral content message 414. In some embodiments, the ephemeral communication system 116 can also provide additional indications, such as the number of members currently active in the group messaging thread.

In various embodiments, the ephemeral communication system 116 can enable users and/or the creator to access a group messaging thread that has been archived or otherwise stored. For example, the ephemeral communication system can add the group messaging thread 412 to a messaging portion of the networking system application so that the creator and/or users can access the group messaging thread 412 even when the ephemeral content is no longer available. In some embodiments, the group messaging thread 412 continues on as a traditional messaging thread via the networking system.

Figure 7D:
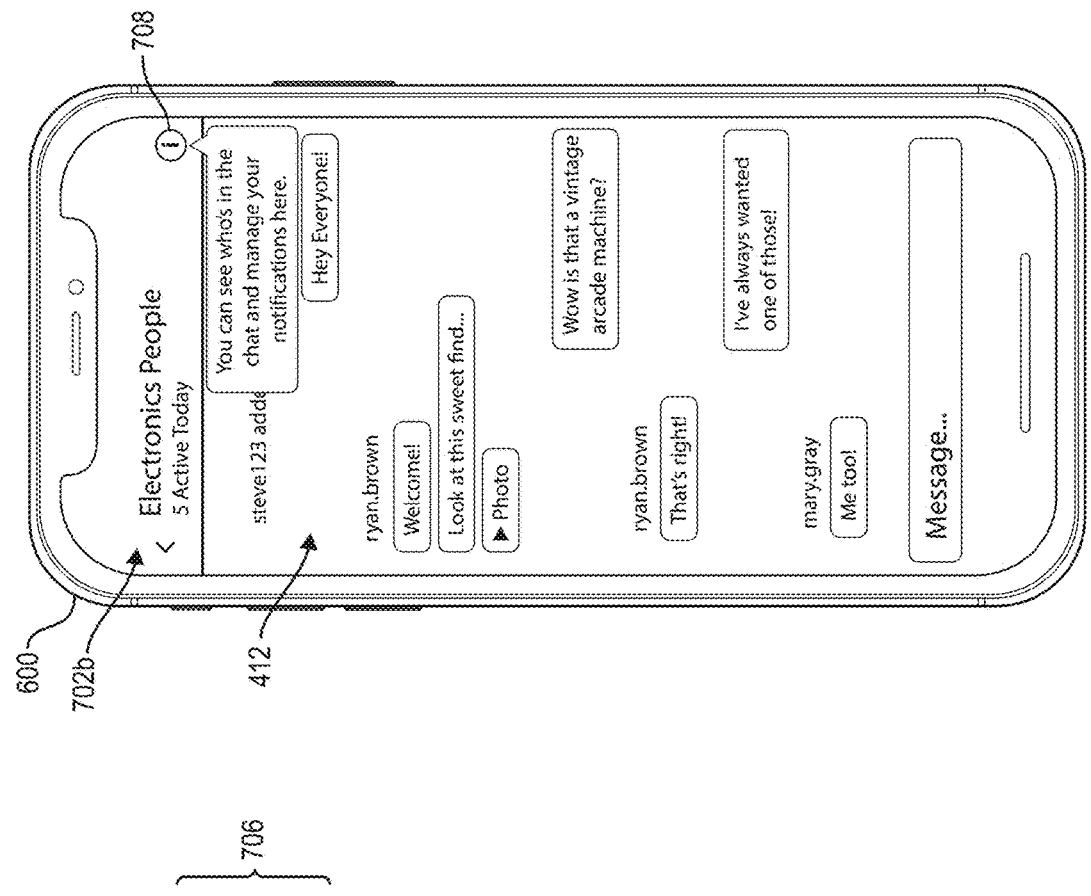
Figure 7C:
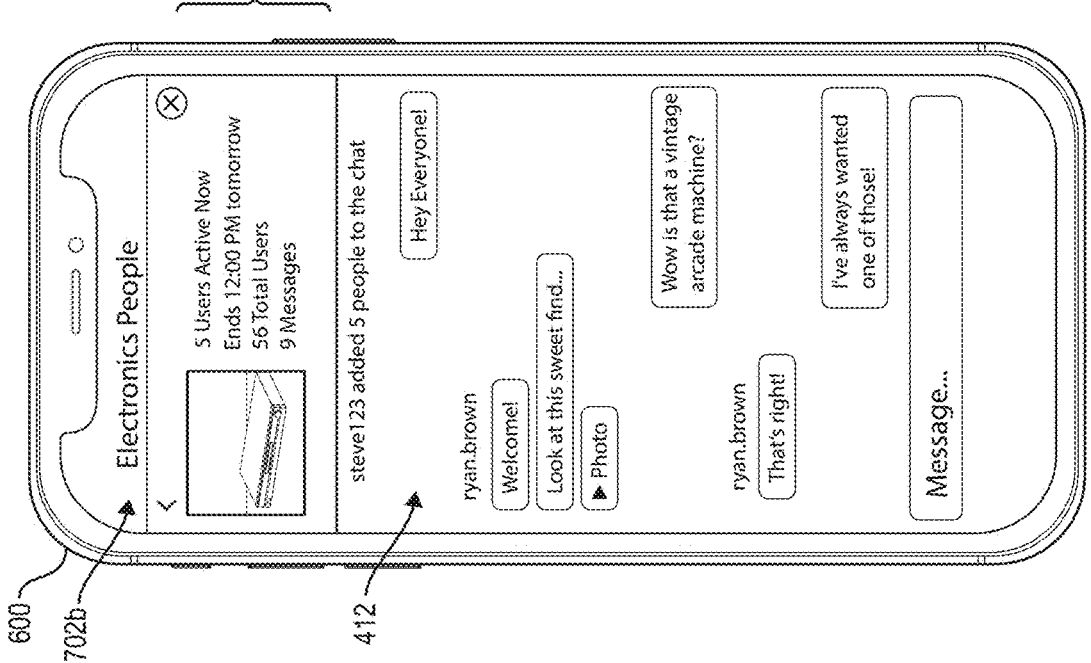

After the user has joined and/or been added to the group messaging thread, 412 the user can post messages to the group messaging thread 412 and view messages from other users (including the creator). To illustrate, FIG. 7C shows the user client device 600 updating the group messaging thread user interface 702b to include additional messages in the group messaging thread 412 as the messages are received from the creator and/or users. Indeed, the members of the group messaging thread 412 (e.g., the creator and approved users) can post text, photos, videos, and other media content in the group messaging thread 412.

In one or more embodiments, the ephemeral communication system 116 can facilitate a live video stream within the group messaging thread 412. For example, the ephemeral communication system 116 can present a live video stream initiated by the creator of the group within the group messaging thread user interface 702b. In these embodiments, the ephemeral communication system 116 can notify members of the group messaging thread of the live video message, as described above in connection with providing notifications.

As also shown in FIG. 7C, the group messaging thread 412 can include an information bar 706. As FIG. 7C illustrates, the information bar 706 can include various information about the group messaging thread 412. For example, the information bar 706 can include the ephemeral content corresponding to the group messaging thread 412 and/or a thumbnail of the ephemeral content. Additionally, the information bar 706 can include a termination date and time for the group messaging thread, the start time of the group messaging thread 412, a user count (e.g., an active user count and/or a total user count), and the total number of messages within the group messaging thread 412. Further, the information bar 706 can include an option to hide, minimize, or remove the information bar 706.

The ephemeral communication system 116 can provide the information bar 706 at the top of the group messaging thread consistently, regardless of any "scroll" received from the user client device 600. In this manner, the ephemeral communication system 116 can provide context to the group messaging thread 412 regardless of the state of the group messaging thread 412. For example, the information bar 706 can include an option to have the information bar 706 fix above the messages. In alternative embodiments, the information bar 706 can include an option to scroll out of view as more messages are received. Further, when the information bar 706 is shown above the messages, the information bar 706 can be located at other locations with the group messaging thread user interface 702b.

In some embodiments, the group messaging thread user interface 702b can include additional options and settings for the user of the user client device 600 to apply to the group messaging thread 412. To illustrate, FIG. 7D shows that the group messaging thread user interface 702b includes an information element 708. In response to receiving the user selection of the information element 708, the user client device 600 and/or the ephemeral communication system 116 can present an additional graphical user interface that includes various options and information about the group messaging thread, which is described next.

Figure 7E:
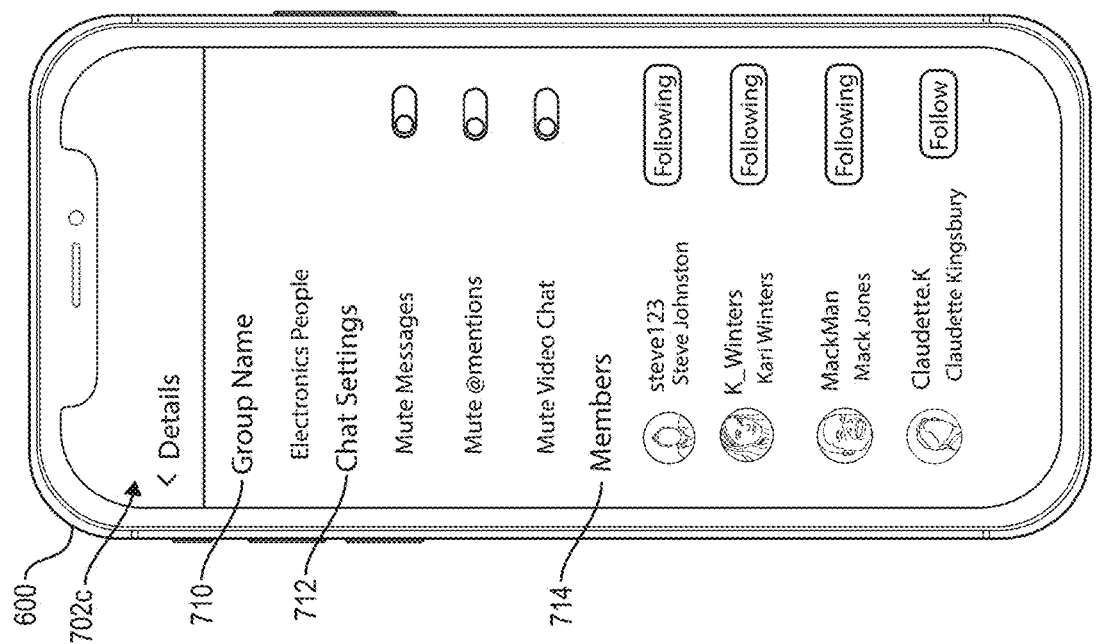

As just mentioned, the user client device 600 can update the graphical user interface to display a group messaging thread details user interface 702c to the user upon detecting the user selecting the information element 708. In some embodiments, a user can arrive at the group messaging thread details user interface 702c through other avenues. To illustrate, FIG. 7E shows the group messaging thread details user interface 702c. As shown in FIG. 7E, the group messaging thread details user interface 702c can include the group messaging thread name 710, group messaging thread settings 712, and a members list 714.

As shown, the members list 714 can include a list of members participating in the group messaging thread 412. As also shown, the members list can also include profile photos, usernames, and/or names of the members of the group, as described above. In some embodiments, the members list 714 indicates if or when a member was last active on the ephemeral communication system 116 and/or the group messaging thread 412. Further, as shown, the members list 714 can include an indicating of if the user is connected to another user (e.g., "Following"), and if not, a selectable element to connect with the user (e.g., "Follow").

As mentioned above, the group messaging thread details user interface 702c can also include the group messaging thread settings 712. As shown, the group messaging thread settings 712 can include a mute option for messages, a mute option for messages tagging the user, and a mute option for notifications regarding a video message initiated in the group messaging thread among other options. While the group messaging thread settings 712 show toggle elements for these options, other types of interactable options are possible.

Figure 8:
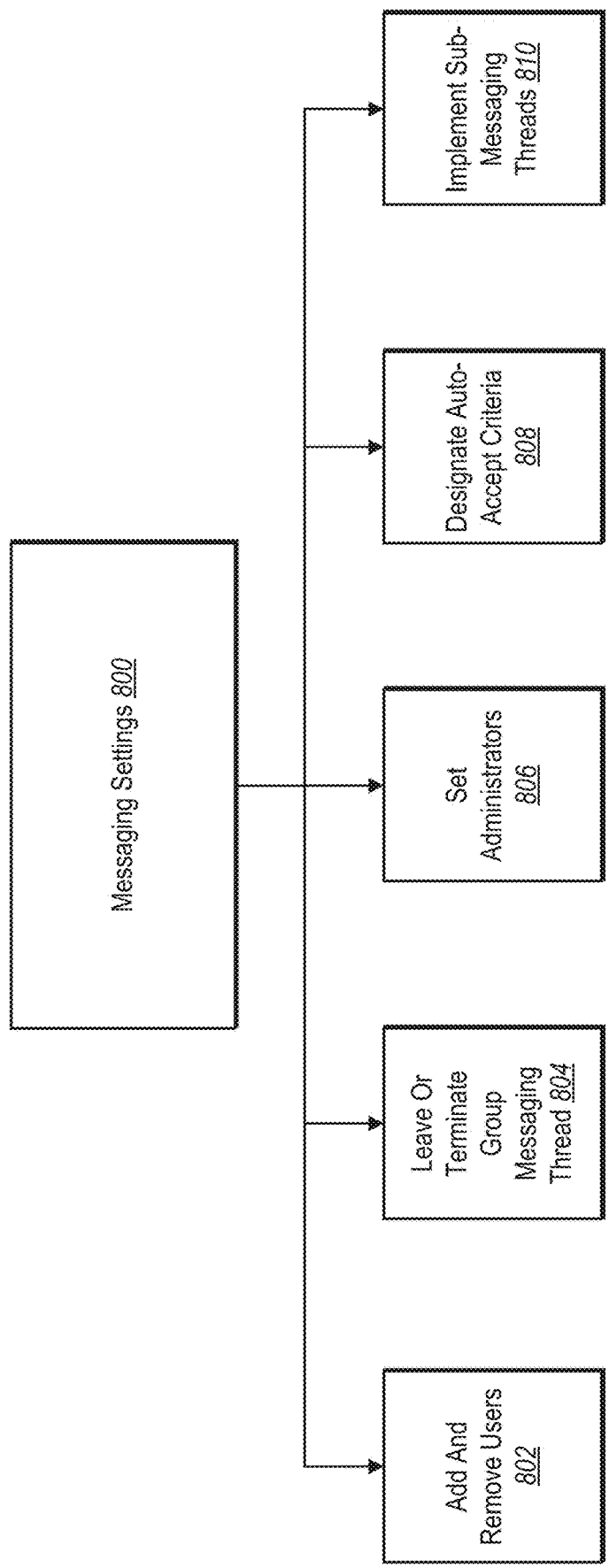
FIG. 8 illustrates managing a group messaging thread associated with ephemeral content in accordance with one or more embodiments.

As discussed above, the ephemeral communication system 116 can facilitate the generation of a group messaging thread for ephemeral content and provide access to the group messaging thread via a group messaging graphical element embedded within the ephemeral content. In addition, the ephemeral communication system 116 can facilitate the maintenance and management of the group messaging thread, the ephemeral content, and the group messaging graphical element. Accordingly, FIG. 8 illustrates managing a group messaging thread associated with ephemeral content in accordance with one or more embodiments. The managing settings and options provided in FIG. 8 can be provided to the creator via the creator client device and/or to authorized users (e.g., designated administrators) via their respective user client devices.

As shown, FIG. 8 includes a collection of messaging settings 800. In the illustrated embodiment, the messaging settings 800 include options such as add and remove users 802, leave or terminate a group messaging thread 804, set administrators 806, designate auto-accept criteria 808, and implement sub-messaging threads 810.

As will be discussed in greater detail below in connection with FIGS. 9A-9C, the ephemeral communication system 116 can facilitate options for a creator and/or administrator to add and remove users 802 from a group messaging thread. Additionally, the ephemeral communication system 116 can facilitate options to leave or terminate the group messaging thread 804. As described below, the ephemeral communication system 116 can provide graphical user interfaces for managing membership in an ongoing group messaging thread.

As shown in FIG. 8, the ephemeral communication system 116 can include the option to set administrators 806. The ephemeral communication system 116 can receive creator input designating additional users (e.g., members of a group messaging thread) as administrators of a group messaging thread. In one or more embodiments, the ephemeral communication system 116 can receive creator input designating one or more additional permissions for users that are designated as administrators. For example, the ephemeral communication system 116 can receive creator input granting one or more users permissions to add or remove users from the group messaging thread, terminate the group messaging thread, authorize other administrator users, and/or implement sub-messaging threads. Indeed, the ephemeral communication system 116 enables the creator to grant different levels of permissions to different users participating in the group messaging thread.

Further, as shown, the messaging settings 800 can include the option to designate auto-accept criteria 808. In one or more embodiments, based on settings provided by the creator, the ephemeral communication system 116 can automatically approve user requests to join a group messaging thread based on a requesting user's connection affinity to the creator of the group messaging thread on the ephemeral communication system 116 and/or a networking system. For example, the ephemeral communication system 116 can receive creator settings designating that a specified connected user (e.g., a "friend," a "close friend," a co-worker, a member of a social networking group, or a mutual follower) on the networking system should automatically be approved for membership in the creator's group messaging thread. In this example, requests from users that are not connected to the creator on the networking system should be sent for approval. In another example, the ephemeral communication system 116 can receive creator selection automatically approving individually designated users. In one or more embodiments, the ephemeral communication system 116 can provide a notification to the creator client device 310 when a requesting user is automatically approved for membership in a group messaging thread. The ephemeral communication system 116 can enable these automatically approval settings to be saved and applied to multiple group messaging threads requested by the creator.

As shown in FIG. 8, the messaging settings 800 can also include the option to implement sub-messaging threads 810. In various contexts, a creator may prefer dividing a conversation into multiple topics or sub-topics in different parts (e.g., tabs) in a group messaging thread. In one or more embodiments, the ephemeral communication system 116 can implement sub-messaging threads within a group messaging thread. A sub-messaging thread can be a portion of a group messaging thread designated (e.g., labeled) for discussion of a sub-topic within the umbrella of a group messaging thread. For example, a group messaging thread for electronics can include sub-messaging threads for mobile phones, desktop computers, and laptops. The ephemeral communication system 116 can receive a selection from a creator requesting the implementation of a sub-messaging thread for a group messaging thread. The ephemeral communication system 116 can provide the sub-messaging thread as a tab or separate page within the group messaging thread.

In connection with generating a sub-message thread, the ephemeral communication system 116 can facilitate the creator customizing the sub-message thread. For example, the ephemeral communication system 116 can provide and receive a creator-selected name and/or caption for the sub-messaging thread. Additionally, the ephemeral communication system 116 can provide and receive a selection of one or more members of the group messaging thread for inclusion in the sub-messaging thread. Further, in some embodiments, the ephemeral communication system 116 can automatically determine one or more members of the group messaging thread to include in the group messaging thread.

As mentioned above, FIGS. 9A-9C provide additional detail regarding managing a group messaging thread. In particular, FIGS. 9A-9C illustrate graphical user interfaces including options for managing the group messaging thread associated with a group messaging graphical element in accordance with one or more embodiments. Moreover, FIGS. 9A-9C can correspond to the message settings 800 introduced with respect to FIG. 8 by further describing options to add and remove users 802 and leave or terminate the group messaging thread 804.

Figure 9B:
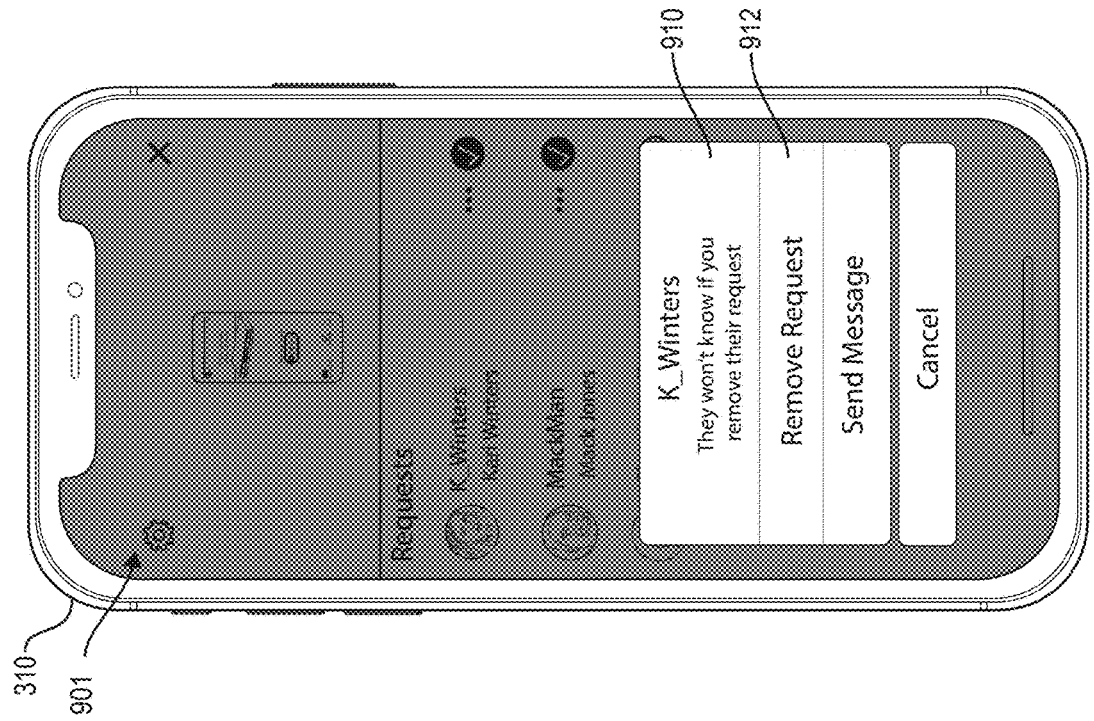
FIGS. 9A-9C illustrate graphical user interfaces including options for managing the group messaging thread associated with a group messaging graphical element in accordance with one or more embodiments.
Figure 9A:
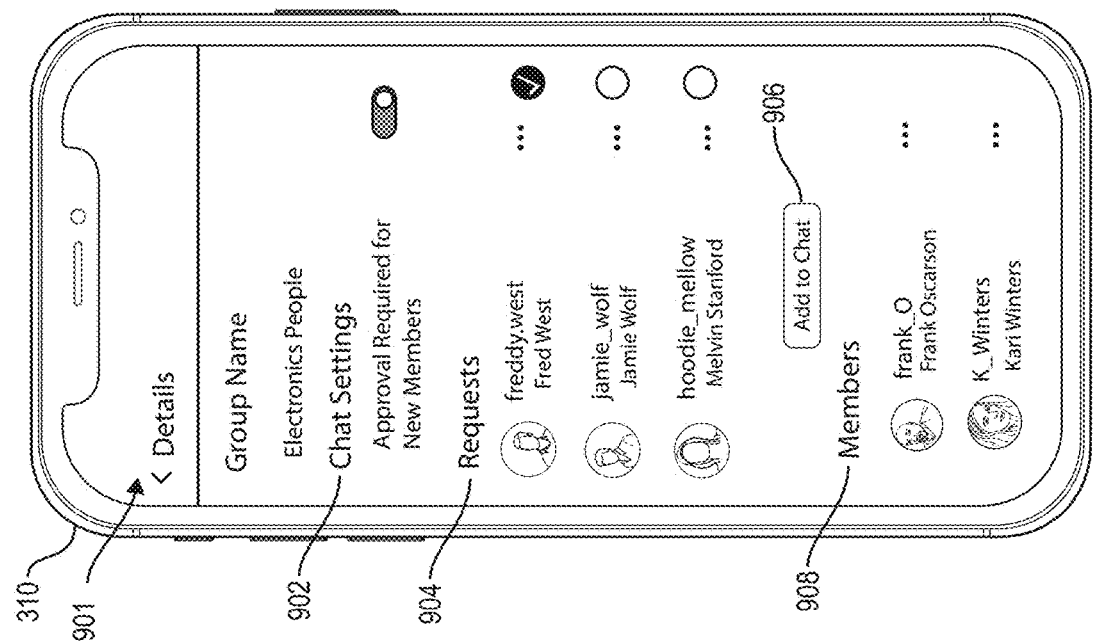
Figure 9C:
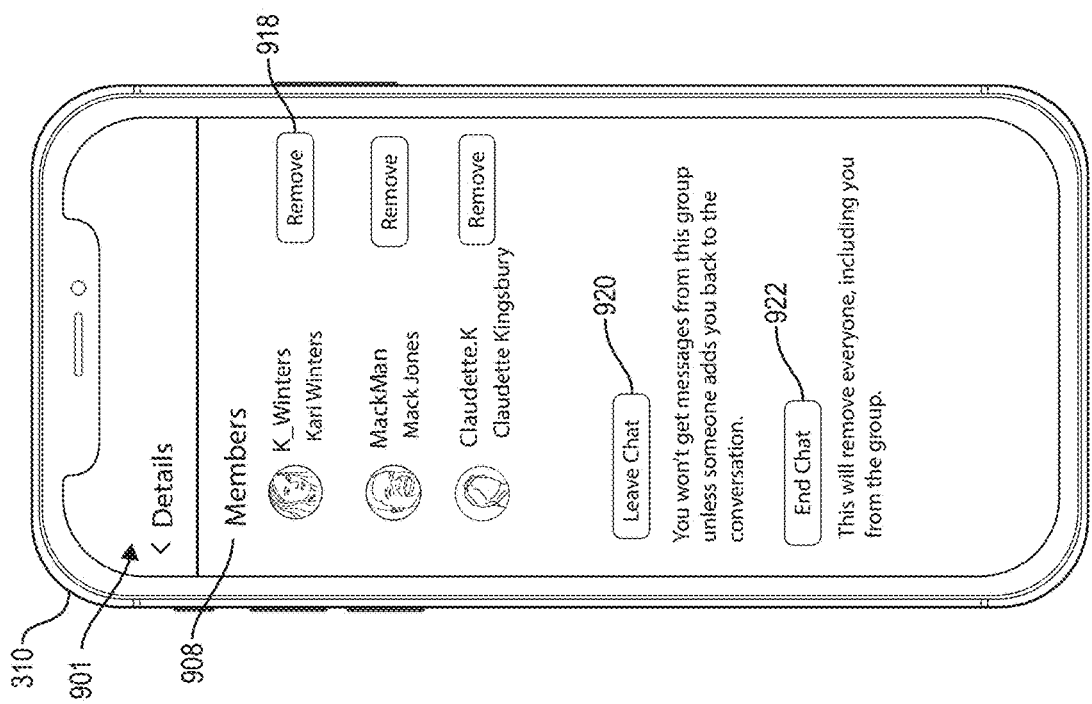

As shown, FIGS. 9A-9C include the creator client device 310 introduced above, where the creator client device 310 provides a group messaging thread details user interface 901 to the creator. While FIGS. 9A-9C is described with reference to the creator client device 310, the same description can be applied to a user client device of an administrator user that has been granted permissions to apply the settings and options detailed below.

In FIG. 9A, the group messaging thread details user interface 901 includes group messaging thread settings 902, a requesting user list 904, and a members list 908. In various embodiments, the group messaging thread settings 902 can include an option as to whether approval is required for new members. That is, even after the creation of the group messaging thread, the creator can designate as to whether the group messaging thread is open or closed. While not shown, the group messaging thread settings 902 can include other settings with respect to the group messaging thread.

In embodiments where the creator has indicated that approval is required to join the ongoing group messaging thread (e.g., for closed threads), the ephemeral communication system 116 can continue to receive requests from users to join the group messaging thread. In these embodiments, the group messaging thread details user interface 901 can include those requests in the requesting user list 904.

In additional embodiments, the ephemeral communication system 116 can provide the creator client device 310 with notifications when new requests are added to the requesting user list 904. Further, upon the creator approving a user request of a user within the requesting user list 904, the ephemeral communication system 116 can grant the requesting user access to the group messaging thread user. In this manner, additional users can join the group messaging thread even after the group messaging thread is created and/or while the group messaging thread is active.

As explained above, the group messaging thread can include a maximum membership limit. In various embodiments, the ephemeral communication system 116 prevents the creator from adding more users to the group messaging thread in excess of the maximum membership limit, as described above. Further, in one or more embodiments, the ephemeral communication system 116 can determine that the group messaging thread has membership equal to a maximum membership limit. In response to this determination, the ephemeral communication system 116 can remove the group messaging graphical element 308 from the ephemeral content 313. That is, the ephemeral communication system 116 can continue to provide the ephemeral content 313 but without the group messaging graphical element 308.

Additionally, the ephemeral communication system 116 can determine that the membership in the group messaging thread moved back below the maximum membership limit. For example, the ephemeral communication system 116 can remove user that are inactive within the group messaging thread for a threshold time period (e.g., 30 mins, 1 hour, etc.), not active on the networking system (e.g., have closed the networking system application on their client device), and/or logged out of the networking system. In response to the number of members in the group messaging thread dropping below the maximum membership limit, the ephemeral communication system 116 can re-add the group messaging graphical element 308 to the ephemeral content 313. Accordingly, the ephemeral communication system 116 can maintain the group messaging graphical element 308 within ephemeral content 313 based on membership within the associated group messaging thread.

As mentioned above, the creator can utilize the requesting user list 904 to approve requesting users to join the group messaging thread. As shown, the requesting user list 904 is similar to the requesting user list 408 discussed previously with regard to FIG. 4B. For example, the creator can select one or more requesting users and confirm the selection utilizing the requesting user addition element 906 (e.g., "Add to Chat" button). In alternative embodiments, the ephemeral communication system 116 can forgo the requesting user addition element 906 and/or add a requesting user to the group messaging thread upon detecting the creator approving the requesting user to join the group messaging thread.

Just as the creator (or an administrator) can approve a requesting user, the ephemeral communication system 116 can enable the creator to select different actions for the ephemeral communication system 116 to apply to the requesting user. For instance, as explained previously, the requesting user list 904 can include options corresponding to one or more actions (in addition to approval or disapproval). For example, the ephemeral communication system 116 can provide a creator with the option to remove a request from a group messaging thread (e.g., before or after the group messaging thread has been established).

To illustrate, FIG. 9B shows user request removal notification 910 over the group messaging thread details user interface 901. As shown, the user request removal notification 910 can identify the requesting user. In some embodiments, the user request removal notification 910 can also inform the creator that they can silently remove the user request (e.g., the requesting user will not be notified that their request has been removed and/or denied).

Additionally, as shown in FIG. 9B, the user request removal notification 910 can include a confirmation element 912 (e.g., the "Remove Request" button) and other elements, such as a message element and a cancel action element. Upon receiving a selection of the confirmation element 912, the ephemeral communication system 116 can remove the user's request from the group messaging thread. The confirmation element 912 can be presented in accordance with a variety of designs conveying to the creator completion of the removal of the request.

Returning to FIG. 9A, as mentioned above, the group messaging thread details user interface 901 include a members list 908. The members list 908 can be similar to the members list 714 described above in connection with FIG. 7E. In addition, unlike the members list 714 described above that is shown on a user client device, the members list 908 in FIG. 9 can also include administrative options. For example, the ephemeral communication system 116 can allow the creator to designate a user in the group messaging thread as an administrator as well as remove, block, follow, or unfollow the user.

To illustrate, FIG. 9C shows the creator client device 310 updating the group messaging thread details user interface 901 to show more of the members list 908. For example, the creator scrolls the group messaging thread details user interface 901 in FIG. 9A to reveal the elements shown in FIG. 9C. In alternative embodiments, the creator client device 310 provides the updated group messaging thread details user interface 901 and members list 908 illustrated in FIC. 9C upon the user selecting the members list 908 in FIG. 9A.

As shown, the updated group messaging thread details user interface 901 includes an expanded members list 908, a leave chat option 920, and an end chat option 922. In some embodiments, in response to the creator (or another user participating in the group messaging thread) selecting the leave chat option 920, the ephemeral communication system 116 can cause the selecting creator (e.g., or the other user) to leave the group messaging thread. That is, the ephemeral communication system 116 can revoke the membership of the creator or the other user. Indeed, the leave chat option 920 can be made available to all users participating in the group messaging thread. In some embodiments, the leave chat option 920 is not available to the creator.

As shown in FIG. 9C, the updated group messaging thread details user interface 901 includes the end chat option 922. In various embodiments, the end chat option 922 is available only to a creator and/or an administrator of the group messaging thread. Upon receiving a selection of the end chat option 922, the ephemeral communication system 116 can terminate the group messaging thread. In one or more embodiments, the ephemeral communication system 116 can terminate the group messaging thread by removing all members from the group messaging thread and/or deleting or archiving the messages in the group messaging thread.

Figure 10:
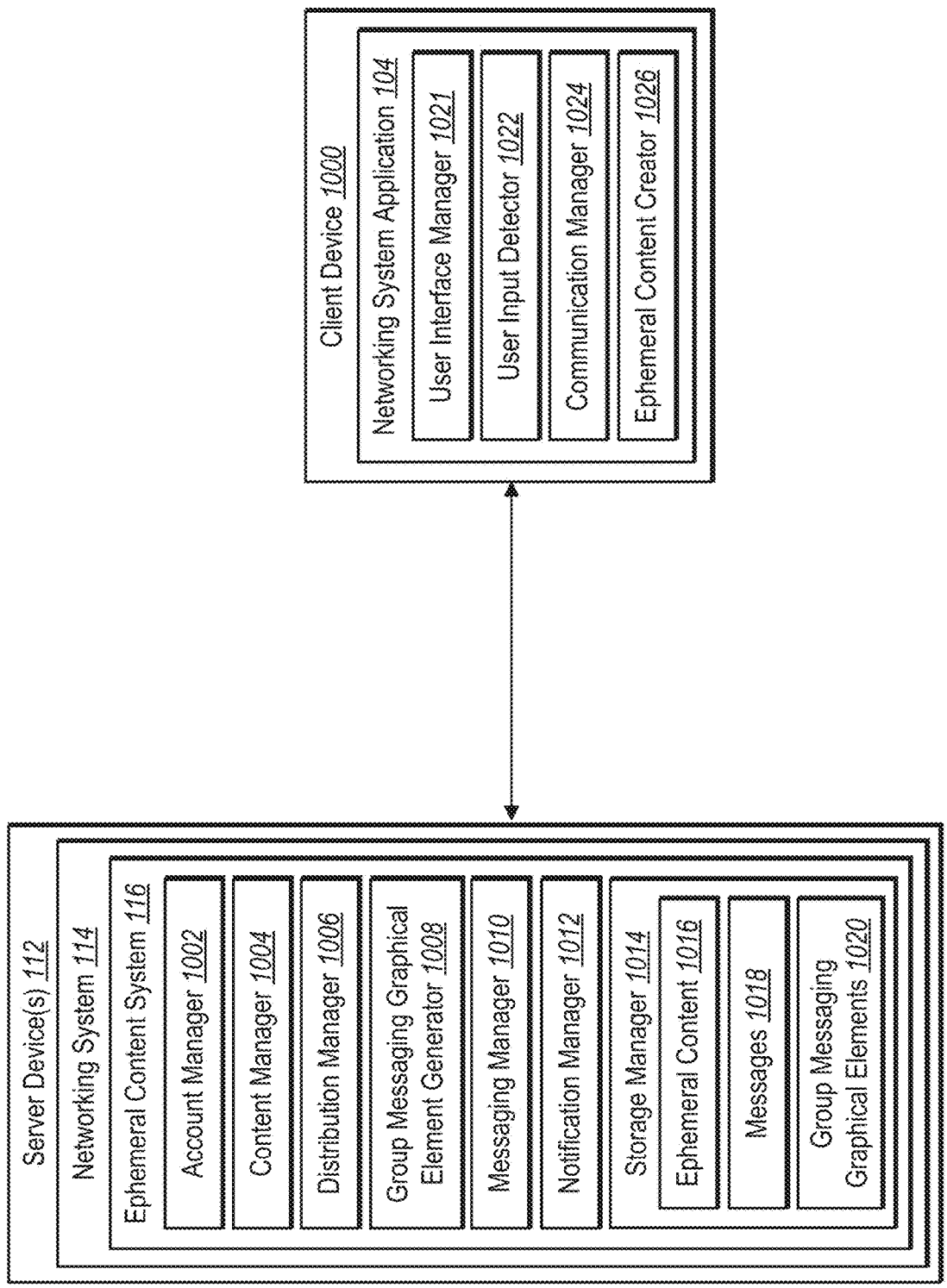
FIG. 10 illustrates a block diagram of the server device(s) and the creator client device in accordance with one or more embodiments.

Referring now to FIG. 10, additional detail will be provided regarding capabilities and components of the ephemeral communication system 116 in accordance with one or more embodiments. In particular, FIG. 10 shows a schematic diagram of an example architecture of the ephemeral communication system 116. The ephemeral communication system 116 can represent one or more embodiments of the ephemeral communication system 116 described previously.

As shown, the ephemeral communication system 116 is located on server device(s) 112 as part of the networking system 114, as described above. In general, however, the ephemeral communication system 116 can be implemented via a variety of computing devices (e.g., the user client device(s) 102a-102n, creator client device 106). For example, in some embodiments, the ephemeral communication system 116 is implemented via a non-mobile device, such as a desktop or server. Additional details with regard to the server device(s) 112 are discussed below with respect to FIG. 12.

As illustrated in FIG. 10, the ephemeral communication system 116 includes various components for performing the processes and features described herein. For example, the ephemeral communication system 116 includes an account manager 1002, a content manager 1004, a distribution manager 1006, a group messaging graphical element generator 1008, a messaging manager 1010, a notification manager 1012, and a storage manager 1014, which includes ephemeral content 1016, messages 1018, and group messaging graphical elements 1020.

As shown in FIG. 10, the ephemeral communication system 116 includes an account manager 1002. The account manager 1002 can identify, generate, monitor, and/or manage network accounts (and/or ephemeral communication system accounts). For example, the account manager 1002 can generate one or more networking accounts and can generate information (in accordance with privacy permissions) regarding networking accounts. For example, the account manager 1002 can identify other users with permissions to view digital content (e.g., ephemeral content, a group messaging thread) from the network account or share digital content to the network account (e.g., friends). The account manager 1002 can also monitor digital content distributed by network accounts.

Additionally, as illustrated in FIG. 10, the ephemeral communication system 116 includes a content manager 1004. The content manager 1004 identify, generate, create, post, distribute, remove, hide, delete, edit, modify, and/or monitor digital content (e.g., digital content 1016). As discussed above, the content manager 1004 can share ephemeral digital content, remove digital content from one or more client devices, capture or record the ephemeral digital content, and/or transmit the ephemeral digital content.

Also, as shown in FIG. 10, the ephemeral communication system 116 includes a distribution manager 1006. The distribution manager 1006 can facilitate accessing, sharing, and/or distributing content items (e.g., ephemeral content) shared or posted by users of the networking system (e.g., including the creator). For example, as described above, users of the networking system share content items with co-users of the networking system. Accordingly, the distribution manager 1006 can manage the distribution and sharing of content items (e.g., ephemeral content items).

Further, as shown in FIG. 10, the ephemeral communication system 116 includes a group messaging graphical element generator 1008. The group messaging graphical element generator 1008 can determine, create, identify, modify, store, archive, retrieve, terminate, and/or remove one or more group messaging graphical elements 1020. As described above, the group messaging graphical element generator 1008 can generate group messaging graphical elements 1020 based on creator input and/or customization. Examples of group messaging graphical element can include digital stickers, timers, events, countdowns, etc.

As illustrated in FIG. 10, the ephemeral communication system 116 includes a messaging manager 1010. The messaging manager 1010 can create, edit, send, receive, monitor, identify, determine, initiate, facilitate, move, store, and/or remove electronic messages 1018 between users of the networking system. For example, as described above, the messaging manager 1010 facilitate messaging via a group messaging thread. Further, the messaging manager 1010 can facilitate sharing of a variety of context types within a group messaging thread, as described above.

Additionally, as illustrated in FIG. 10, the ephemeral communication system 116 includes a notification manager 1012. The notification manager 1012 create, send, receive, monitor, identify, determine, initiate, facilitate, and/or remove notifications. In various embodiments, the notification manager 1012 generates notifications in response to user activity detected on the networking system. For example, the notification manager 1012 generates notifications based on requests to join a group messaging thread and/or received approval to join a group messaging thread.

As also shown in FIG. 10, the ephemeral communication system 116 includes a storage manager 1014. The storage manager 1014 maintains data for the ephemeral communication system 116. The storage manager 1014 can maintain data of any type, size, or kind, as necessary to perform the functions of the ephemeral communication system 116, including ephemeral content 1016, messages 1018, and group messaging graphical elements 1020.

Further, as shown, FIG. 10 also includes a client device 1000. The client device 1000 can represent a creator client device (e.g., 106, 310) or a user client device (102a-102n, 600), as described above. For example, in a number of embodiments, the client device 1000. In various embodiments, the ephemeral communication system 116 can be implemented via a mobile device, such as a mobile telephone, a smartphone, a PDA, a tablet, a laptop, etc. Additional details with regard to the client device 1000 are discussed below with respect to FIG. 12.

As shown, the client device 1000 includes the networking system application 104, which can correspond to the networking system 114 and/or ephemeral communication system 116 described above. In various embodiments, the networking system application 104 can include a user interface manager 1021, a user input detector 1022, a communication manager 1024, and an ephemeral content creator 1026. However, any or all of these components can be included in the ephemeral communication system 116 and/or the server device(s) 112.

As shown in FIG. 10, the networking system application 104 can include the user interface manager 1021. In various embodiments, the user interface manager 1021 can generate, create, update, change, replace, delete, remove, refresh, render, reveal, display, present, and/or provide user interfaces associated with the networking system to the creator client device (and/or to the user client devices). In general, the networking system application 108 (in connection with the creator client device) implements the user interface manager 1021 by generating and providing user interfaces. Examples of user interfaces generated and provided by the interface manager 1120 include one or more user account interfaces, content item interfaces, messaging interface, activity feed interfaces, notification feed interfaces, an insights interfaces, and other interfaces associated with the networking system.

As shown in FIG. 10, the networking system application 104 can also include a user input detector 1022. The user input detector 1022 can detect, receive, and/or facilitate user input on the creator client device 106 in any suitable manner. In some instances, the user input detector 1022 detects one or more user interactions (e.g., a single interaction, or a combination of interactions) with respect to a user interface. For example, the user input detector 1022 detects a user interaction from a keyboard, mouse, touch page, touch screen, and/or any other input device in connection with the creator client device. Further, the input detector 1022 can provide indications of the user input to the networking system 114 and/or the ephemeral communication system 116 on the server device(s) 112.

Further, as shown in FIG. 10, the networking system application 108 can include a communication manager 1024. The communication manager 1024 can manage digital communications to or from the client device 1000. For example, the communication manager 1024 can transmit content items to the server device(s) 112 (e.g., for posting via the networking system, including in a group messaging thread). Similarly, the communication manager 1024 can receive content items and other data associated with the networking system 114 and/or the ephemeral communication system 116 from the server device(s) 112.

Additionally, as illustrated in FIG. 10, the networking system application 108 can include an ephemeral content creator 1026. The ephemeral content creator 1026 can customize, generate, and/or provide ephemeral content based on creator input. For example, the ephemeral content creator 1026 can generate ephemeral content including digital video, digital images, text, graphical elements, and various multimedia. Additionally, the ephemeral content creator 1026 can facilitate the sharing of ephemeral content with co-users of the networking system based on creator input.

The components 1002-1026 can include software, hardware, or both. For example, the components 1002-1026 include one or more instructions stored on a computer-readable storage medium and executable by processors of one or more computing devices, such as a client device/or server device. When executed by the one or more processors, the computer-executable instructions of a server device, a client device, and/or ephemeral communication system 116 can cause the computing device(s) and/or systems to perform the feature learning methods described herein. Alternatively, the components 1002-1026 can include hardware, such as a special-purpose processing device to perform a certain function or group of functions. Alternatively, the components 1002-1026 can include a combination of computer-executable instructions and hardware.

Furthermore, the components 1002-1026 are, for example, implemented as one or more operating systems, as one or more stand-alone applications, as one or more modules of an application, as one or more plug-ins, as one or more library functions or functions called by other applications, and/or as a cloud computing model. Thus, the components 11021002-1026 can be implemented as a standalone application, such as a desktop or mobile application. Furthermore, the components 1002-1026 can be implemented as one or more web-based applications hosted on a remote server. The components 1002-1026 can also be implemented in a suite of mobile device applications or "apps."

Figure 11:
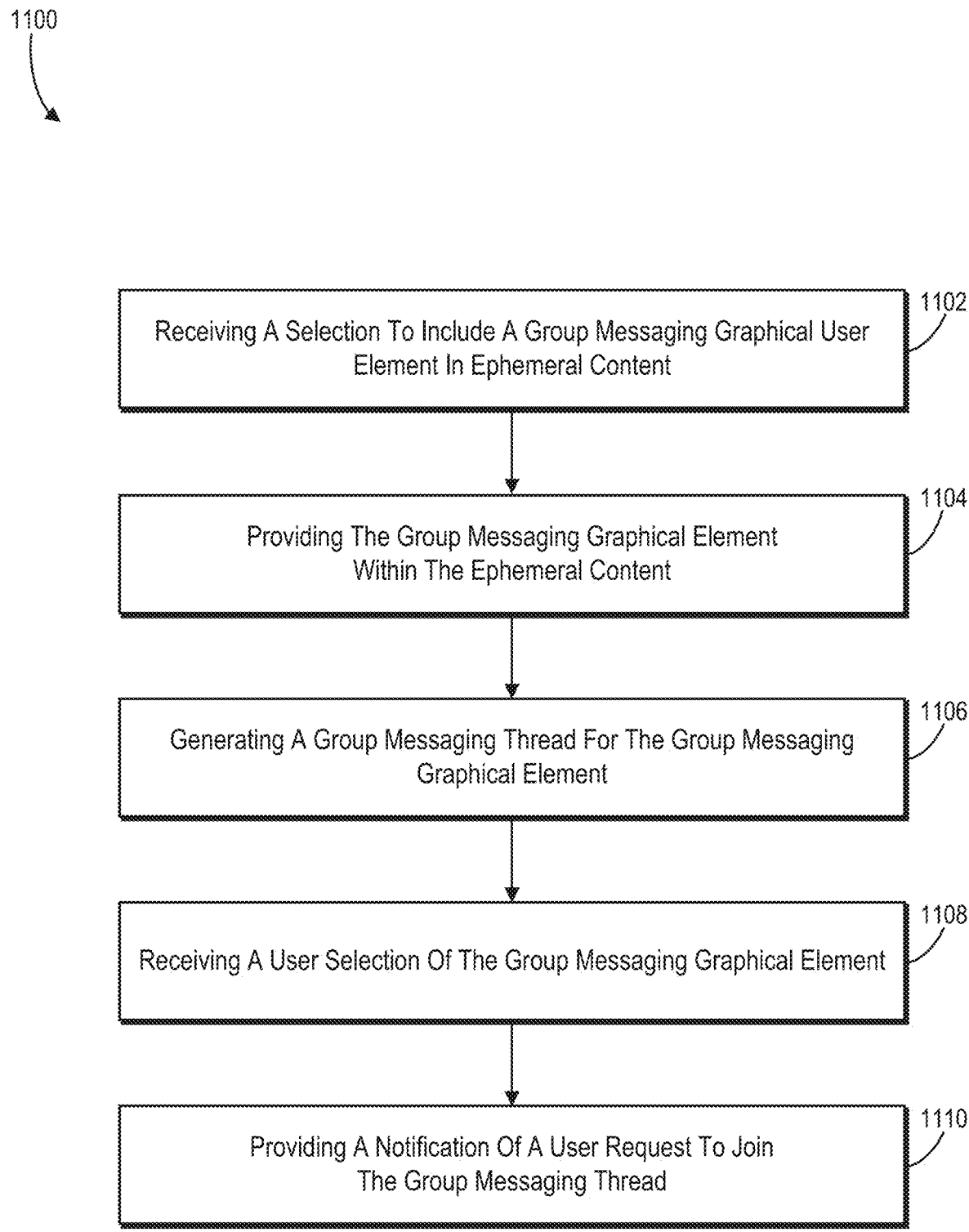
FIG. 11 illustrates a flowchart of a series of acts for creating a group messaging thread associated for ephemeral content based on a group messaging graphical element in accordance with one or more embodiments.

FIG. 1-10, the corresponding text, and the examples provide several different methods, systems, devices, techniques, components, and non-transitory computer-readable media of the ephemeral communication system 116 in accordance with the embodiments described herein. In addition to the foregoing description, one or more embodiments can also be described in terms of flowcharts comprising acts for accomplishing a particular result. For example, FIG. 11 illustrates flowcharts of a series of acts 1100 of creating a group messaging thread associated for ephemeral content based on a group messaging graphical element in accordance with one or more embodiments. In addition, FIG. 12 may be performed with more or fewer acts. Further, the acts may be performed in differing orders. Additionally, the acts described herein may be repeated or performed in parallel with one another or parallel with different instances of the same or similar acts.

While FIG. 11 illustrates a series of acts 1100 and a series of acts 1100 according to particular embodiments, alternative embodiments may omit, add to, reorder, and/or modify any of the acts shown. The series of acts of FIG. 11 can be performed as part of a method. Alternatively, a non-transitory computer-readable medium can comprise instructions, when executed by one or more processors, cause a computing device (e.g., a client device and/or a server device) to perform the series of acts of FIG. 11. In still further embodiments, a system performs the acts of FIG. 11.

As shown in FIG. 11, the series of acts 1100 includes an act 1102 for receiving a selection to include a group messaging graphical element in ephemeral content. In particular, the act 1102 can include receiving, from a first client device associated with a first user (e.g., a creator client device associated with a creator), a first selection (e.g., a creator selection) to include a group messaging graphical element within ephemeral content. Specifically, the act 1102 can include detecting creator selection of a group messaging graphical element within an ephemeral content generation graphical user interface. Further, the act 1102 can include detecting creator specification of a name for an associated group message and/or selection of a previously saved group messaging graphical element.

Additionally, in one or more embodiments, the act 1102 can include receiving, from the first client device, user input selecting the second user for inclusion in the group messaging thread. In some embodiments, generating the group messaging thread is in response to receiving the user input selecting the second user for inclusion in the group messaging thread.

As shown in FIG. 11, the series of acts 1100 includes an act 1104 for providing the group messaging graphical element within the ephemeral content. In particular, the act 1104 can include providing, based on the first selection, the group messaging graphical element to be displayed within the ephemeral content. Further, the act 1104 can include generating the group messaging graphical element and including the group messaging graphical element within the ephemeral content. In some embodiments, the group messaging graphical element is associated with a group message. In additional embodiments, the group messaging graphical element is a selectable graphical element.

In one or more embodiments, the act 1104 can also include modifying the group message graphical element to include an expiration time that triggers deletion of the group messaging thread. In additional embodiments, the ephemeral content further includes a countdown graphical element indicating the expiration time. Further, in some embodiments, the act 1104 can include receiving, from the first client device, the ephemeral content, analyzing the ephemeral content to identify a plurality of group messaging graphical elements and providing the plurality of group messaging graphical element to the first client device.

As shown in FIG. 11, the series of acts 1100 includes an act 1106 for generating a group messaging thread for the group messaging graphical element. In particular, the act 1106 can include generating a group messaging thread associated with the group messaging graphical element and with the ephemeral content. In one or more embodiments, the act 1106 can include generating the group messaging thread in response to detecting creator selection of an option to start the group messaging thread. Further, in some embodiments, the act 1106 can include generating the group messaging thread in response to associating the group messaging graphical element with the ephemeral content. In various embodiments, the act 1106 can also include generating the group messaging thread in response to generating the group messaging thread.

As shown in FIG. 11, the series of acts 1100 includes an act 1108 for receiving a user selection of the group messaging graphical element. In particular, the act 1108 can include receiving, from a second client device associated with a second user, a second selection of the second user selecting the group messaging graphical element within the ephemeral content. In one or more embodiments, the act 1108 can include presenting, via the user device, the ephemeral content to the user. Further, in some embodiments, the act 1108 can include presenting the group messaging graphical element as part of the ephemeral content and receiving, via the user device, touch input selecting the group messaging graphical element.

In various embodiments, the act 1108 can also include the group message graphical element having a graphical element that overlays a portion of the ephemeral content. In one or more embodiments, receiving the first selection can include receiving, via the first client device associated with the first user, a selection of the group message graphical element from a plurality of graphical elements.

As shown in FIG. 11, the series of acts 1100 includes an act 1110 for providing a notification of a user request to join the group messaging thread. In particular, the act 1110 can include providing, to the first user via the first client device and in response to detecting the second selection, a notification of the second user requesting to join the group messaging thread associated with the ephemeral content. In one or more embodiments, the act 1110 can include presenting a notification to the creator for approval of a requesting user to join the group messaging thread (e.g., a closed group messaging thread). In some embodiments, the act 1110 can include presenting a notification to the creator of another user joining the group messaging thread (e.g., an open or selective group messaging thread).

In various embodiments, the act 1110 can also include providing, based on the second selection, a request to the first client device to approve the second user for inclusion in the group messaging thread; receiving, via the first user device, approval to add the second user to the group messaging thread; providing, based on receiving the approval, the second user with access to the group messaging thread; and providing, to the second client device, a notification that the second user has been authorized to join the group messaging thread. Additionally, the act 1110 can include determining that the first user is directly connected to the second user via a networking system and automatically providing the second user access to the group messaging thread based on the first user being directly connected to the second user. Further, the act 1110 can include determining a maximum membership threshold designating the highest number of users permitted to join the group messaging thread; and in response to determining that the group messaging thread includes a number of members equal to the maximum membership threshold, removing the group message graphical element from the ephemeral content.

Additionally, the series of acts 1100 can include receiving, from the first client device, a third selection requesting generation of additional ephemeral content, providing the group message graphical element as a selectable graphical element to the first client device during creation of additional ephemeral content, receiving, from the first client device, a fourth selection to include the group messaging graphical element within the additional ephemeral content, associating the additional ephemeral content with group message thread based on including the group messaging graphical element within the additional ephemeral content, and providing, based on the fourth selection, the group messaging graphical element to be displayed within the additional ephemeral content.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
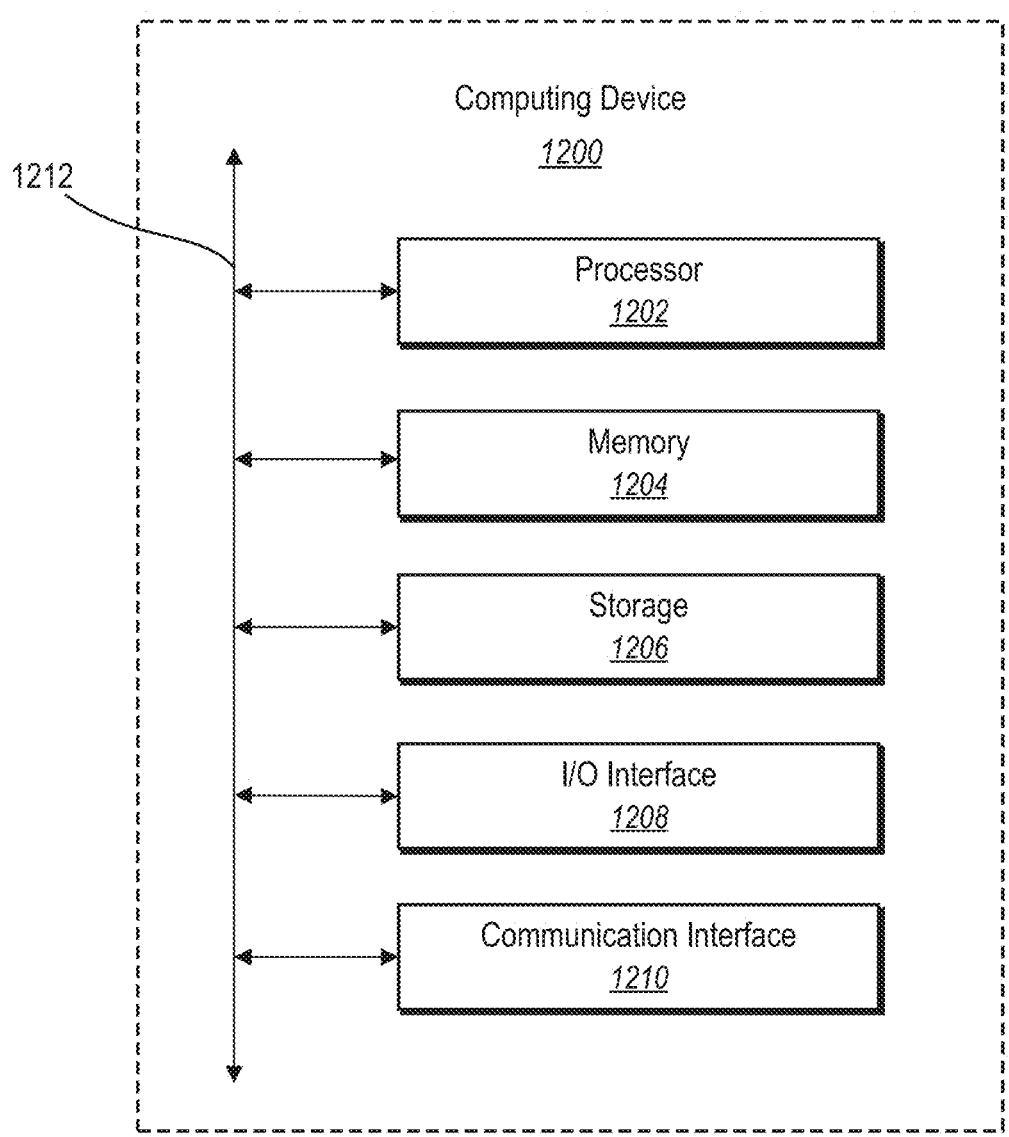
FIG. 12 illustrates a block diagram of an example computing device for implementing one or more embodiments of the present disclosure.

FIG. 12 illustrates a block diagram of an example computing device 1200 that may be configured to perform one or more of the processes described above. One will appreciate that one or more computing devices, such as the computing device 1200 may represent the computing devices described above (e.g., server device(s) 112, user client device(s) 102a-102n, 600, and creator client device 106, 310). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

Figure 13:
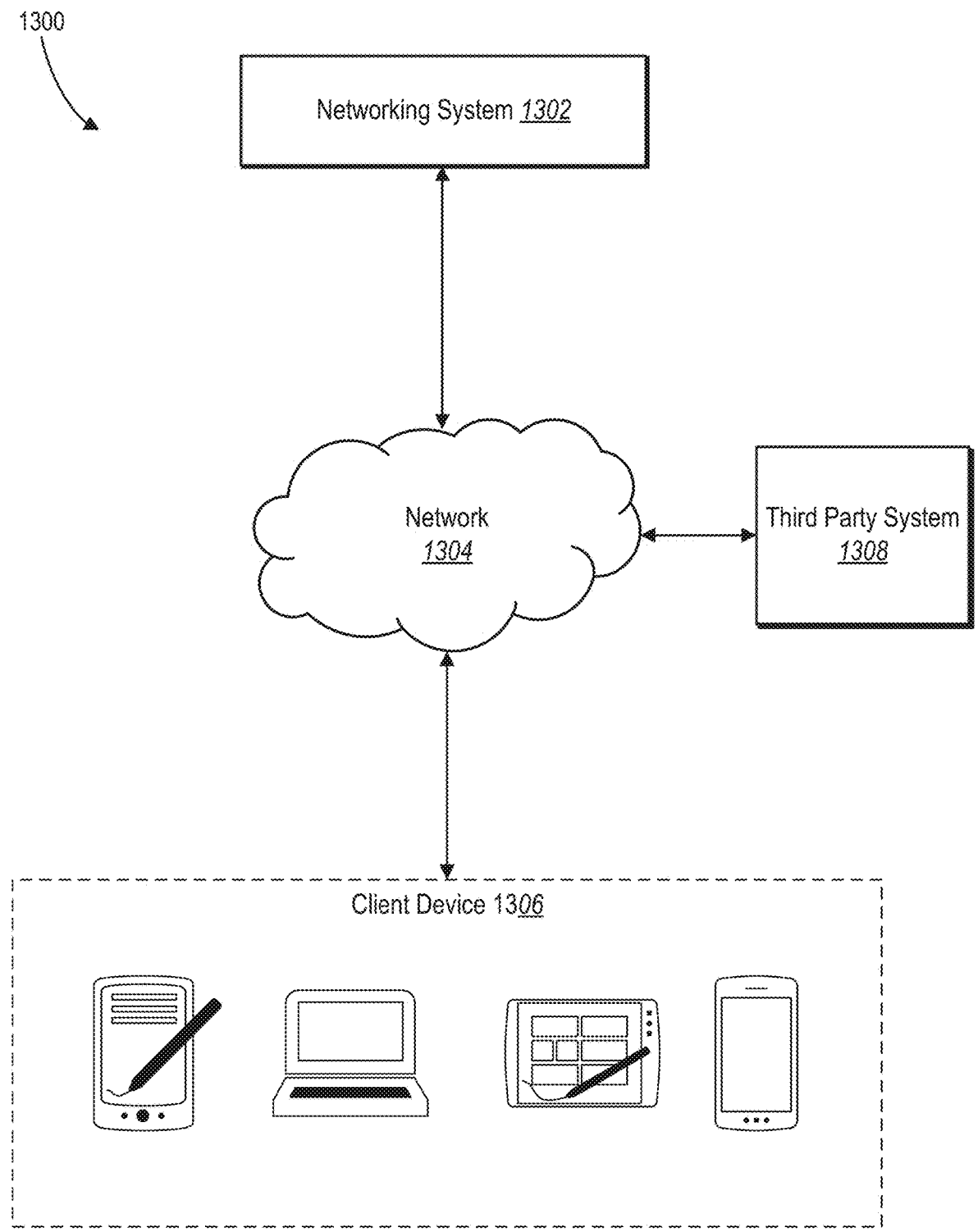
FIG. 13 illustrates a network environment of a social networking system according to one or more embodiments.

FIG. 13 illustrates an example network environment 1300 of a networking system. The network environment 1300 includes a networking system 1302 (e.g., the networking system 114 and/or a social networking system), a client device 1306, and a third-party system 1308 connected to each other by a network 1304. Although FIG. 13 illustrates a particular arrangement of the networking system 1302, the client device 1306, the third-party system 1308, and the network 1304, this disclosure contemplates any suitable arrangement of the devices, systems, and networks. For example, the client device 1306 and the networking system 1302 may be physically or logically co-located with each other in whole, or in part. Moreover, although FIG. 13 illustrates a single client device 1306, the networking system 1302, the third-party system 1308, and the network 1304, this disclosure contemplates any suitable number of devices, systems, and networks.

This disclosure contemplates any suitable network. For example, one or more portions of the network 1304 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 1304 may include one or more networks.

Links may connect the networking system 1302, the client device 1306, and the third-party system 1308 to the network 1304 or to each other. In particular embodiments, one or more links include one or more wireline (e.g., Digital Subscriber Line (DSL) or Data Over Cable Service Interface Specification (DOCSIS)), wireless (e.g., Wi-Fi or Worldwide Interoperability for Microwave Access (WiMAX)), or optical (e.g., Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1300. One or more first links may differ in one or more respects from one or more second links.

In particular embodiments, the client device 1306 may be an electronic device including hardware, software, or embedded logic components or a combination of two or more such components and capable of carrying out the appropriate functionalities implemented or supported by the client device 1306. For example, the client device 1306 may include any of the computing devices discussed above in relation to FIG. 13. The client device 1306 may enable a network user to access the network 1304. The client device 1306 may enable its user to communicate with other users associated with other client devices.

In particular embodiments, the client device 1306 may include a web browser, such as MICROSOFT INTERNET EXPLORER, GOOGLE CHROME, MOZILLA FIREFOX, APPLE SAFARI, and may have one or more add-ons, plug-ins, or other extensions (e.g., toolbars). A user at the client device 1306 may enter a Uniform Resource Locator (URL) or other address directing the web browser to a particular server (such as server, or a server associated with the third-party system 1308), and the web browser may generate a Hypertext Transfer Protocol (HTTP) request and communicate the HTTP request to server. The server may accept the HTTP request and communicate to the client device 1306 one or more Hypertext Markup Language (HTML) files responsive to the HTTP request.

The client device 1306 may render a webpage based on the HTML files from the server for presentation to the user. For example, webpages may render from HTML files, Extensible Hypertext Markup Language (XHTML) files, or Extensible Markup Language (XML) files, according to particular needs. Such pages may also execute scripts such as those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the networking system 1302 may be a network-addressable computing system that can host an online network of users (e.g., a social networking system or an ephemeral communication system). In some embodiments, such as the illustrated embodiment, the networking system 1302 implements the ephemeral communication system 116.

The networking system 1302 may generate, store, receive, and send networking data, such as user-profile data, concept-profile data, graph information (e.g., social-graph information), or other suitable data related to the online network of users. The networking system 1302 may be accessed by the other components of network environment 1300 either directly or via the network 1304. In particular embodiments, the networking system 1302 may include one or more servers. Each server may be a unitary server or a distributed server spanning multiple computers or multiple datacenters. Servers may be of various types, such as web server, news server, mail server, message server, advertising server, file server, application server, exchange server, database server, proxy server, another server suitable for performing functions or processes described herein, or any combination thereof.

In one or more embodiments, each server may include hardware, software, or embedded logic components or a combination of two or more such components for carrying out the appropriate functionalities implemented or supported by a server. In particular embodiments, the networking system 1302 may include one or more data stores. Data stores may be used to store various types of information. In particular embodiments, the information stored in data stores may be organized according to specific data structures. In particular embodiments, each data store may be a relational, columnar, correlation, or another suitable database. Although this disclosure describes or illustrates particular types of databases, this disclosure contemplates any suitable types of databases. Particular embodiments may provide interfaces that enable the networking system 1302, the client device 1306, or the third-party system 1308 to manage, retrieve, modify, add, or delete, the information stored in a data store.

In particular embodiments, the networking system 1302 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. The networking system 1302 may provide users of the online network of users the ability to communicate and interact with other users. In particular embodiments, users may join the online network of users via the networking system 1302 and then add connections (e.g., relationships) to a number of other users of the networking system 1302 whom they want to be connected to. Herein, the term "friend" may refer to any other user of the networking system 1302 with whom a user has formed a connection, association, or relationship via the networking system 1302.

In particular embodiments, the networking system 1302 may provide users with the ability to take actions on various types of items or objects, supported by the networking system 1302. For example, the items and objects may include groups or social networks to which users of the networking system 1302 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the networking system 1302 or by an external system of the third-party system 1308, which is separate from the networking system 1302 and coupled to the networking system 1302 via the network 1304.

In particular embodiments, the networking system 1302 may be capable of linking a variety of entities. For example, the networking system 1302 may enable users to interact with each other as well as receive content from the third-party systems 1308 or other entities, or to allow users to interact with these entities through an application programming interfaces (API) or other communication channels.

In particular embodiments, the third-party system 1308 may include one or more types of servers, one or more data stores, one or more interfaces, including but not limited to APIs, one or more web services, one or more content sources, one or more networks, or any other suitable components, e.g., that servers may communicate with. The third-party system 1308 may be operated by a different entity from an entity operating the networking system 1302. In particular embodiments, however, the networking system 1302 and the third-party systems 1308 may operate in conjunction with each other to provide social networking services to users of the networking system 1302 or the third-party systems 1308. In this sense, the networking system 1302 may provide a platform, or backbone, which other systems, such as the third-party systems 1308, may use to provide social networking services and functionality to users across the Internet.

In particular embodiments, the third-party system 1308 may include a third-party content object provider. A third-party content object provider may include one or more sources of content objects, which may be communicated to a client device 1306. For example, content objects may include information regarding things or activities of interest to the user, such as movie showtimes, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the networking system 1302 also includes user-generated content objects, which may enhance a user's interactions with the networking system 1302. User-generated content may include anything a user can add, upload, send, or "post" to the networking system 1302. For example, a user communicates posts to the networking system 1302 from a client device 1306. Posts may include data such as status updates or other textual data, location information, photos, videos, links, music or other similar data or media. Content may also be added to the networking system 1302 by a third-party through a "communication channel," such as a newsfeed or stream.

In particular embodiments, the networking system 1302 may include a variety of servers, sub-systems, programs, modules, logs, and data stores. In particular embodiments, the networking system 1302 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The networking system 1302 may also include suitable components such as network interfaces, security mechanisms, load balancers, failover servers, management-and-network-operations consoles, other suitable components, or any suitable combination thereof. In particular embodiments, the networking system 1302 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. For example, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the networking system 1302 to one or more client device 1306 or one or more the third-party system 1308 via the network 1304. The web server may include a mail server or other messaging functionality for receiving and routing messages between the networking system 1302 and one or more client device 1306. An API-request server may allow the third-party system 1308 to access information from the networking system 1302 by calling one or more APIs. An action logger may be used to receive communications from a web server about a user's actions on or off networking system 1302. In conjunction with the action log, a third-party-content-object log may be maintained of user exposures to third-party-content objects. A notification controller may provide information regarding content objects to a client device 1306. Information may be pushed to a client device 1306 as notifications, or information may be pulled from client device 1306 responsive to a request received from client device 1306. Authorization servers may be used to enforce one or more privacy settings of the users of the networking system 1302. A privacy setting of a user determines how particular information associated with a user can be shared. The authorization server may allow users to opt in to or opt out of having their actions logged by the networking system 1302 or shared with other systems (e.g., the third-party system 1308), such as by setting appropriate privacy settings. Third-party-content-object stores may be used to store content objects received from third parties, such as the third-party system 1308. Location stores may be used for storing location information received from client device 1306 associated with users. Advertisement-pricing modules may combine social information, the current time, location information, or other suitable information to provide relevant advertisements, in the form of notifications, to a user.

Figure 14:
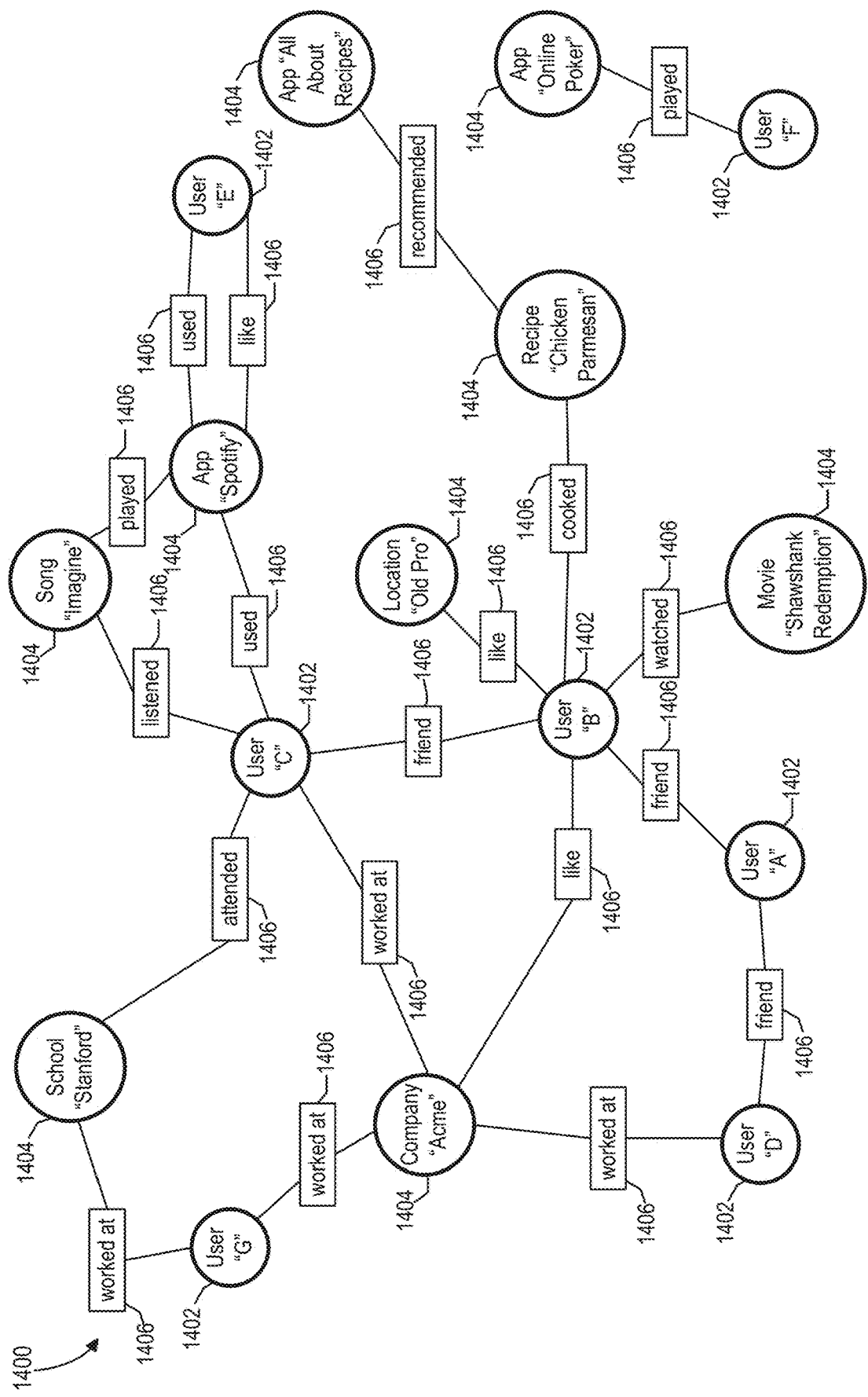
FIG. 14 illustrates an example social graph for a social networking system in accordance with one or more embodiments.

FIG. 14 illustrates example social graph 1400. In particular embodiments, the networking system 1302 may store one or more social graphs 1400 in one or more data stores. In particular embodiments, social graph 1400 may include multiple nodes—which may include multiple user nodes 1402 or multiple concept nodes 1404—and multiple edges 1406 connecting the nodes. Example social graph 1400 illustrated in FIG. 14 is shown, for didactic purposes, in a two-dimensional visual map representation. In particular embodiments, the networking system 1302, the client device 1306, or the third-party system 1308 may access social graph 1400 and related social-graph information for suitable applications. The nodes and edges of social graph 1400 may be stored as data objects, for example, in a data store (such as a social-graph database). Such a data store may include one or more searchable or quarriable indexes of nodes or edges of social graph 1400.

In particular embodiments, a user node 1402 may correspond to a user of the networking system 1302. For example, a user may be an individual (human user), an entity (e.g., an enterprise, business, or third-party application), or a group (e.g., of individuals or entities) that interacts or communicates with or over networking system 1302. In particular embodiments, when a user registers for an account with the networking system 1302, the networking system 1302 may create a user node 1402 corresponding to the user and store the user node 1402 in one or more data stores. Users and user nodes 1402 described herein may, where appropriate, refer to registered users and user nodes 1402 associated with registered users. In addition, or as an alternative, users and user nodes 1402 described herein may, where appropriate, refer to users that have not registered with the networking system 1302. In particular embodiments, a user node 1402 may be associated with information provided by a user or information gathered by various systems, including the networking system 1302. For example, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1404 may correspond to a concept. For example, a concept may correspond to a place (e.g., a movie theater, restaurant, landmark, or city); a website (e.g., a website associated with network system 1302 or a third-party website associated with a web-application server); an entity (e.g., a person, business, group, sports team, or celebrity); a resource (e.g., an audio file, video file, digital photo, text file, structured document, or application) which may be located within the networking system 1302 or on an external server, such as a web-application server; real or intellectual property (e.g., a sculpture, painting, movie, game, song, idea, photograph, or written work); a game; an activity; an idea or theory; another suitable concept; or two or more such concepts. A concept node 1404 may be associated with information of a concept provided by a user or information gathered by various systems, including the networking system 1302. For example, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1404 may be associated with one or more data objects corresponding to information associated with concept node 1404. In particular embodiments, a concept node 1404 may correspond to one or more webpages.

In particular embodiments, a node in the social graph 1400 may represent or be represented by a webpage (which may be referred to as a "profile page"). Profile pages may be hosted by or accessible to the networking system 1302. Profile pages may also be hosted on third-party websites associated with a third-party system 1308. For example, a profile page corresponding to a particular external webpage may be the particular external webpage, and the profile page may correspond to a particular concept node 1404. Profile pages may be viewable by all or a selected subset of other users. For example, a user node 1402 may have a corresponding user-profile page in which the corresponding user may add content, make declarations, or otherwise express himself or herself. As another example and not by way of limitation, a concept node 1404 may have a corresponding concept-profile page in which one or more users may add content, make declarations, or express themselves, particularly in relation to the concept corresponding to concept node 1404.

In particular embodiments, a concept node 1404 may represent a third-party webpage or resource hosted by the third-party system 1308. The third-party webpage or resource may include, among other elements, content, a selectable or another icon, or another inter-actable object (which may be implemented, for example, in JavaScript, AJAX, or PHP codes) representing an action or activity. For example, a third-party webpage may include a selectable icon such as "like," "check-in," "eat," "recommend," or another suitable action or activity. A user viewing the third-party webpage may perform an action by selecting one of the icons (e.g., "eat"), causing a client device 1306 to send to the networking system 1302 a message indicating the user's action. In response to the message, the networking system 1302 may create an edge (e.g., an "eat" edge) between a user node 1402 corresponding to the user and a concept node 1404 corresponding to the third-party webpage or resource and store edge 1406 in one or more data stores.

In particular embodiments, a pair of nodes in the social graph 1400 may be connected to each other by one or more edges 1406. An edge 1406 connecting a pair of nodes may represent a relationship between the pair of nodes. In particular embodiments, an edge 1406 may include or represent one or more data objects or attributes corresponding to the relationship between a pair of nodes. For example, a first user may indicate that a second user is a "friend" of the first user. In response to this indication, the networking system 1302 may send a "friend request" to the second user.

If the second user confirms the "friend request," networking system 1302 may create an edge 1406 connecting the first user's user node 1402 to the second user's user node 1402 in the social graph 1400 and store edge 1406 as social-graph information in one or more of data stores. In the example of FIG. 14, social graph 1400 includes an edge 1406 indicating a friend relation between user nodes 1402 of user "A" and user "B" and an edge indicating a friend relation between user nodes 1402 of user "C" and user "B." Although this disclosure describes or illustrates particular edges 1406 with particular attributes connecting particular user nodes 1402, this disclosure contemplates any suitable edges 1406 with any suitable attributes connecting user nodes 1402. For example, an edge 1406 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 1400 by one or more edges 1406.

In particular embodiments, an edge 1406 between a user node 1402 and a concept node 1404 may represent a particular action or activity performed by a user associated with user node 1402 toward a concept associated with a concept node 1404. For example, as illustrated in FIG. 14, a user may "like," "attended," "played," "listened," "cooked," "worked at," or "watched" a concept, each of which may correspond to an edge type or subtype. A concept-profile page corresponding to a concept node 1404 may include, for example, a selectable "check-in" icon (e.g., a clickable "check-in" icon) or a selectable "add to favorites" icon. Similarly, after a user clicks these icons, the networking system 1302 may create a "favorite" edge or a "check-in" edge in response to a user's action corresponding to a respective action.

As another example and not by way of limitation, a user (user "C") may listen to a particular song ("Ramble On") using a particular application (SPOTIFY, which is an online music application). In this case, the networking system 1302 may create a "listened" edge 1406 and a "used" edge (as illustrated in FIG. 14) between user nodes 1402 corresponding to the user and concept nodes 1404 corresponding to the song and application to indicate that the user listened to the song and used the application.

Moreover, the networking system 1302 may create a "played" edge 1406 (as illustrated in FIG. 14) between concept nodes 1404 corresponding to the song and the application to indicate that the particular song was played by the particular application. In this case, "played" edge 1406 corresponds to an action performed by an external application (SPOTIFY) on an external audio file (the song "Imagine"). Although this disclosure describes particular edges 1406 with particular attributes connecting user nodes 1402 and concept nodes 1404, this disclosure contemplates any suitable edges 1406 with any suitable attributes connecting user nodes 1402 and concept nodes 1404.

Furthermore, although this disclosure describes edges between a user node 1402 and a concept node 1404 representing a single relationship, this disclosure contemplates edges between a user node 1402 and a concept node 1404 representing one or more relationships. For example, an edge 1406 may represent both that a user likes and has used at a particular concept. Alternatively, another edge 1406 may represent each type of relationship (or multiples of a single relationship) between a user node 1402 and a concept node 1404 (as illustrated in FIG. 14 between user node 1402 for user "E" and concept node 1404 for "SPOTIFY").

In particular embodiments, the networking system 1302 may create an edge 1406 between a user node 1402 and a concept node 1404 in the social graph 1400. For example, a user viewing a concept-profile page (e.g., by using a web browser or a special-purpose application hosted by the user's client device 1306) may indicate that they likes the concept represented by the concept node 1404 by clicking or selecting a "Like" icon, which may cause the user's client device 1306 to send to the networking system 1302 a message indicating the user's liking of the concept associated with the concept-profile page.

In response to the message, the networking system 1302 may create an edge 1406 between user node 1402 associated with the user and concept node 1404, as illustrated by "like" edge 1406 between the user and concept node 1404. In particular embodiments, the networking system 1302 may store an edge 1406 in one or more data stores. In particular embodiments, an edge 1406 may be automatically formed by the networking system 1302 in response to a particular user action. For example, if a first user uploads a picture, watches a movie, or listens to a song, an edge 1406 may be formed between user node 1402 corresponding to the first user and concept nodes 1404 corresponding to those concepts. Although this disclosure describes forming particular edges 1406 in particular manners, this disclosure contemplates forming any suitable edges 1406 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on the networking system 1302)

A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a predetermined area of a profile page of a user or other page, presented with additional information associated with the advertiser, bumped up or otherwise highlighted within news feeds or tickers of other users, or otherwise promoted. The advertiser may pay to have the social action promoted. For example, advertisements may be included among the search results of a search-results page, where sponsored content is promoted over non-sponsored content.

In particular embodiments, an advertisement may be requested for display within social networking system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition, or as an alternative, an advertisement may be displayed within an application. An advertisement may be displayed within dedicated pages, requiring the user to interact with or watch the advertisement before the user may access a page or utilize an application. For example, the user may view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the networking system 1302 may execute or modify a particular action of the user.

An advertisement may also include social networking-system functionality that a user may interact with. For example, an advertisement may enable a user to "like" or otherwise endorse the advertisement by selecting an icon or link associated with the endorsement. As another example and not by way of limitation, an advertisement may enable a user to search (e.g., by executing a query) for content related to the advertiser. Similarly, a user may share the advertisement with another user (e.g., through the networking system 1302) or RSVP (e.g., through the networking system 1302) to an event associated with the advertisement. In addition, or as an alternative, an advertisement may include a social networking system context directed to the user. For example, an advertisement may display information about a friend of the user within the networking system 1302 who has taken an action associated with the subject matter of the advertisement.

In particular embodiments, the networking system 1302 may determine the social-graph affinity (which may be referred to herein as "affinity") of various social-graph entities for each other. Affinity may represent the strength of a relationship or level of interest between particular objects associated with the online network of users, such as users, concepts, content, actions, advertisements, other objects associated with the online network of users, or any suitable combination thereof. Affinity may also be determined with respect to objects associated with the third-party systems 1308 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the networking system 1302 may measure or quantify social-graph affinity using an affinity coefficient (which may be referred to herein as "coefficient"). The coefficient may represent or quantify the strength of a relationship between particular objects associated with the online network of users. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online network of users. For example, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the networking system 1302 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static, or the weights may change according to, for example, the user, the type of relationship, the type of action, the user's location, and so forth. Ratings for the factors may be combined according to their weights to determine an overall coefficient for the user. For example, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the networking system 1302 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. For example, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the networking system 1302 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the networking system 1302 may calculate a coefficient based on a user's actions. The networking system 1302 may monitor such actions on the online network of users, on the third-party system 1308, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, the networking system 1302 may calculate a coefficient based on the user's actions with particular types of content. The content may be associated with the online network of users, the third-party system 1308, or another suitable system. The content may include users, profile pages, posts, news stories, headlines, instant messages, chat room conversations, emails, advertisements, pictures, video, music, other suitable objects, or any combination thereof. The networking system 1302 may analyze a user's actions to determine whether one or more of the actions indicate an affinity for the subject matter, content, other users, and so forth. For example, if a user may make frequently posts content related to "coffee" or variants thereof, the networking system 1302 may determine the user has a high coefficient with respect to the concept "coffee." Particular actions or types of actions may be assigned a higher weight and/or rating than other actions, which may affect the overall calculated coefficient. For example, if a first user emails a second user, the weight or the rating for the action may be higher than if the first user views the user-profile page for the second user.

In particular embodiments, the networking system 1302 may calculate a coefficient based on the type of relationship between particular objects. Referencing the social graph 1400, the networking system 1302 may analyze the number and/or type of edges 1406 connecting particular user nodes 1402 and concept nodes 1404 when calculating a coefficient. For example, user nodes 1402 that are connected by a spouse-type edge (representing that the two users are married) may be assigned a higher coefficient than a user nodes 1402 that are connected by a friend-type edge. In other words, depending upon the weights assigned to the actions and relationships for the particular user, the overall affinity may be determined to be higher for content about the user's spouse than for content about the user's friend.

In particular embodiments, the relationships a user has with another object may affect the weights and/or the ratings of the user's actions with respect to calculating the coefficient for that object. For example, if a user is tagged in a first photo, but merely likes a second photo, the networking system 1302 may determine that the user has a higher coefficient with respect to the first photo than the second photo because having a tagged-in-type relationship with content may be assigned a higher weight and/or rating than having a like-type relationship with content.

In some embodiments, the networking system 1302 may calculate a coefficient for a first user based on the relationship one or more second users have with a particular object. In other words, the connections and coefficients other users have with an object may affect the first user's coefficient for the object. For example, if a first user is connected to or has a high coefficient for one or more second users, and those second users are connected to or have a high coefficient for a particular object, the networking system 1302 may determine that the first user should also have a relatively high coefficient for the particular object.

In one or more embodiments, the coefficient may be based on the degree of separation between particular objects. The degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends."

Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1400. For example, social-graph entities that are closer in the social graph 1400 (i.e., fewer degrees of separation) may have a higher coefficient than entities that are further apart in the social graph 1400.

In particular embodiments, the networking system 1302 may calculate a coefficient based on location information. Objects that are geographically closer to each other may be considered to be more related, or of more interest, to each other than more distant objects. In some embodiments, the coefficient of a user towards a particular object may be based on the proximity of the object's location to a current location associated with the user (or the location of a client device 1306 of the user). A first user may be more interested in other users or concepts that are closer to the first user. For example, if a user is one mile from an airport and two miles from a gas station, the networking system 1302 may determine that the user has a higher coefficient for the airport than the gas station based on the proximity of the airport to the user.

In particular embodiments, the networking system 1302 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the networking system 1302 may provide information that is relevant to a user's interests and current circumstances, increasing the likelihood that they will find such information of interest.

In some embodiments, the networking system 1302 may generate content based on coefficient information. Content objects may be provided or selected based on coefficients specific to a user. For example, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object.

In one or more embodiments, the networking system 1302 may generate search results based on coefficient information. The search results for a particular user may be scored or ranked based on the coefficient associated with the search results with respect to the querying user. For example, search results corresponding to objects with higher coefficients may be ranked higher on a search-results page than results corresponding to objects having lower coefficients.

In particular embodiments, the networking system 1302 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online network of users, from the third-party system 1308 (e.g., via an API or another communication channel), or from another suitable system. In response to the request, the networking system 1302 may calculate the coefficient (or access the coefficient information if it has previously been calculated and stored).

In various embodiments, the networking system 1302 may measure an affinity with respect to a particular process. Different processes (both internal and external to the online network of users) may request a coefficient for a particular object or set of objects. The networking system 1302 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 11, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, filed Oct. 1, 2012, each of which is incorporated by reference in their entirety.

In particular embodiments, one or more of the content objects of the online network of users may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online network of users. Where the privacy settings for an object allow a particular user to access that object, the object may be described as being "visible" with respect to that user. For example, a user of the online network of users may specify privacy settings for a user-profile page identify a set of users that may access the work experience information on the user-profile page, thus excluding other users from accessing the information.

In particular embodiments, the privacy settings may specify a "blocked list" of users that should not be allowed to access certain information associated with the object. In other words, the blocked list may specify one or more users or entities for which an object is not visible. For example, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online network of users. For example, a particular concept node 1404 corresponding to a particular photo may have a privacy setting specifying that the photo may only be accessed by users tagged in the photo and their friends.

In particular embodiments, privacy settings may allow users to opt in or opt out of having their actions logged by the networking system 1302 or shared with other systems (e.g., the third-party system 1308). In particular embodiments, the privacy settings associated with an object may specify any suitable granularity of permitted access or denial of access. For example, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of the third-party systems 1308, particular applications (e.g., third-party applications, external web sites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, the networking system 1302 may send a request to the data store for the object. The request may identify the user associated with the request and may only be sent to the user (or a client device 1306 of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user.

In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific example embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
receiving, from a first client device associated with a first user, a first selection to include a group messaging graphical element within ephemeral content in a social networking feed;
identifying one or more criteria for removing the group messaging graphical element from the ephemeral content;
providing, based on the first selection, the group messaging graphical element to be displayed within the ephemeral content;
generating, by at least one processor, a group messaging thread associated with the group messaging graphical element posted in the social networking feed;
receiving, from a second client device associated with a second user, a second selection of the second user selecting the group messaging graphical element within the ephemeral content posted in the social networking feed;
providing, to the first user via the first client device and in response to detecting the second selection, a notification of the second user requesting to join the group messaging thread associated with the ephemeral content; and
based on determining that the one or more criteria for removing the group messaging graphical element from the ephemeral content has been met, removing the group messaging graphical element from the ephemeral content posted in the social networking feed.

2. The method of claim 1, further comprising:
receiving, from the first client device, user input selecting the second user for inclusion in the group messaging thread; and
wherein generating the group messaging thread occurs in response to receiving the user input selecting the second user for inclusion in the group messaging thread.

3. The method of claim 1, wherein:
the group messaging thread comprises group message content separate from the ephemeral content posted in the social networking feed;
the social networking feed comprises the ephemeral content; and
the social networking feed is separate from the group messaging thread.

4. The method of claim 1, further comprising:
providing, based on the second selection, a request to the first client device to approve the second user for inclusion in the group messaging thread;
receiving, via the first client device, approval to add the second user to the group messaging thread;
providing, based on receiving the approval, the second user with access to the group messaging thread; and
providing, to the second client device, a notification that the second user has been authorized to join the group messaging thread.

5. The method of claim 1, wherein:
the group messaging graphical element comprises a graphical element that overlays a portion of the ephemeral content posted in the social networking feed; and
receiving the first selection comprises receiving, via the first client device associated with the first user, a selection of the group messaging graphical element from a plurality of graphical elements.

6. The method of claim 1, further comprising:
modifying the group messaging graphical element to include an expiration time that triggers deletion of the group messaging thread; and
wherein the ephemeral content posted in the social networking feed further comprises a countdown graphical element indicating the expiration time.

7. The method of claim 1, further comprising:
determining that the first user is directly connected to the second user via a networking system; and
automatically providing the second user access to the group messaging thread based on the first user being directly connected to the second user.

8. The method of claim 1:
wherein the one or more criteria comprise a maximum membership threshold designating a highest number of users permitted to join the group messaging thread; and
further comprising, in response to determining that the group messaging thread includes a number of members equal to the maximum membership threshold, removing the group messaging graphical element from the ephemeral content posted in the social networking feed.

9. The method of claim 8, further comprising determining that the one or more criteria for removing the group messaging graphical element from the ephemeral content has been met by:
determining that the number of members in the group messaging thread is below the maximum membership threshold; and
in response to determining that the number of members in the group messaging thread is below the maximum membership threshold, re-adding the group messaging graphical element to the ephemeral content posted in the social networking feed.

10. The method of claim 1, further comprising:
receiving, from the first client device, a third selection requesting generation of additional ephemeral content;
providing the group messaging graphical element as a selectable graphical element to the first client device during creation of additional ephemeral content;

receiving, from the first client device, a fourth selection to include the group messaging graphical element within the additional ephemeral content;

associating the additional ephemeral content with the group messaging thread based on including the group messaging graphical element within the additional ephemeral content; and providing, based on the fourth selection, the group messaging graphical element to be displayed within the additional ephemeral content.

11. A system comprising:

at least one processor; and at least one non-transitory computer-readable storage medium storing instructions thereon that, when executed by the at least one processor, cause the system to:

receive, from a first client device associated with a first user, a first selection to include a group messaging graphical element within ephemeral content in a social networking feed;

identify one or more criteria for removing the group messaging graphical element from the ephemeral content;

provide, based on the first selection, the group messaging graphical element to be displayed within the ephemeral content;

generate a group messaging thread associated with the group messaging graphical element posted in the social networking feed;

receive, from a second client device associated with a second user, a second selection of the second user selecting the group messaging graphical element within the ephemeral content posted in the social networking feed;

provide, to the first user via the first client device and in response to detecting the second selection, a notification of the second user requesting to join the group messaging thread associated with the ephemeral content; and based on determining that the one or more criteria for removing the group messaging graphical element from the ephemeral content has been met, remove the group messaging graphical element from the ephemeral content posted in the social networking feed.

12. The system of claim 11, further comprising additional instructions that, when executed by the at least one processor, cause the system to:

receive, from the first client device, user input selecting the second user for inclusion in the group messaging thread; and wherein generating the group messaging thread is in response to receiving the user input selecting the second user for inclusion in the group messaging thread.

13. The system of claim 11, further comprising additional instructions that, when executed by the at least one processor, cause the system to:

provide, based on the second selection, a request to the first client device to approve the second user for inclusion in the group messaging thread;

receive, via the first client device, approval to add the second user to the group messaging thread;

provide, based on receiving the approval, the second user with access to the group messaging thread; and provide, to the second client device, a notification that the second user has been authorized to join the group messaging thread.

14. The system of claim 11, further comprising additional instructions that, when executed by the at least one processor, cause the system to:

modify the group messaging graphical element to include an expiration time that triggers deletion of the group messaging thread; and wherein the ephemeral content posted in the social networking feed further comprises a countdown graphical element indicating the expiration time.

15. The system of claim 11, further comprising additional instructions that, when executed by the at least one processor, cause the system to:

determine that the first user is directly connected to the second user via a networking system; and automatically provide the second user access to the group messaging thread based on the first user being directly connected to the second user.

16. A non-transitory computer readable medium storing instructions thereon that, when executed by at least one processor, cause a computer system to:

receive, from a first client device associated with a first user, a first selection to include a group messaging graphical element within ephemeral content in a social networking feed;

identify one or more criteria for removing the group messaging graphical element from the ephemeral content;

provide, based on the first selection, the group messaging graphical element to be displayed within the ephemeral content;

generate a group messaging thread associated with the group messaging graphical element posted in the social networking feed;

receive, from a second client device associated with a second user, a second selection of the second user selecting the group messaging graphical element within the ephemeral content posted in the social networking feed;

provide, to the first user via the first client device and in response to detecting the second selection, a notification of the second user requesting to join the group messaging thread associated with the ephemeral content; and based on determining that the one or more criteria for removing the group messaging graphical element from the ephemeral content has been met, remove the group messaging graphical element from the ephemeral content posted in the social networking feed.

17. The non-transitory computer readable medium of claim 16, further comprising additional instructions that, when executed by the at least one processor, cause the computer system to:

in response to determining that the group messaging thread includes a number of members equal to a maximum membership threshold, remove the group messaging graphical element from the ephemeral content posted in the social networking feed.

18. The non-transitory computer readable medium of claim 16, further comprising instructions that, when executed by the at least one processor, cause the computer system to:

determining that a number of members in the group messaging thread is below a maximum membership threshold; and in response to determining that the number of members in the group messaging thread is below the maximum membership threshold, re-adding the group messaging graphical element to the ephemeral content posted in the social networking feed.

19. The non-transitory computer readable medium of claim 16, further comprising additional instructions that, when executed by the at least one processor, cause the computer system to:
- receive, from the first client device, a third selection requesting generation of additional ephemeral content;
- provide the group messaging graphical element as a selectable graphical element to the first client device during creation of additional ephemeral content;
- receive, from the first client device, a fourth selection to include the group messaging graphical element within the additional ephemeral content;
- associate the additional ephemeral content with group messaging thread based on including the group messaging graphical element within the additional ephemeral content; and
- provide, based on the fourth selection, the group messaging graphical element to be displayed within the additional ephemeral content.

20. The non-transitory computer readable medium of claim 16, further comprising instructions that, when executed by the at least one processor, cause the computer system to:
- receive, from the first client device, the ephemeral content;
- analyze the ephemeral content to identify a plurality of group messaging graphical elements; and
- provide the plurality of group messaging graphical elements to the first client device.

* * * * *